US012753618B2

(12) United States Patent
Kim et al.

(10) Patent No.: US 12,753,618 B2
(45) Date of Patent: Oct. 6, 2026

(54) MOBILE DIAGNOSTIC STRUCTURE

(71) Applicant: SEEGENE, INC., Seoul (KR)

(72) Inventors: Seong Youl Kim, Seoul (KR); Hae Hui Park, Seoul (KR); Sung Eun Kim, Seoul (KR)

(73) Assignee: SEEGENE, INC., Seoul (KR)

(*) Notice: Subject to any disclaimer, the term of this patent is extended or adjusted under 35 U.S.C. 154(b) by 438 days.

(21) Appl. No.: 18/269,800

(22) PCT Filed: Dec. 28, 2021

(86) PCT No.: PCT/KR2021/020072
§ 371 (c)(1),
(2) Date: Jun. 27, 2023

(87) PCT Pub. No.: WO2022/145983
PCT Pub. Date: Jul. 7, 2022

(65) Prior Publication Data
US 2024/0052658 A1 Feb. 15, 2024

(30) Foreign Application Priority Data

Dec. 28, 2020 (KR) ........................ 10-2020-0184169
Feb. 19, 2021 (KR) ........................ 10-2021-0022267
Oct. 18, 2021 (KR) ........................ 10-2021-0138198

(51) Int. Cl.
*B60P 3/14* (2006.01)
*E04H 3/08* (2006.01)

(52) U.S. Cl.
CPC . *E04H 3/08* (2013.01); *B60P 3/14* (2013.01)

(58) Field of Classification Search
CPC ................. B60P 3/14; E04H 3/08; E06B 7/32
USPC ........................................................ 296/24.38
See application file for complete search history.

(56) References Cited

U.S. PATENT DOCUMENTS 4,667,580 A * 5/1987 Wetzel ................ E04B 1/34869
52/36.2
4,683,195 A 7/1987 Mullis et al.
4,683,202 A 7/1987 Mullis
5,210,015 A 5/1993 Gelfand et al.
5,876,930 A 3/1999 Livak et al.
(Continued)

FOREIGN PATENT DOCUMENTS

CN 101619285 A * 1/2010 ............ C12M 23/34
CN 201473515 U * 5/2010 ............ C12M 37/00
(Continued)

OTHER PUBLICATIONS

Machine translation of WO 849 (Year: 2017).*
(Continued)

*Primary Examiner* — Hilary L Gutman
(74) *Attorney, Agent, or Firm* — Harness, Dickey & Pierce, P.L.C.

(57) ABSTRACT

According to an embodiment, a mobile diagnostic structure comprises a housing including a space therein; a partitioning module partitioning the space to include a preparation room and an analysis room; an inlet module providing an incoming path from an outside to the preparation room for a raw sample; and a transfer module providing a transfer path from the preparation room to the analysis room, for a pre-treated sample which is a result of pre-treating the raw sample in the preparation room.

15 Claims, 38 Drawing Sheets

(56) References Cited

U.S. PATENT DOCUMENTS 5,921,191 A * 7/1999 Gabel ..................... E05G 7/005 109/7
6,117,635 A 9/2000 Nazarenko et al.
6,977,295 B2 12/2005 Belotserkovskii et al.
7,348,141 B2 3/2008 French et al.
7,537,886 B1 5/2009 Nazarenko et al.
7,985,382 B1 * 7/2011 Henry ................... E04H 1/1277 422/291
9,623,782 B1 * 4/2017 Coons ..................... B60P 3/005
11,773,613 B2 * 10/2023 Bruns ....................... E04H 3/08 52/79.1
12,252,878 B2 * 3/2025 Bruns ....................... E04H 3/08
2005/0193643 A1 * 9/2005 Pettus ..................... F24F 3/167 52/79.1
2010/0304658 A1 * 12/2010 Grcevic .................. B60P 3/005 454/187
2011/0265894 A1 * 11/2011 Yamamoto ................ A61L 2/26 137/544
2013/0025221 A1 * 1/2013 Mouzannar ............... E04H 3/08 52/234
2013/0115607 A1 * 5/2013 Nielsen .................... C12Q 1/68 435/6.12
2016/0184814 A1 * 6/2016 Funazuka ............... A61L 2/208 422/565
2018/0311389 A1 * 11/2018 Watanabe .............. C12M 37/00
2022/0184261 A1 * 6/2022 Kaneko ..................... A61L 9/20
2022/0193291 A1 * 6/2022 Kawasaki ............... A61L 2/025
2022/0282195 A1 * 9/2022 Shalom .................. C12M 37/00
2022/0331181 A1 * 10/2022 Song .................... A61G 10/023
2022/0333436 A1 * 10/2022 Song ......................... E06B 7/32
2024/0238464 A1 * 7/2024 Kawasaki ................. A61L 2/22

FOREIGN PATENT DOCUMENTS

CN 104655430 A * 5/2015
CN 107724712 A * 2/2018 ............... E04H 3/08
CN 111593909 A 8/2020
CN 211421965 U 9/2020
CN 113279480 A * 8/2021 ......... E04B 1/34315
JP 2000254212 A * 9/2000
JP 2005187141 A * 7/2005
JP 2019-027980 A 2/2019
KR 10-2011-0052006 A 5/2011
KR 101575233 B1 * 12/2015 ............. A61G 10/00
KR 101649600 B1 * 8/2016 ........... A61G 10/023
KR 101668378 B1 * 10/2016 ........... A61G 10/005
KR 101674482 B1 * 11/2016 ............. E04H 1/125
KR 10-1913198 B1 10/2018
KR 101996501 B1 * 10/2019 ................ B60P 3/34
KR 10-2171850 B1 10/2020
KR 102206763 B1 * 1/2021 ........... A61B 5/6893
KR 20220152414 A * 11/2022 ............... A61L 9/20
KR 20240012628 A * 1/2024 ........... A61G 10/023
TW 202336225 A * 9/2023 ............ C12M 37/00
WO 2011037306 A1 3/2011
WO 2012096523 A2 7/2012
WO 2013115442 A1 8/2013
WO 2014104818 A1 7/2014
WO WO-2016138013 A1 * 9/2016 ....... A61B 5/150076
WO WO-2017/194849 A1 11/2017
WO WO-2019244607 A1 * 12/2019 ............... G21K 5/00
WO WO-2021235710 A1 * 11/2021 .............. B60P 3/005
WO WO-2022145985 A1 * 7/2022 ................ B01L 1/04
WO WO-2023064780 A1 * 4/2023 ................ B01L 1/52

OTHER PUBLICATIONS

Encompass: What is an Airlock? https://encompasscleanrooms.com/blog/what-is-an-airlock (Year: 2025).*
Comprehensive Guide to Air Locks and Their Uses in the Pharmaceutical Industry Pharmaceutical Microbiology https://pharmaceuticalmicrobiologi.blogspot.com/2016/12/air-locks.html (Year: 2016).*
Cleanroom Personnel Airlocks https://www.rdworldonline.com/cleanroom-personnel-airlocks/ (Year: 2018).*
Cleanroom Airlocks for Personnel https://www.terrauniversal.com/cleanroom-airlocks.html (Year: 2019).*
Machine translation of KR 850 (Year: 2020).*
International Search Report issued in International Application No. PCT/KR2021/020072 dated Apr. 19, 2022.
Extended European Search Report in EP Patent Application No. 21915781.5 dated Nov. 14, 2024.
Office Action in CA Patent Application No. 3203682 dated Dec. 10, 2024.
Tyagi et al., Nature Biotechnology, vol. 14, Mar. 1996.
Whitcombe et al., Nature Biotechnology, 17804-807 (1999).
Nazarenko et al., Nucleic Acids Research, 25(12):2516-2521 (1997).
Duck P. et al., Biotechniques, 9:142-148 (1990).
Sherrill C B et al., Journal of the American Chemical Society, 126:4550-4556 (2004).
French DJ et al., Molecular and Cellular Probes, 13,363-374 (2001).
Bernard PS et al., Clin Chem, 46, 147-148 (2000).
Walker et al., Nucleic Acids Research, 20(7):1691-1696 (1992).
Walker, PCR Methods Appl 3(1)1-6 (1993).
Pfyffer et al. Journal of Clinical Microbiology, 34834-841 (1996).
Vuorinen et al., Journal of Clinical Microbiology, 331856-1859 (1995).
Compton, Nature, 350(6313)91-92 (1991).
Lisby, Molecular Biotechnology, 12(1)75-99 (1999).
Hatch et al., Genetic Analysis, 15(2)35-40 (1999).
Lizardi et al., Biotechnology, 61197 (1988).

* cited by examiner

【Figure 1】
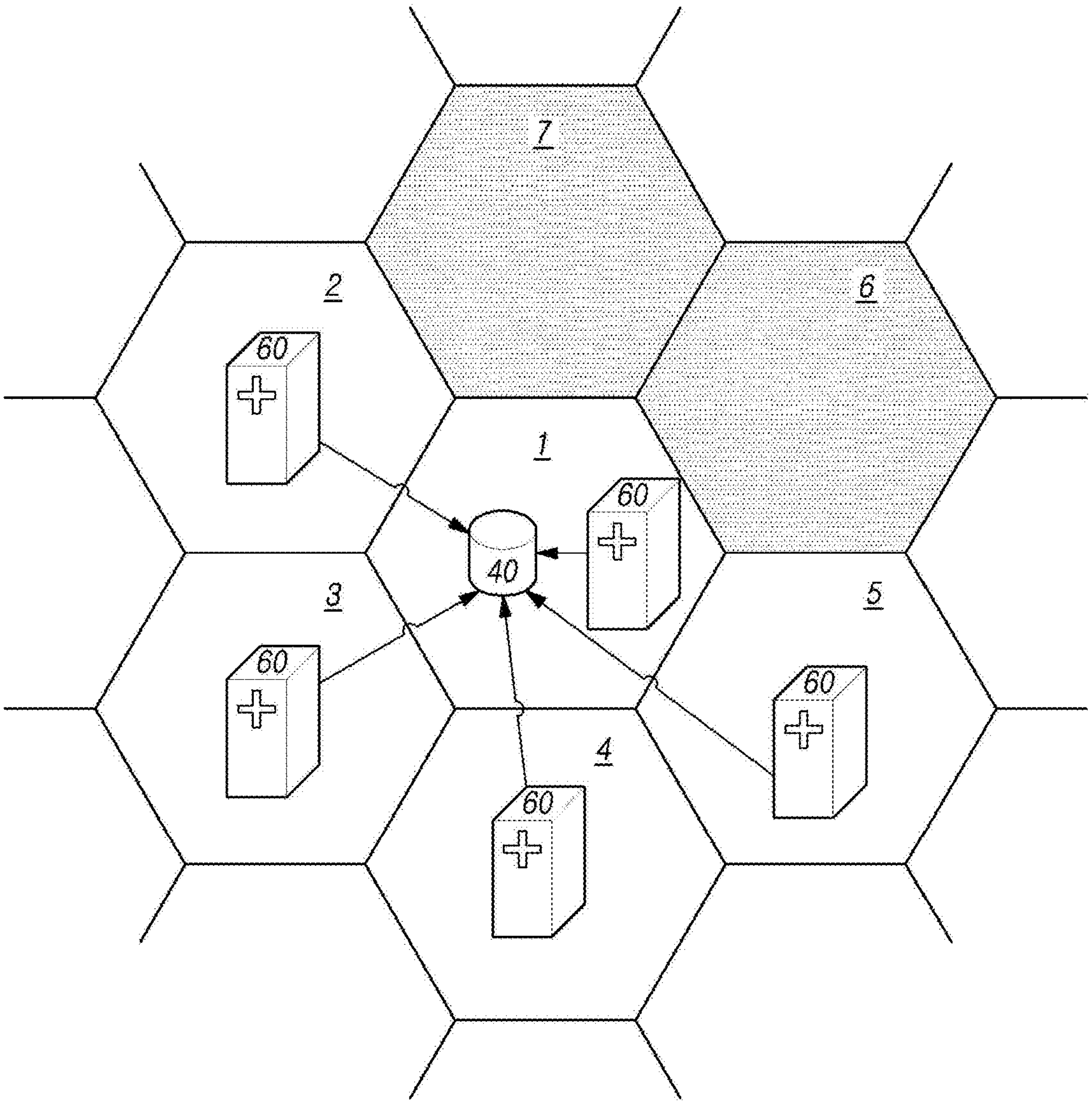

【Figure 2】
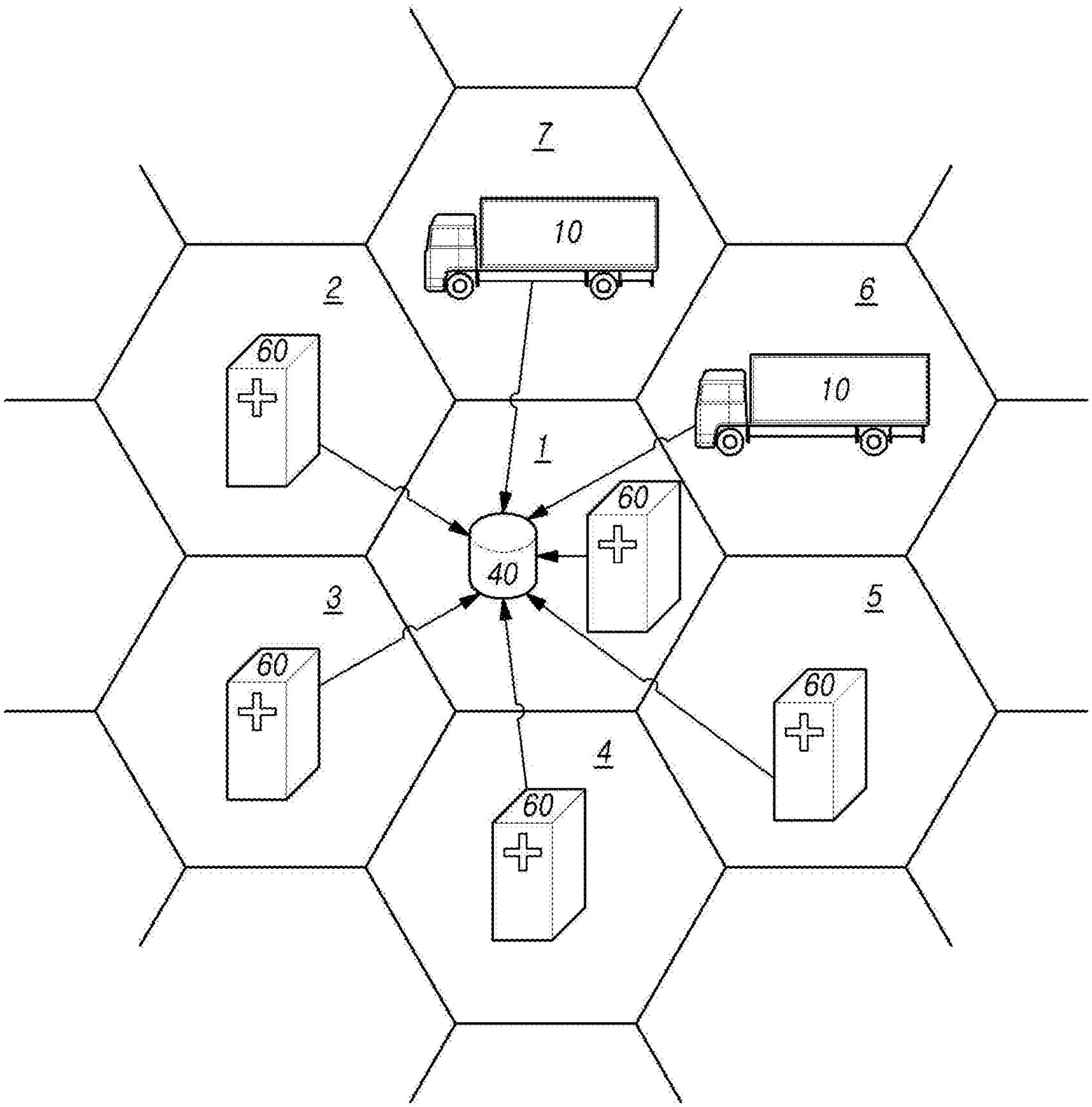

【Figure 3】
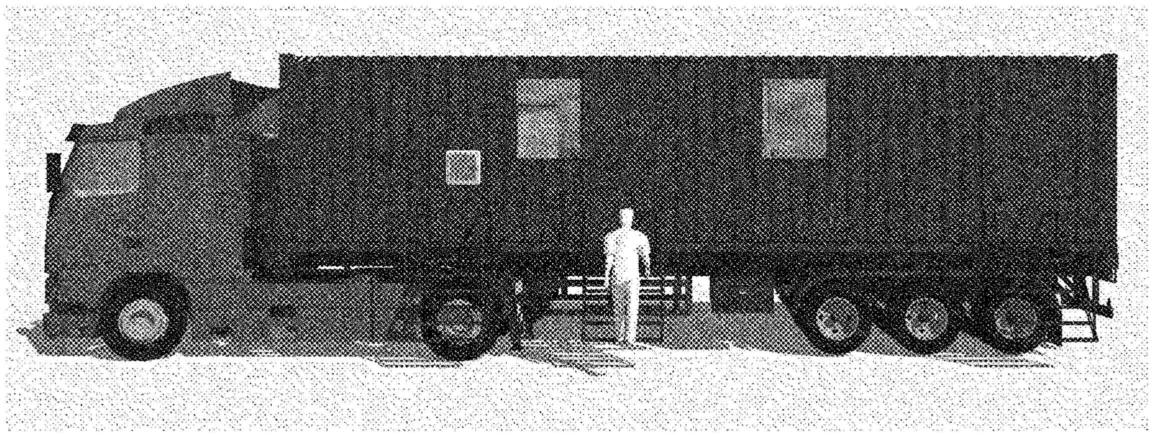
【Figure 4】
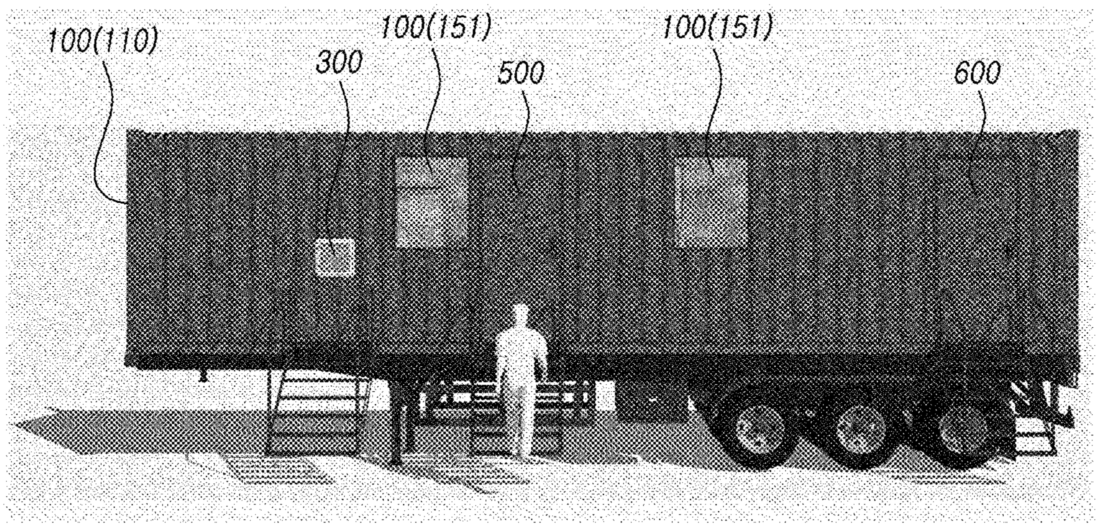

【Figure 5】
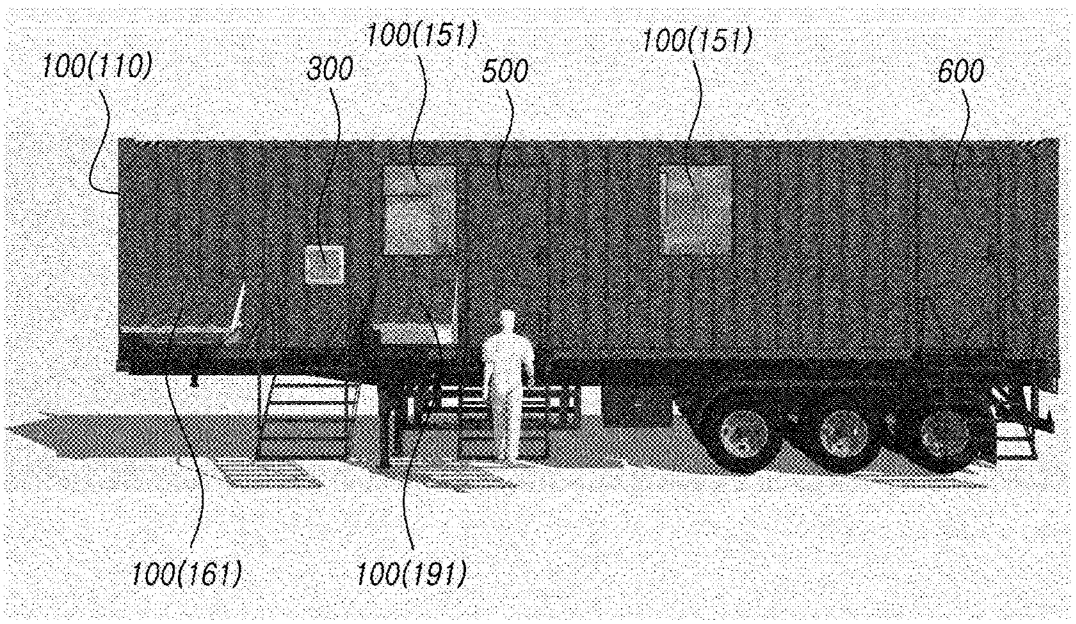
【Figure 6】
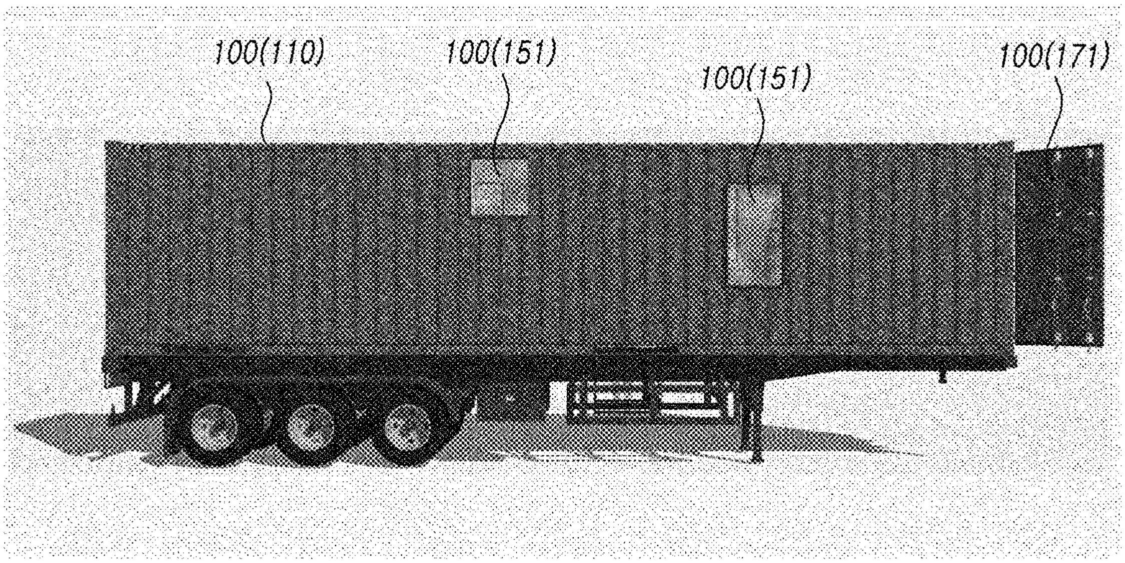

【Figure 7】
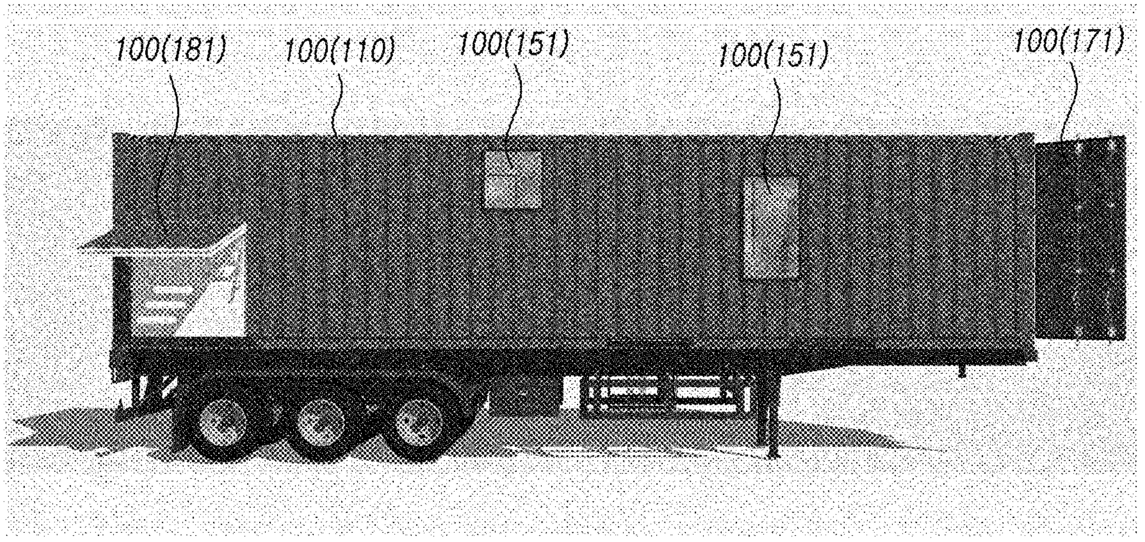

【Figure 8】
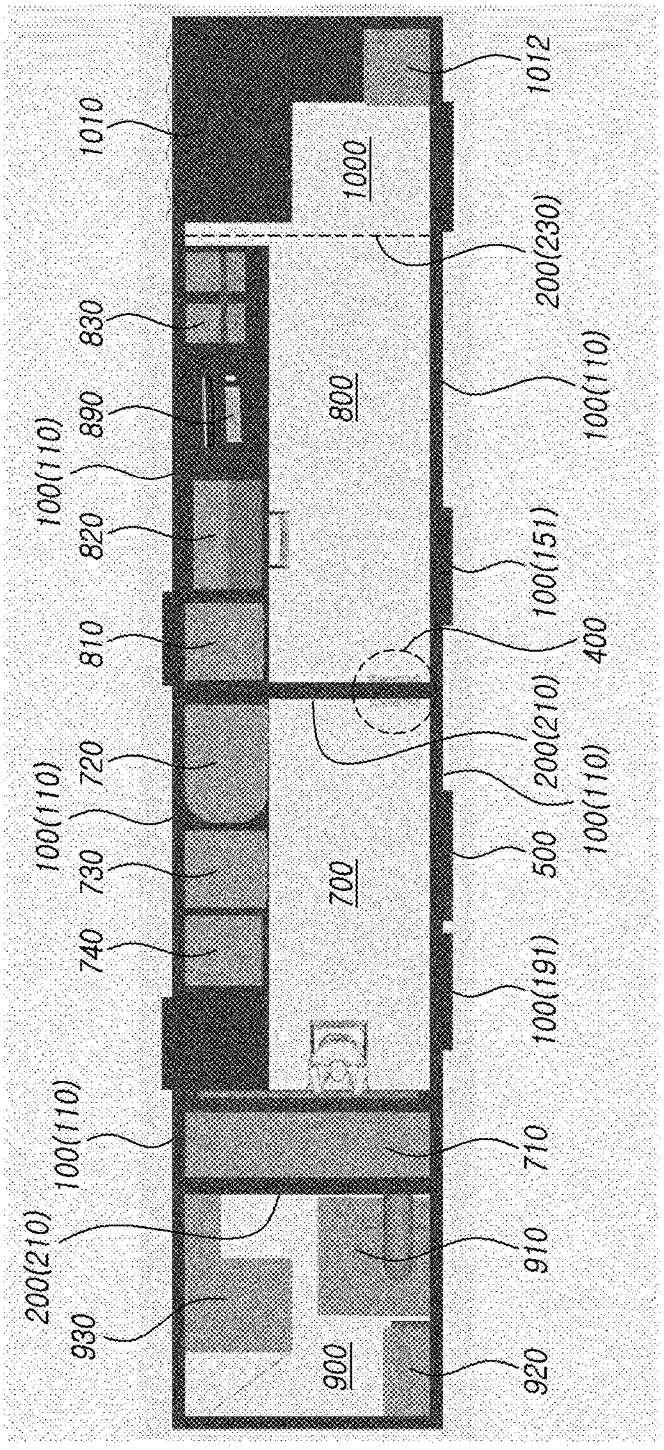

【Figure 9】
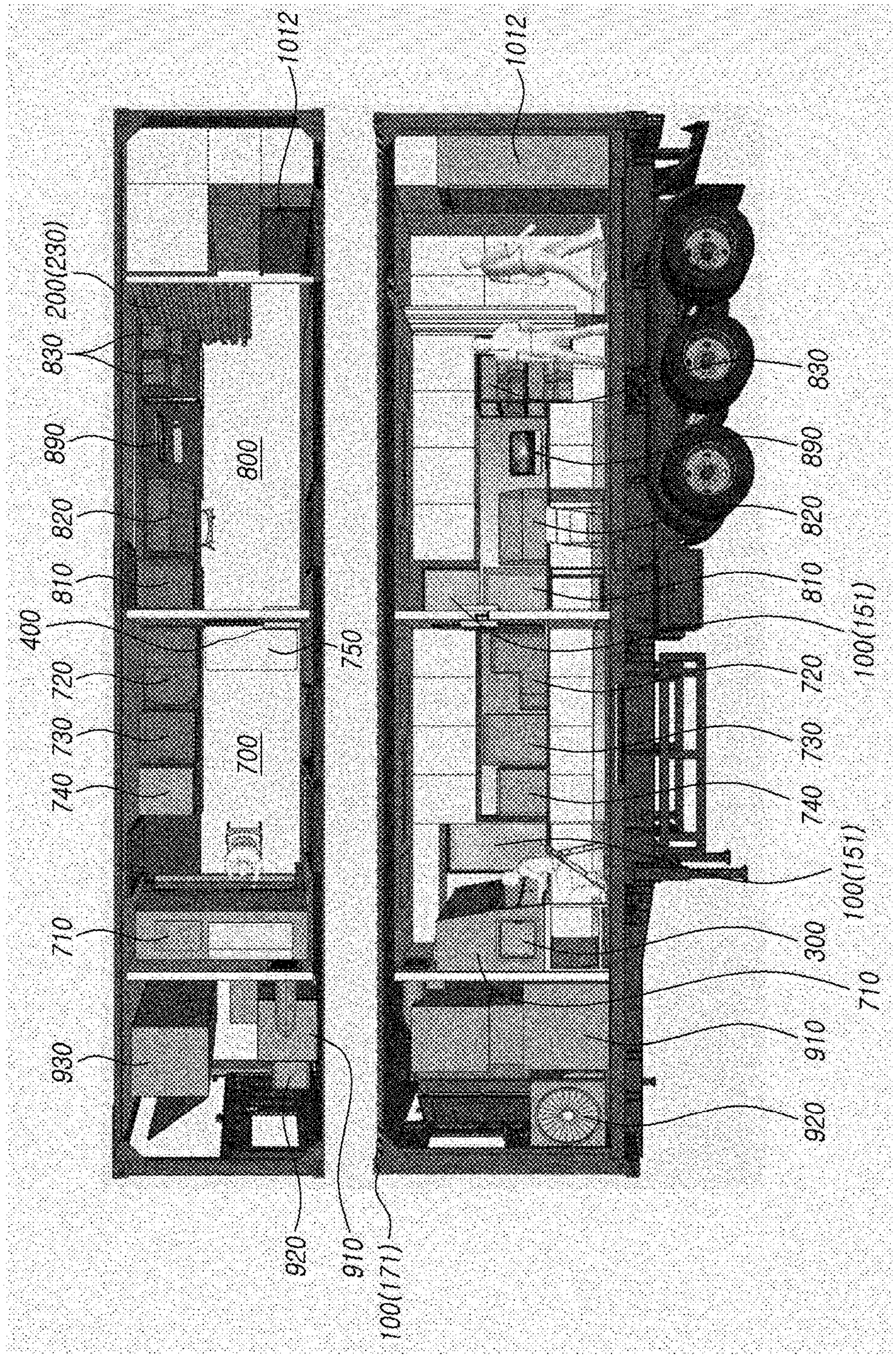

【Figure 10】
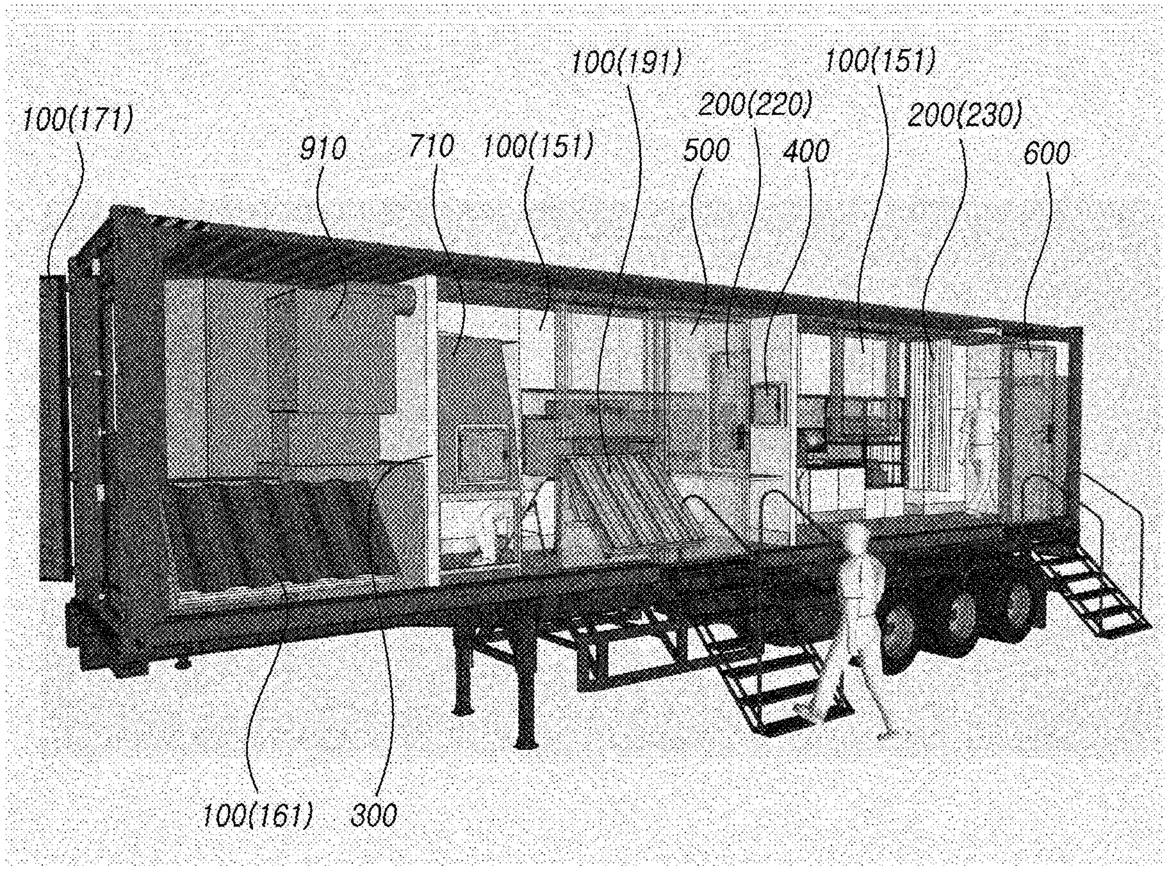

【Figure 11】
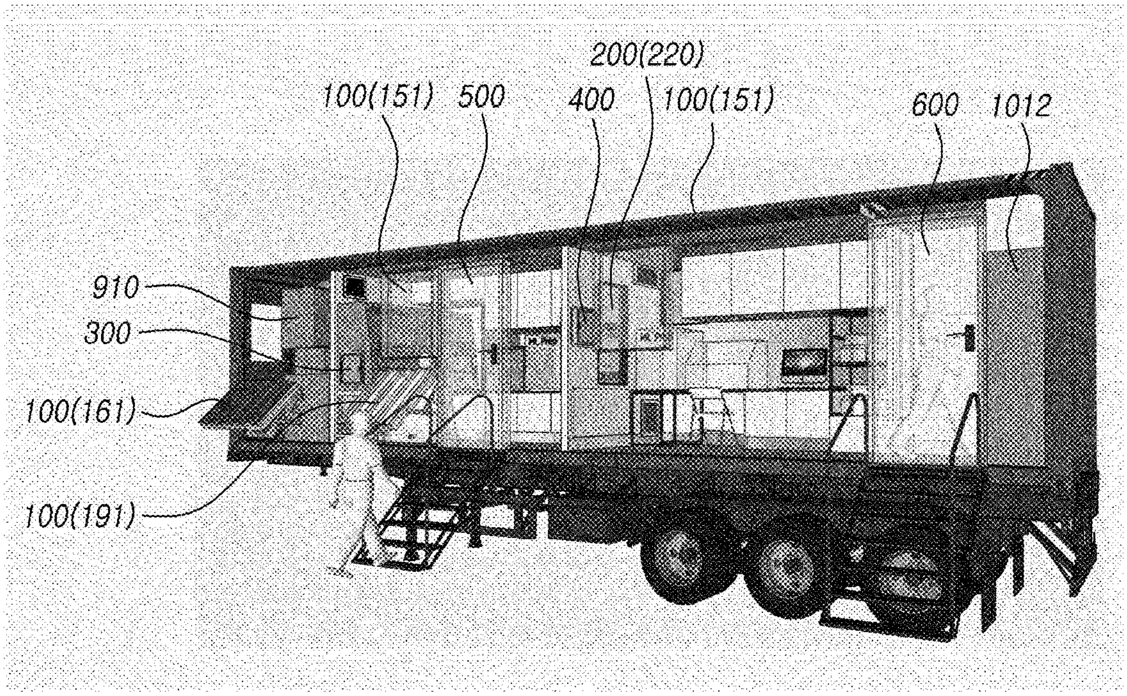

【Figure 12】
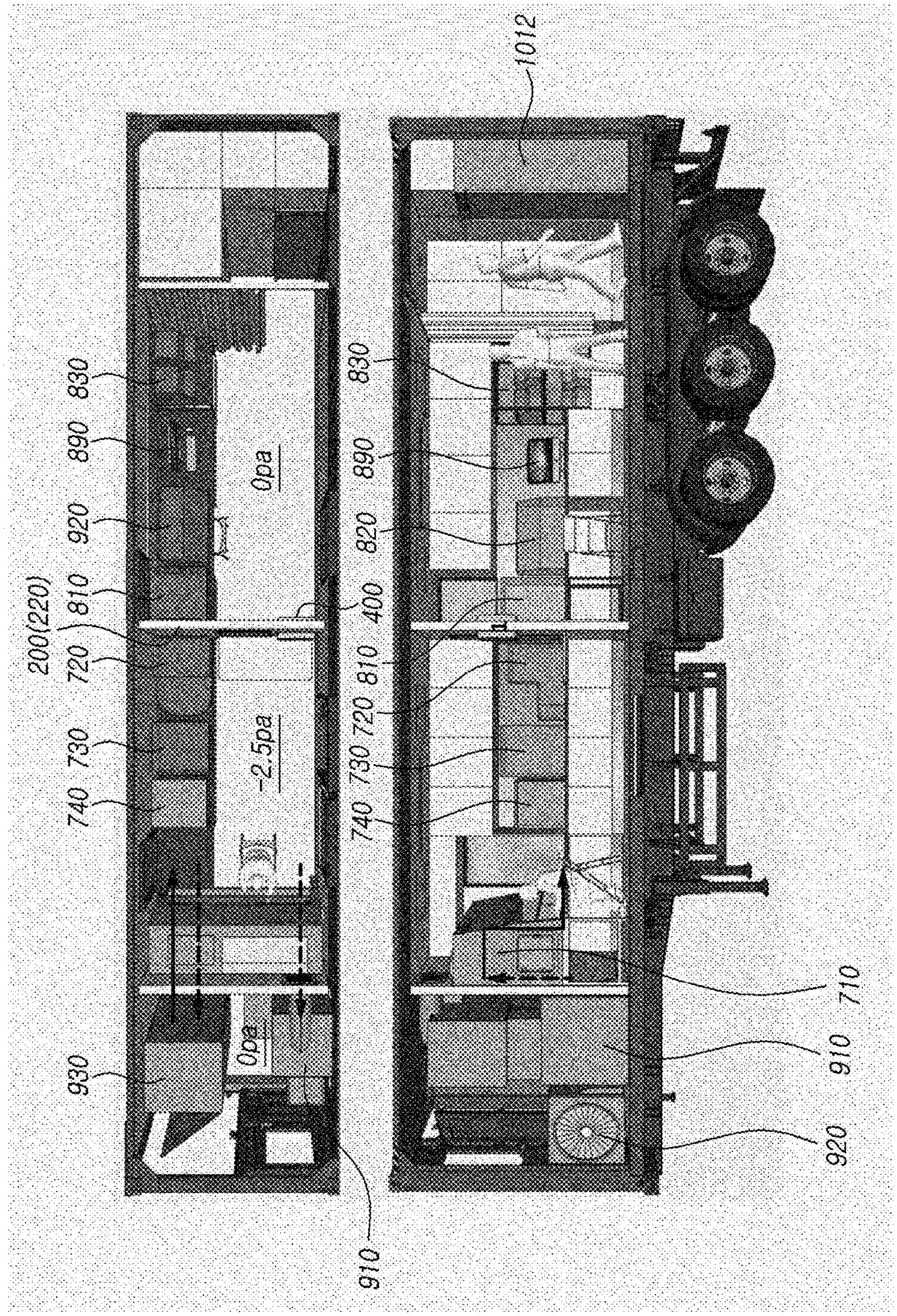

【Figure 13】
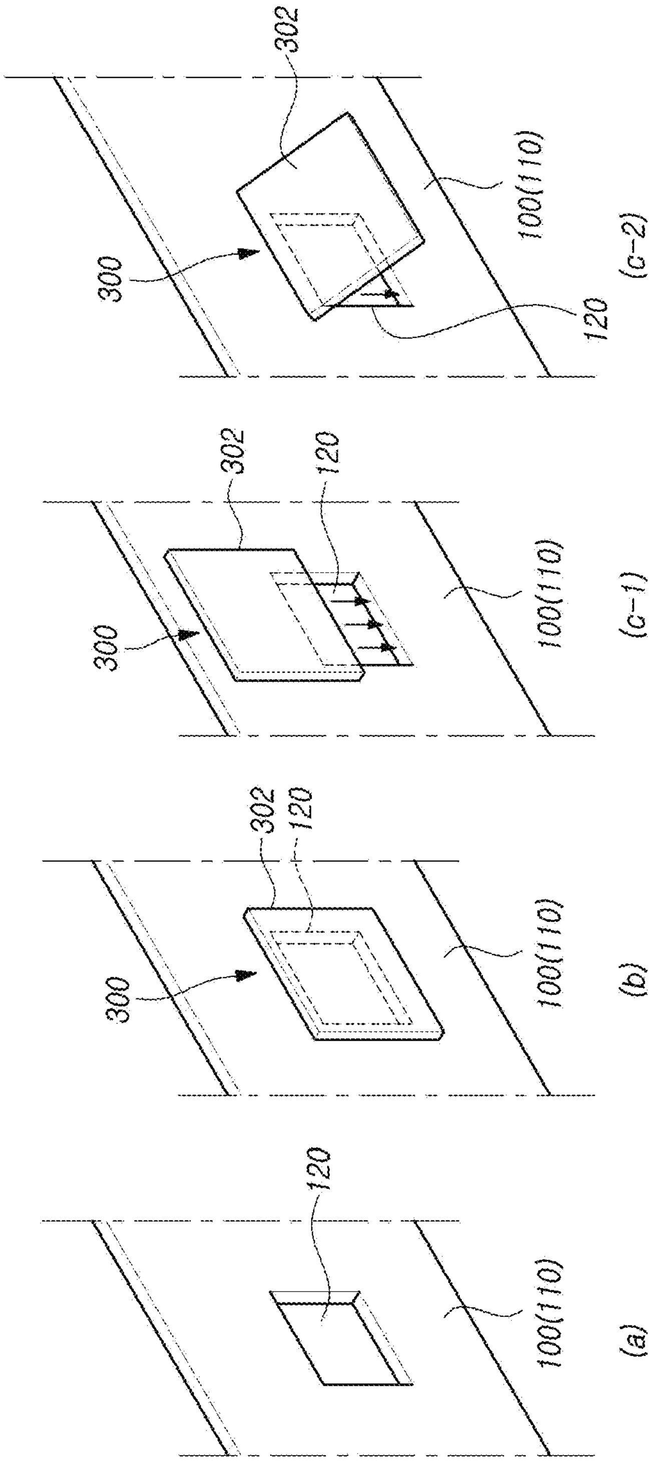

【Figure 14】
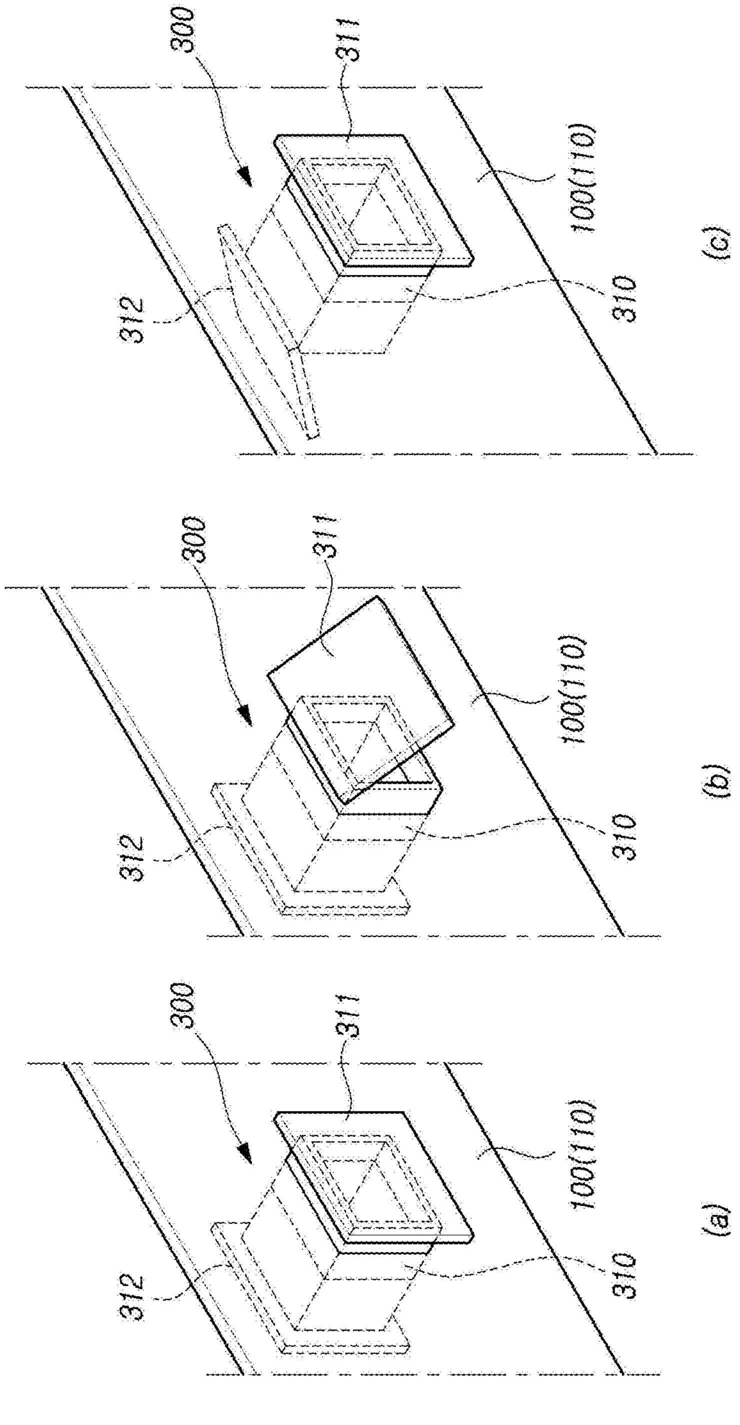

【Figure 15】
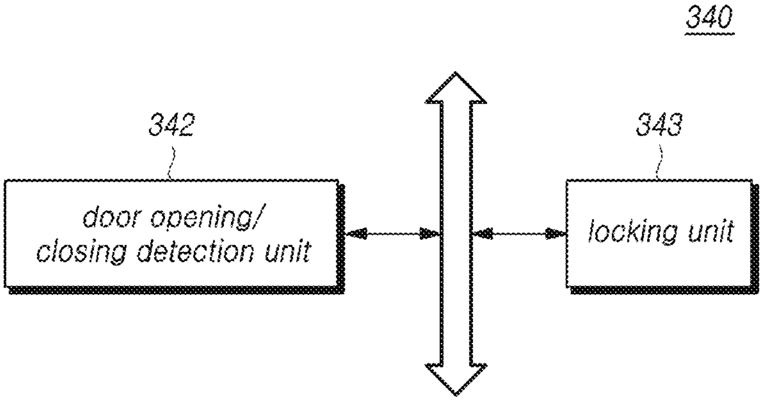

【Figure 16】
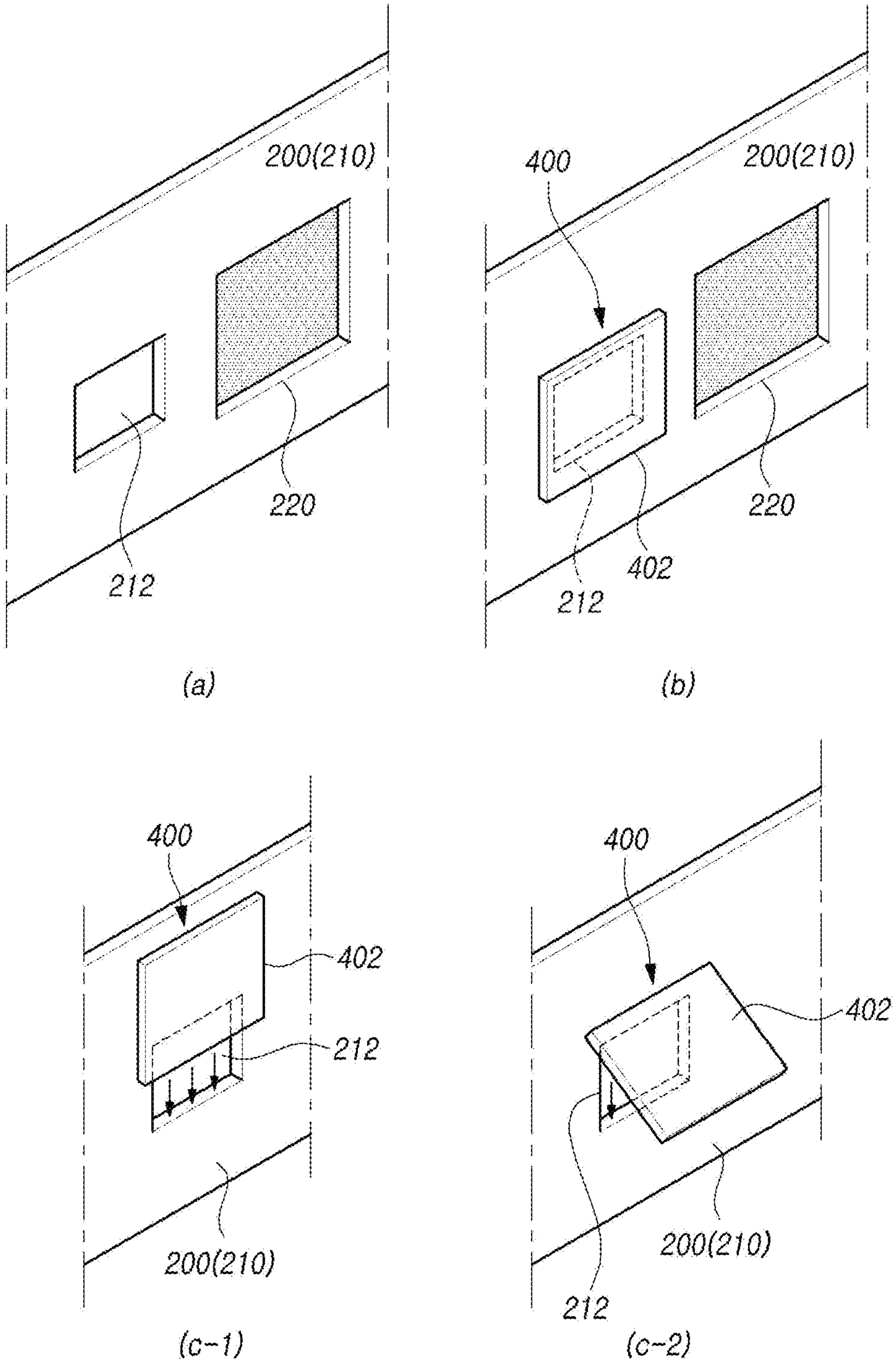

【Figure 17】
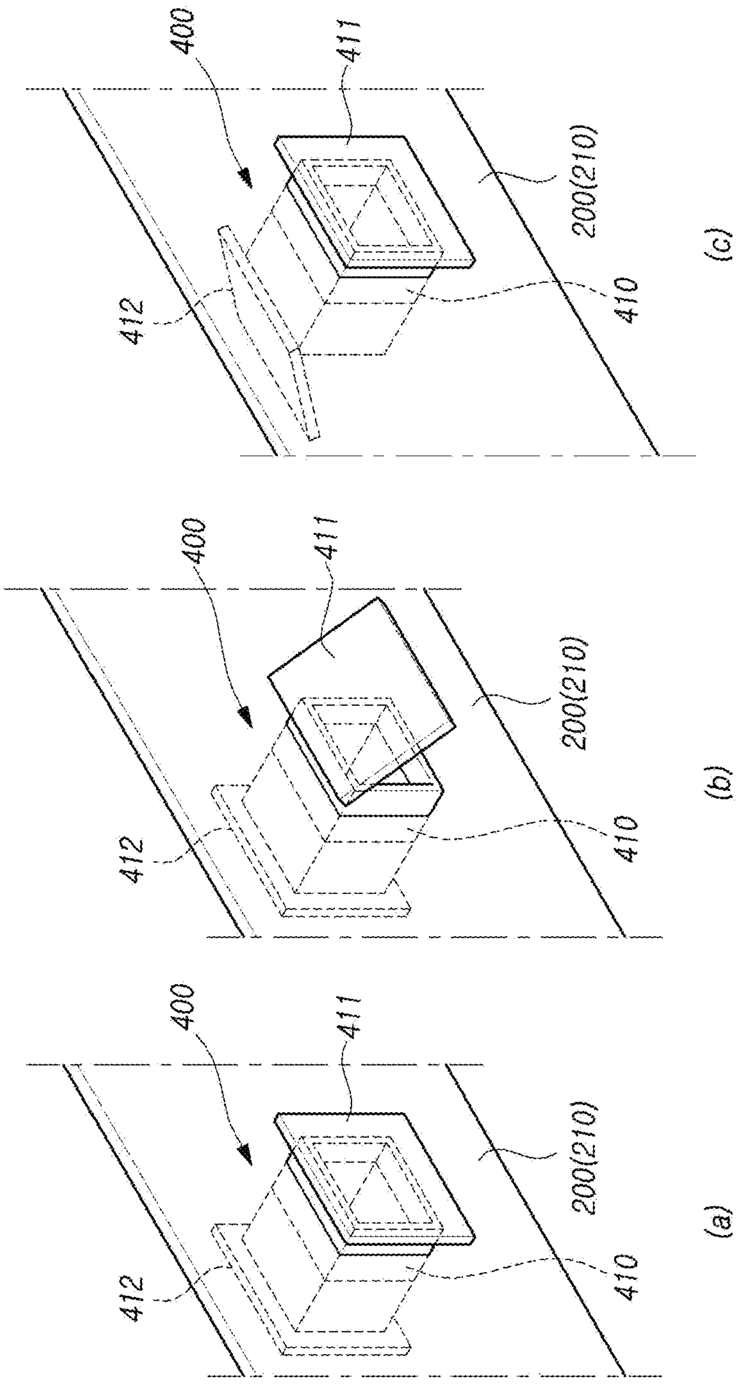

【Figure 18】

| | | | | |
|---|---|---|---|---|
| preparation room-side door unit | Close | Close | Open | Open |
| analysis room-side door unit | Close | Open | Close | Open |
| air pressure of middle chamber (=x) | x < A < B | B | A | |

※ air pressure of preparation room = A
air pressure of analysis room = B
(A < B)

【Figure 19】

| | | | | |
|---|---|---|---|---|
| preparation room-side door unit | Close | Close | Open | Open |
| analysis room-side door unit | Close | Open | Close | Open |
| air pressure of middle chamber (=x) | x < A < B | B | A | |

※ air pressure of preparation room = A
air pressure of analysis room = B
(A < B)

【Figure 20】
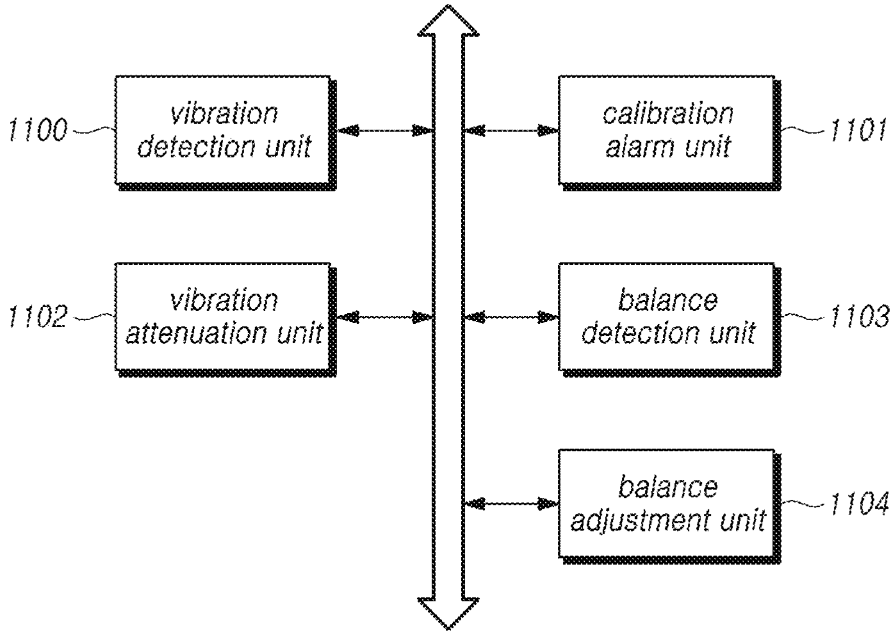

【Figure 21】
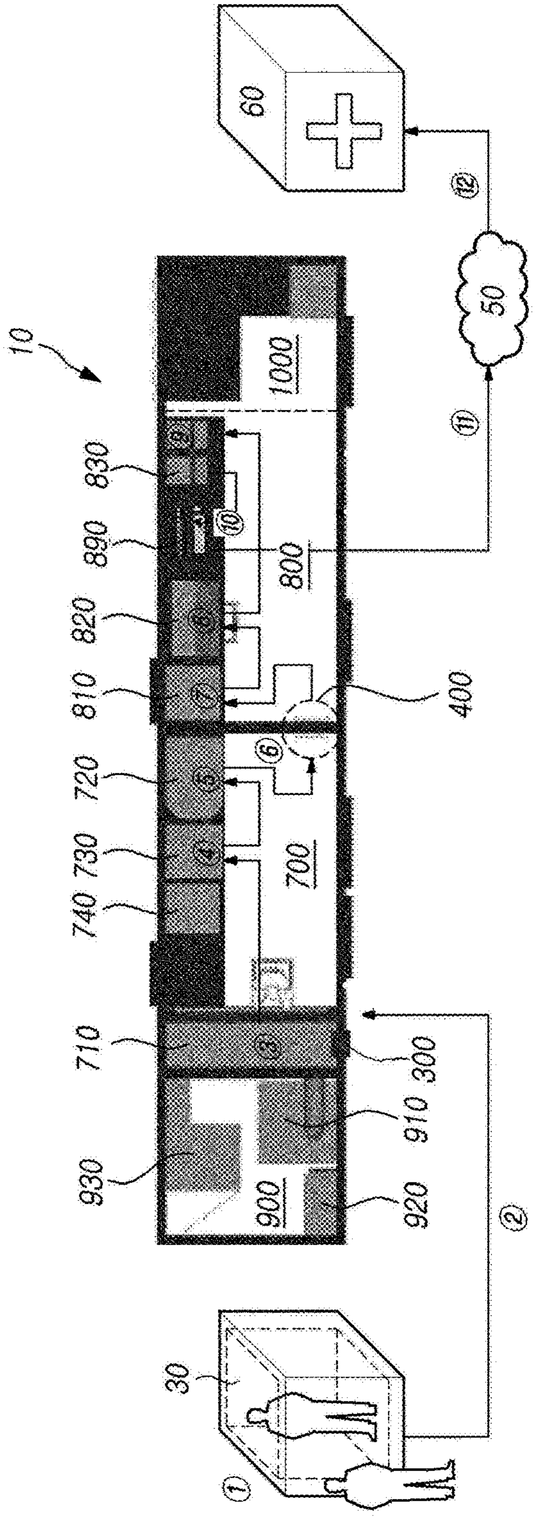

【Figure 22】
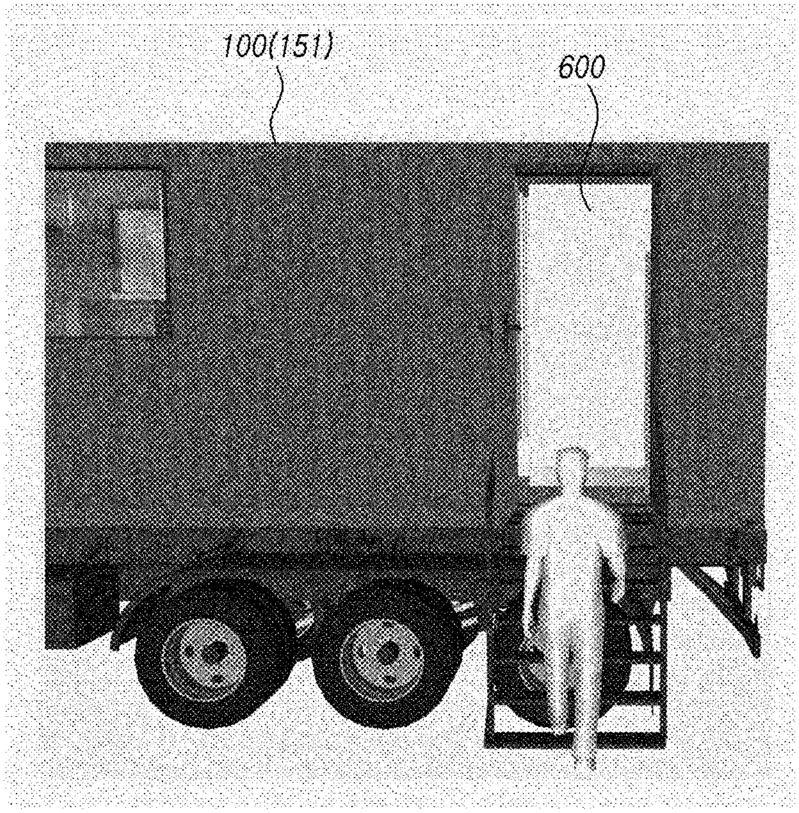
【Figure 23】
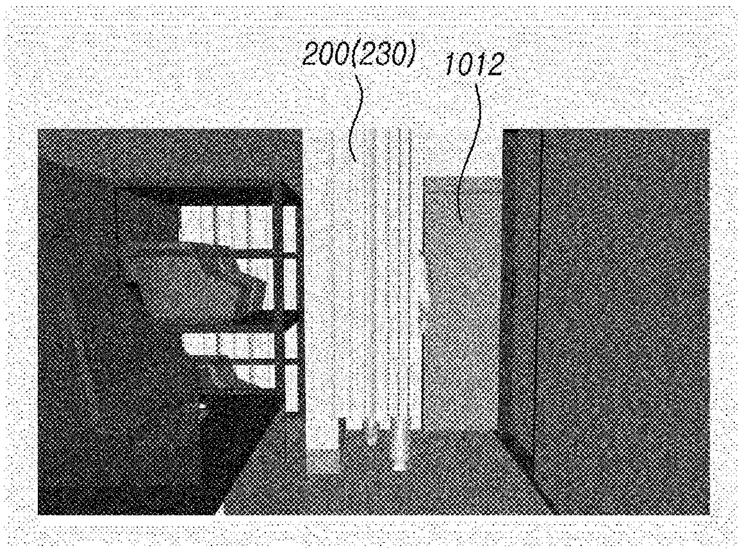

【Figure 24】
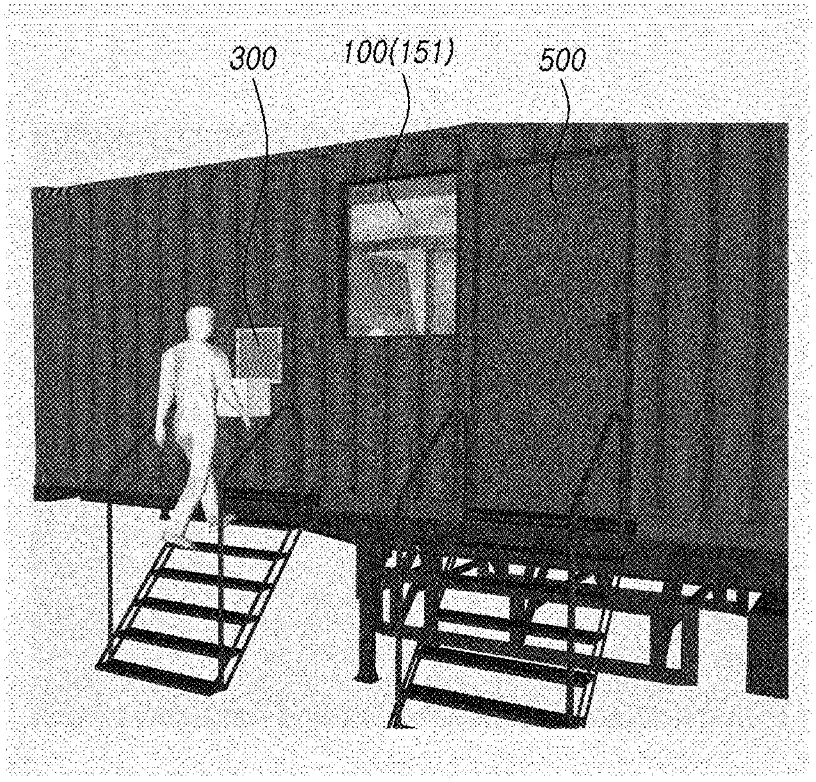
【Figure 25】
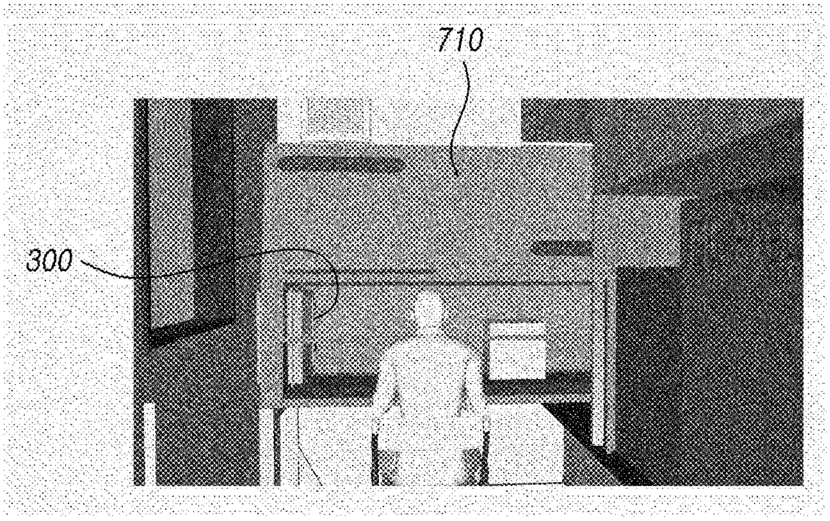

【Figure 26】
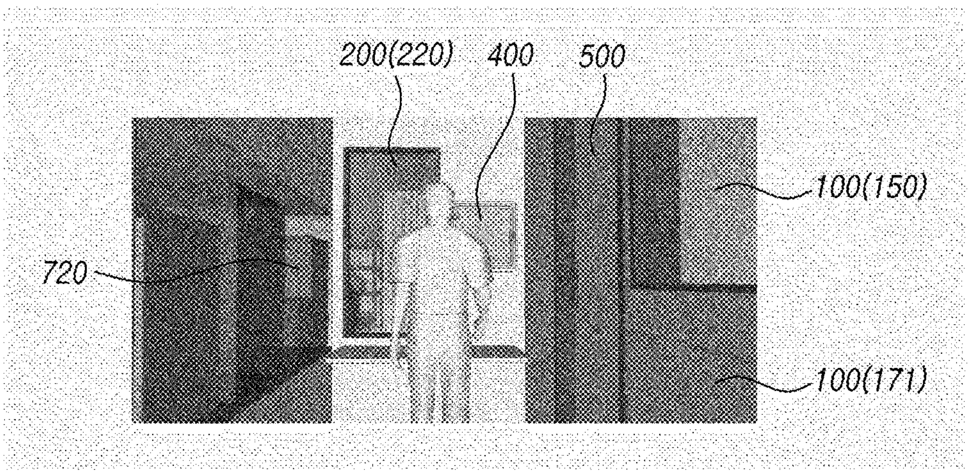
【Figure 27】
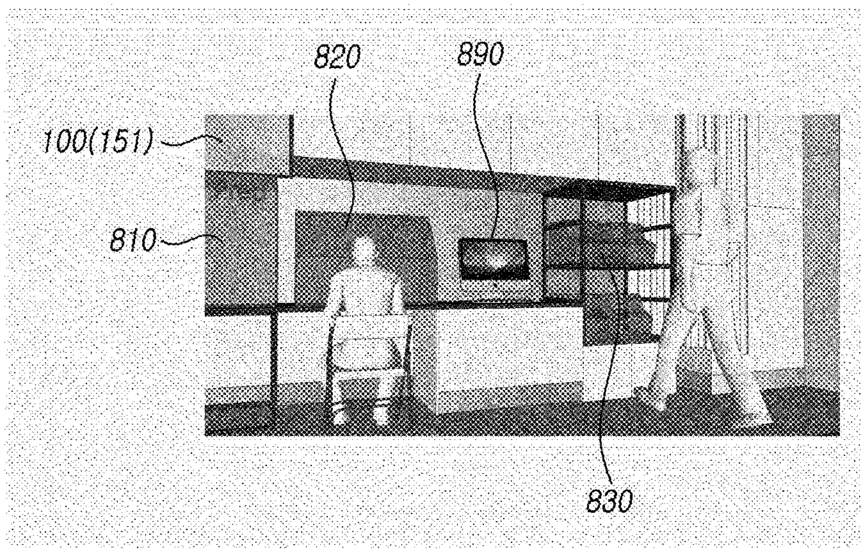

【Figure 28】
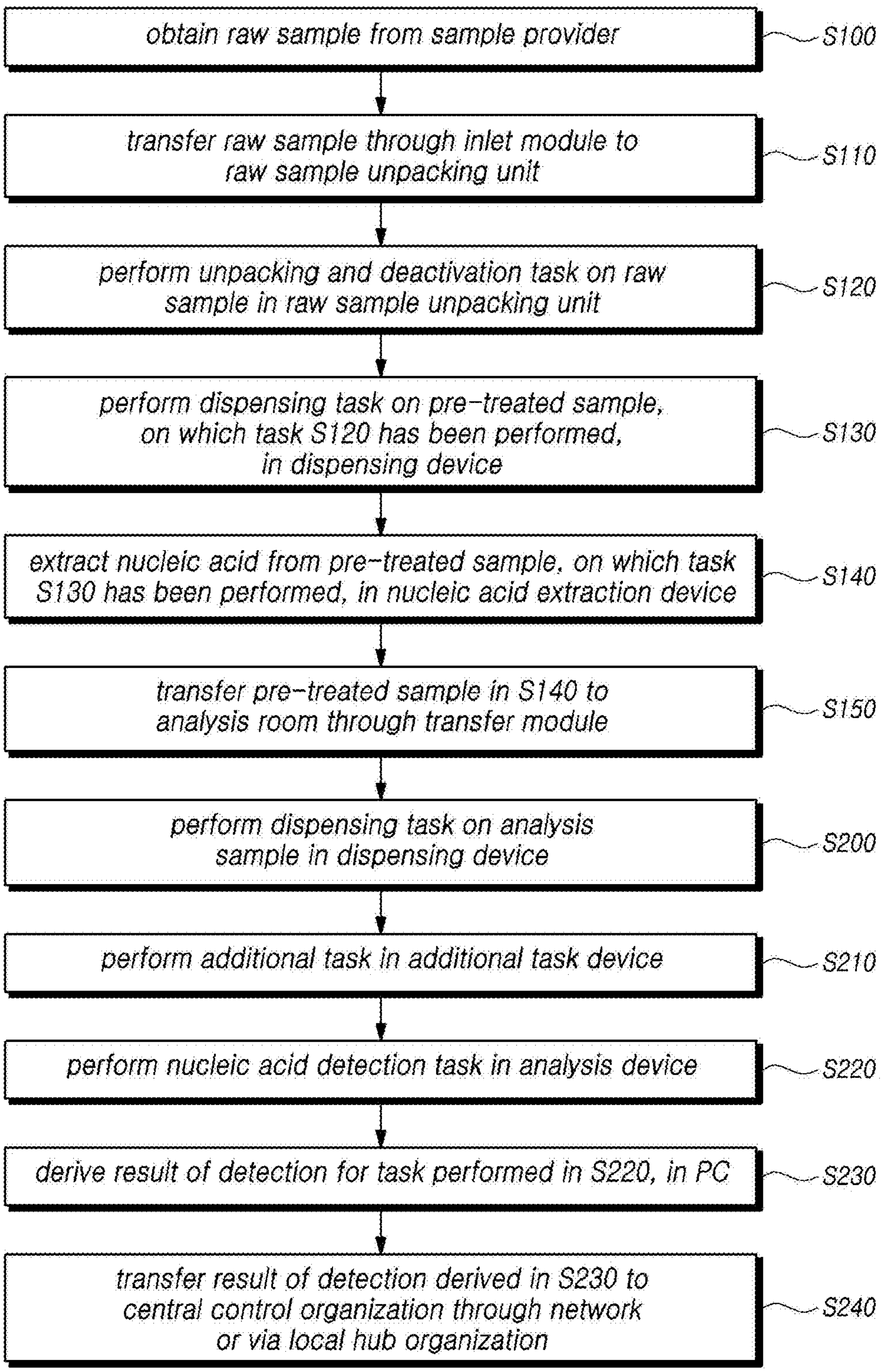

【Figure 29】
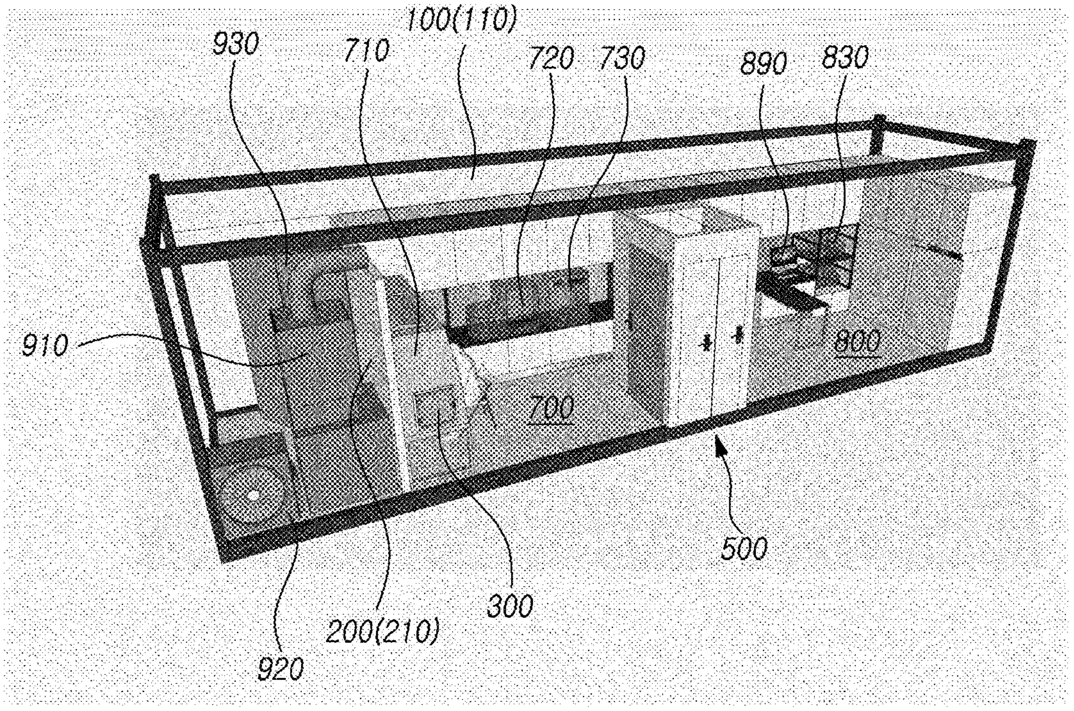
【Figure 30】
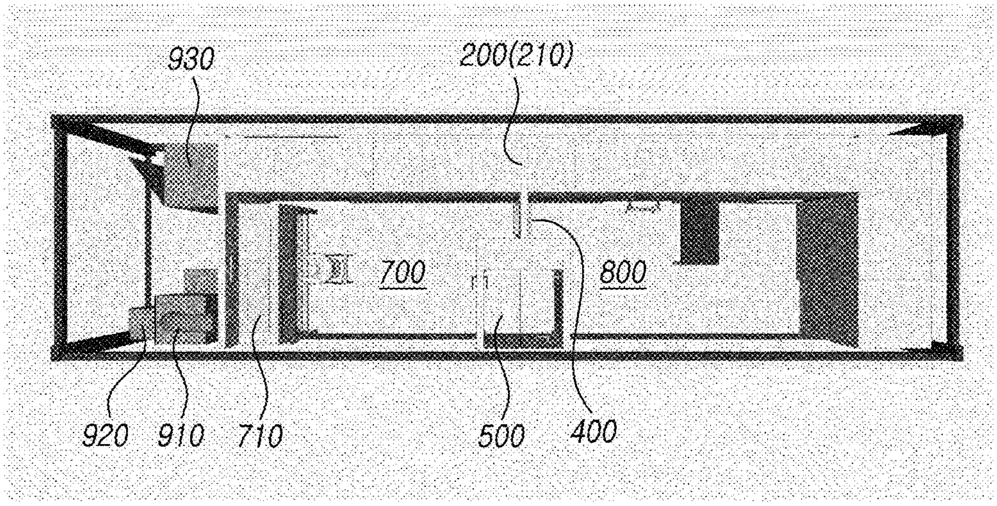

【Figure 31】
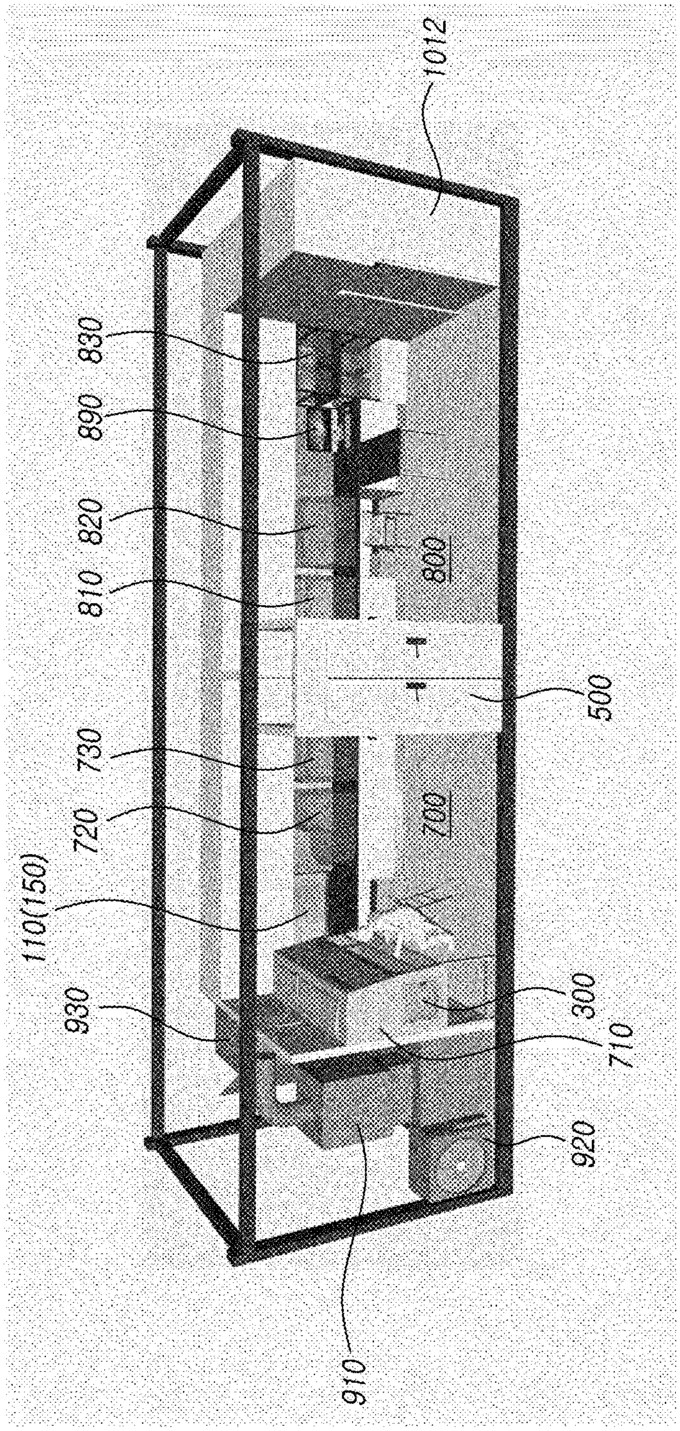

【Figure 32】
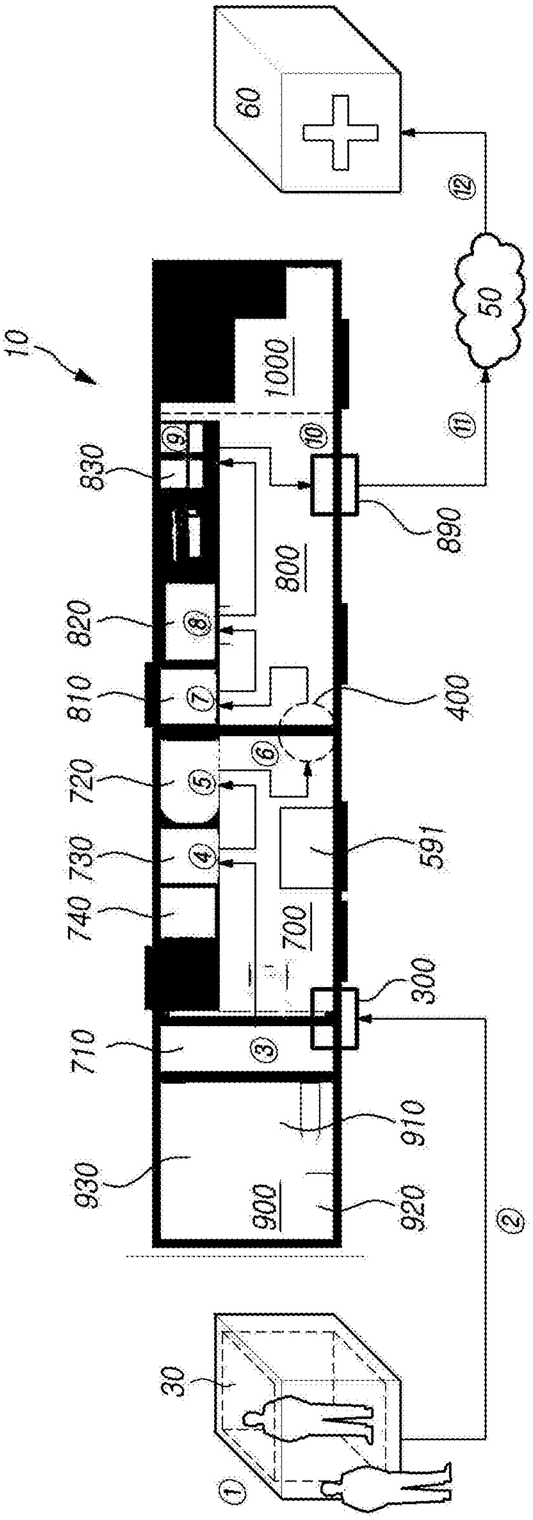

【Figure 33】
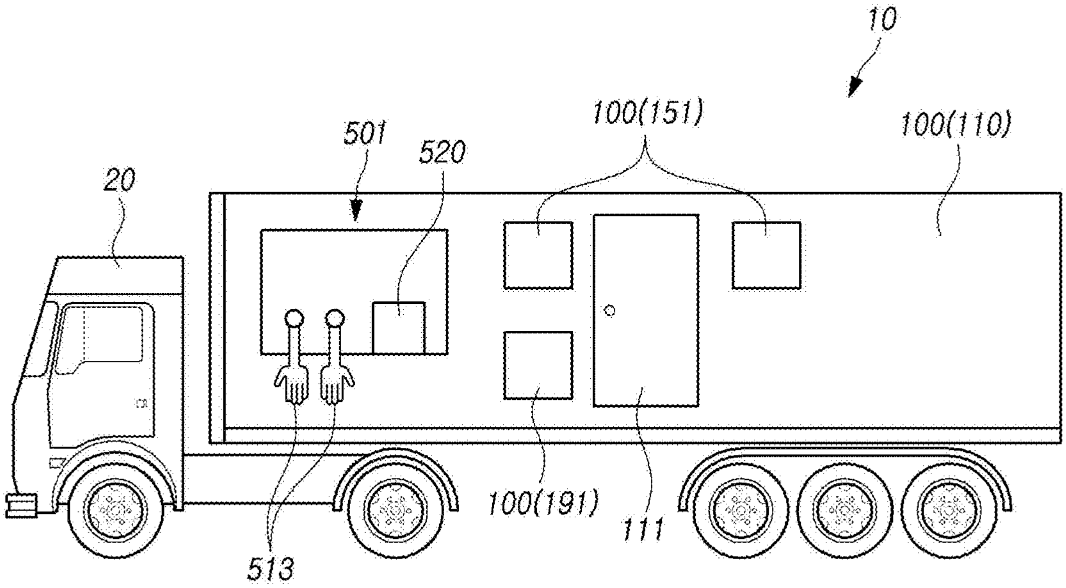

【Figure 34】
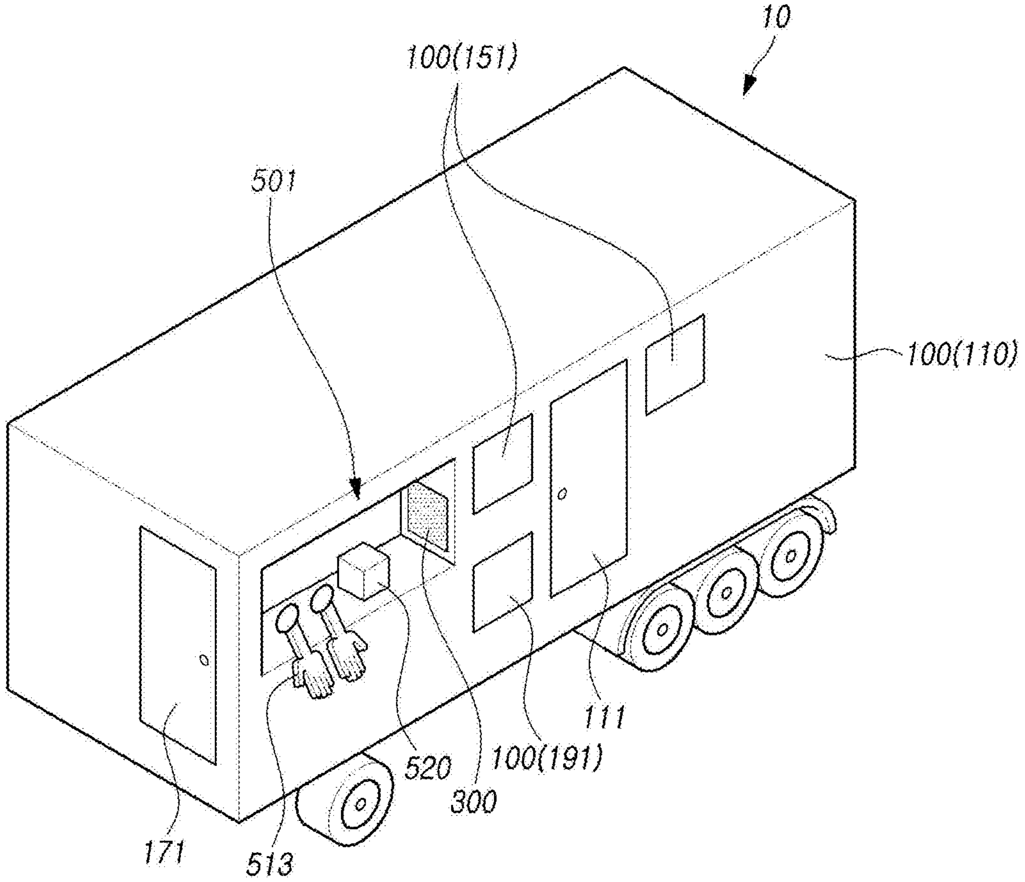

【Figure 35】
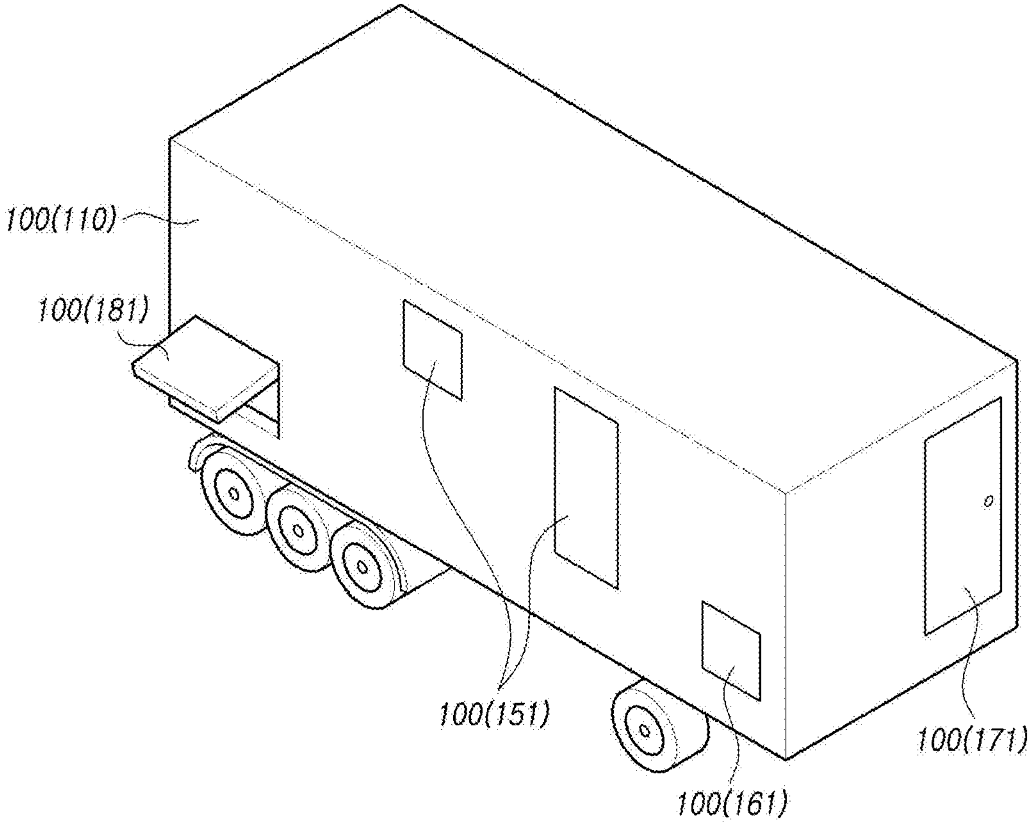

【Figure 36】
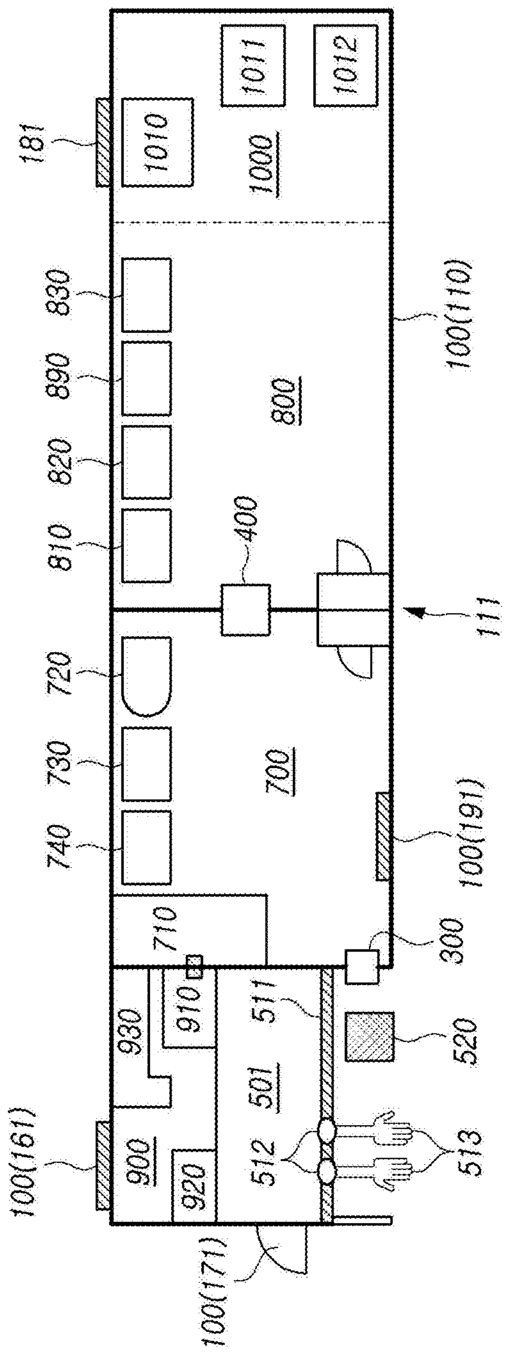

【Figure 37】
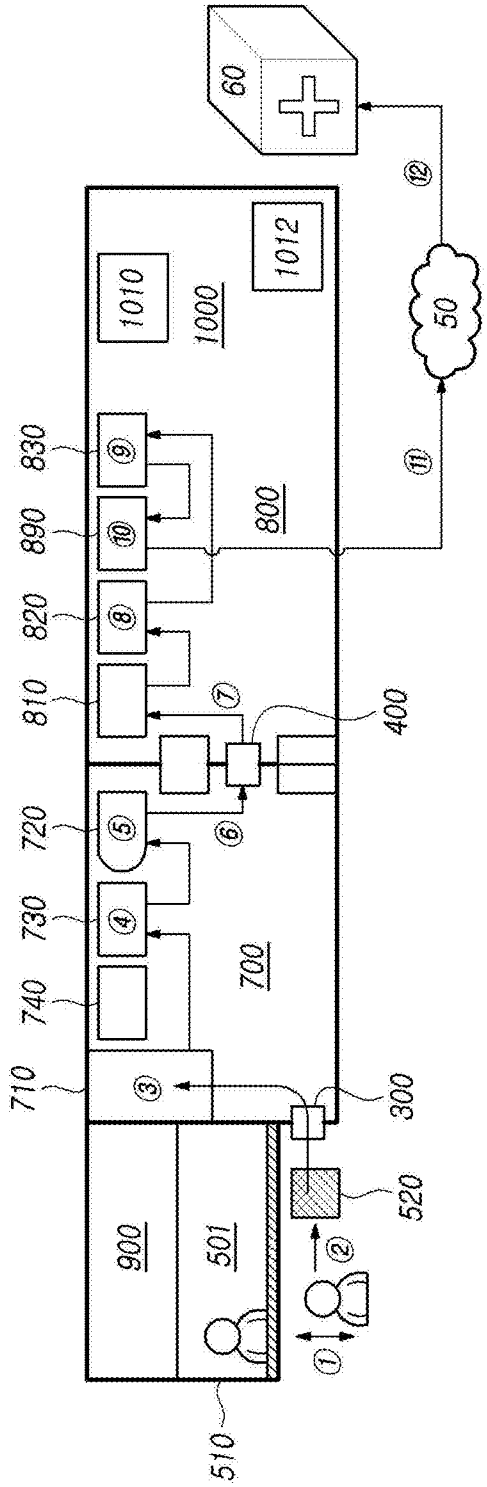

【Figure 38】
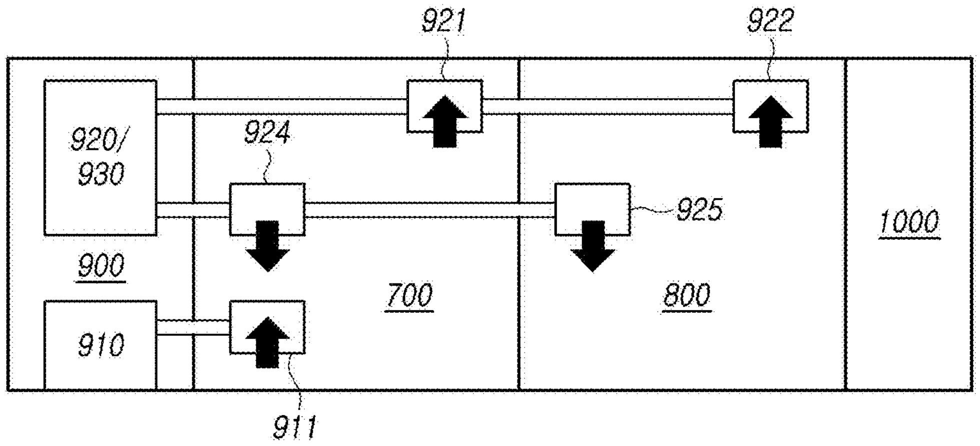
【Figure 39】
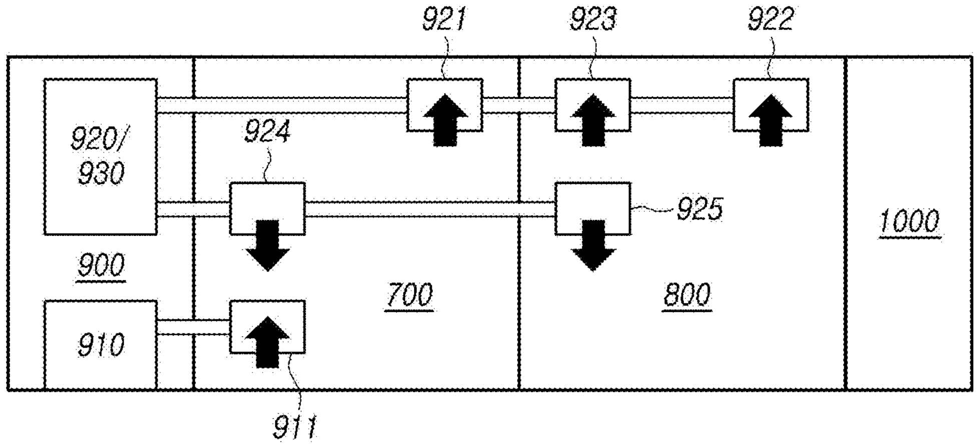

【Figure 40】
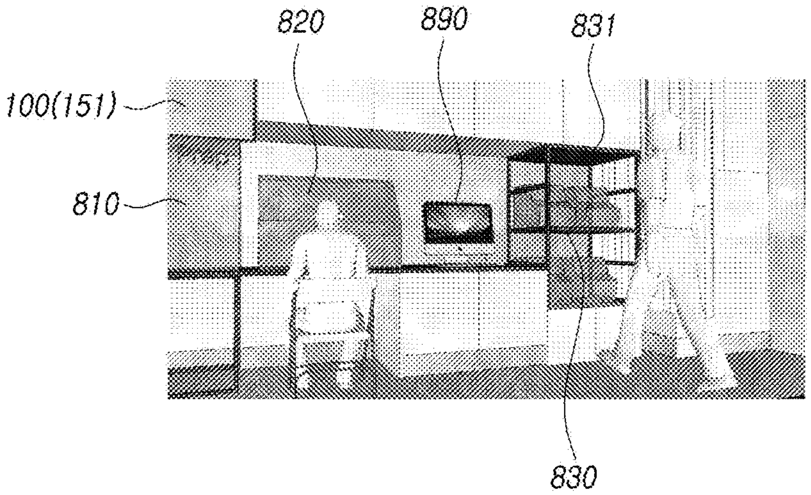

【Figure 41】
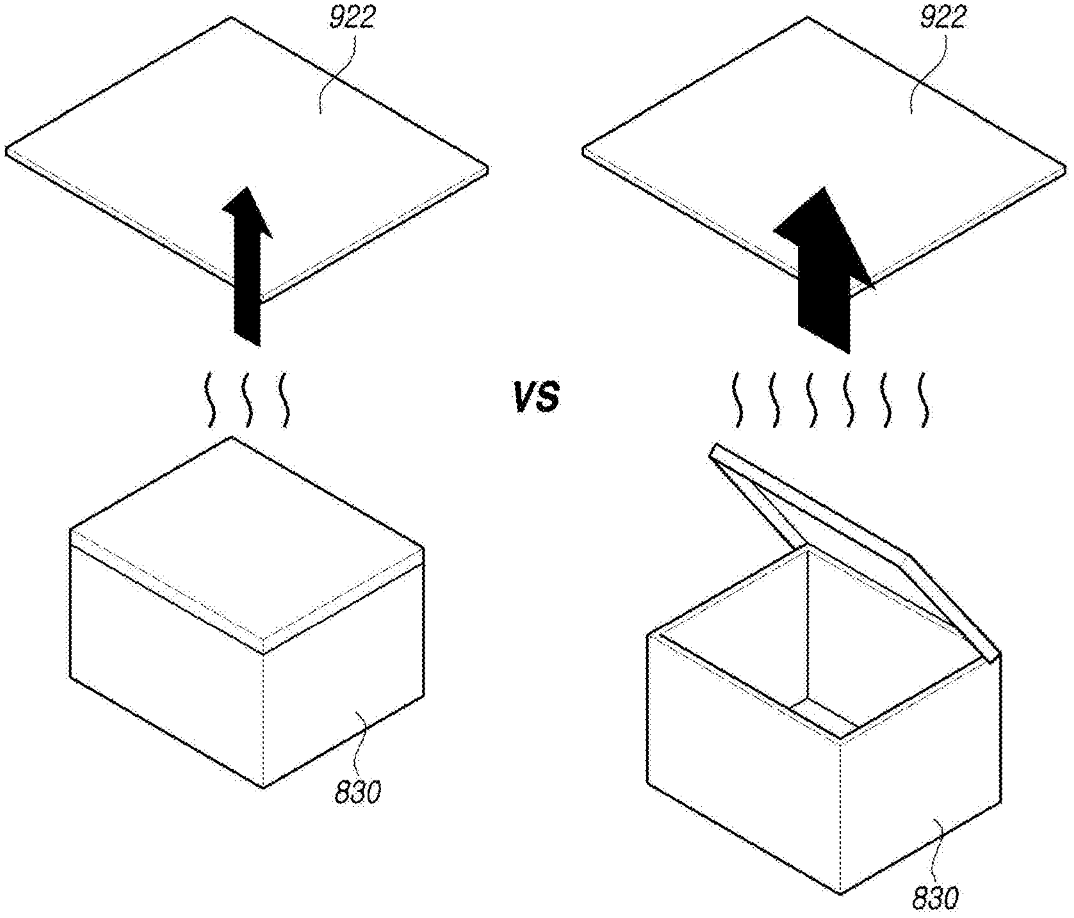

【Figure 42】
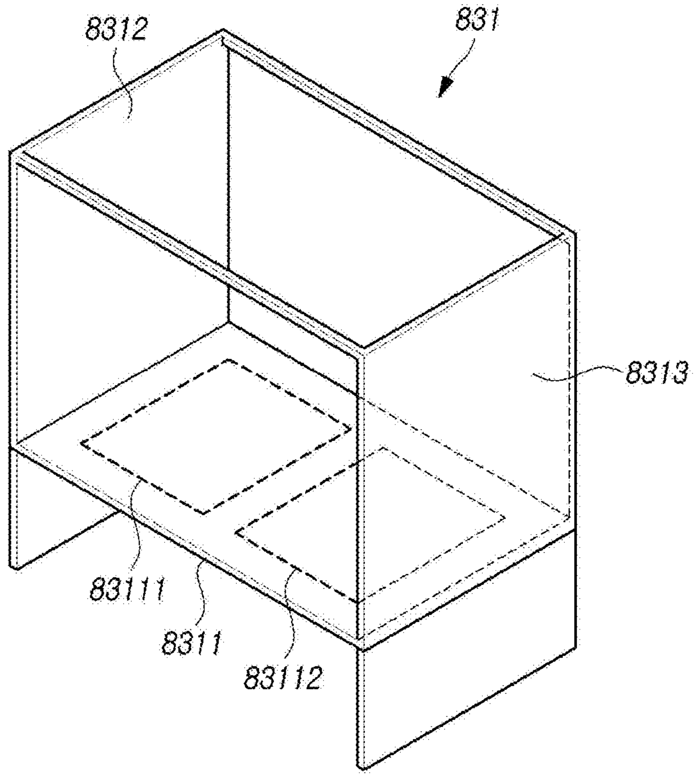

【Figure 43】
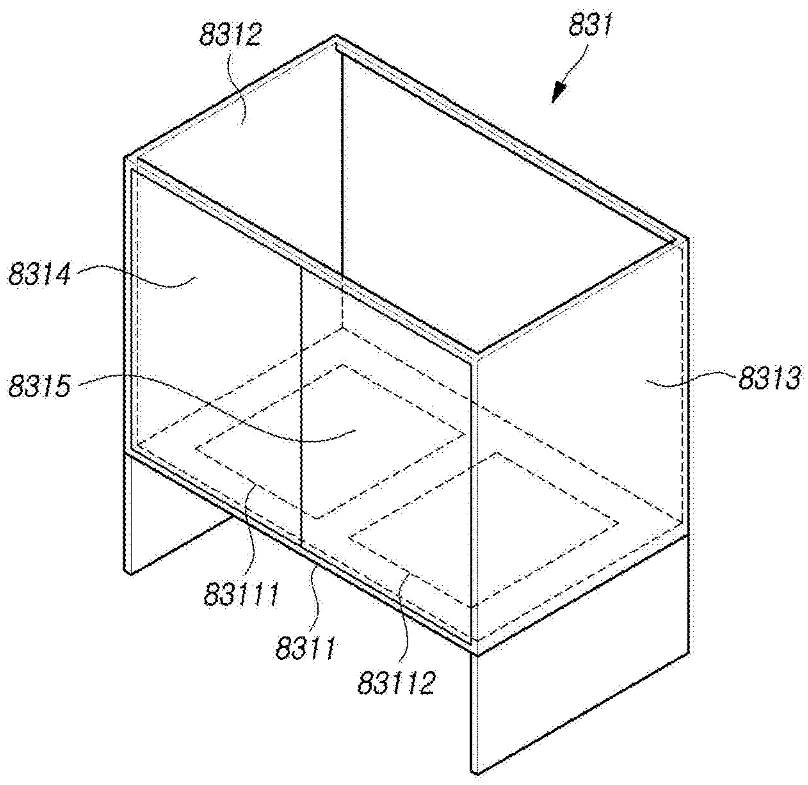

【Figure 44】
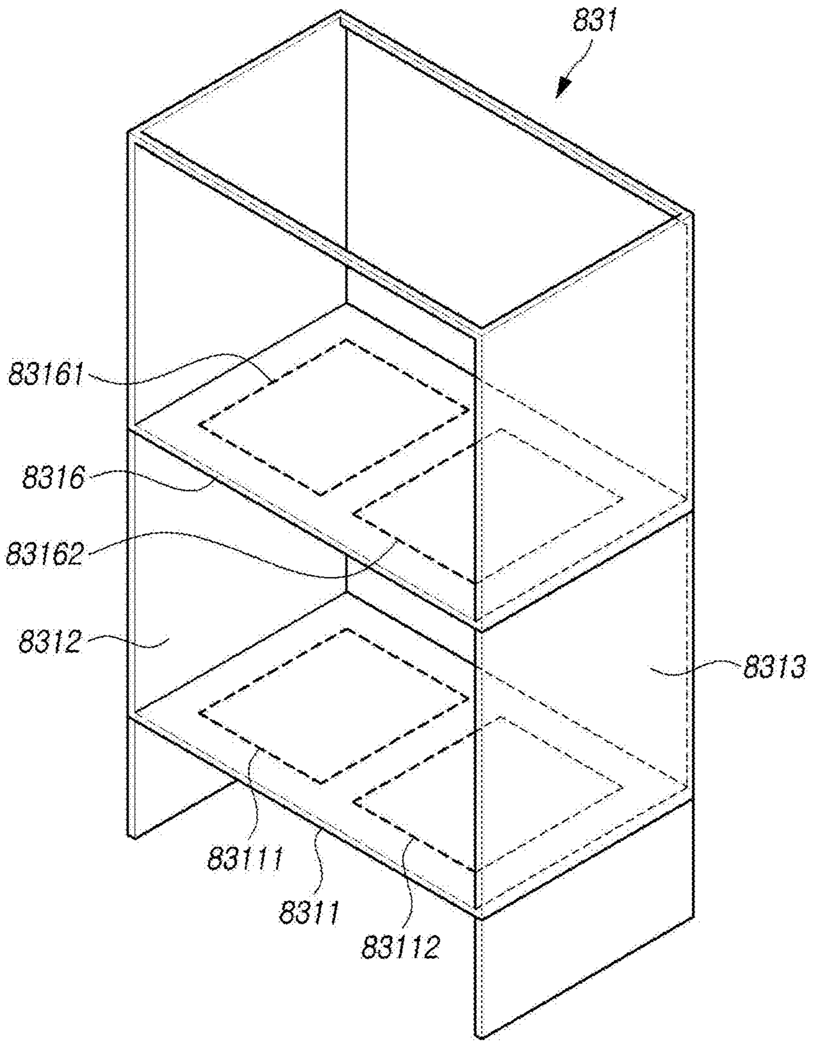

【Figure 45】
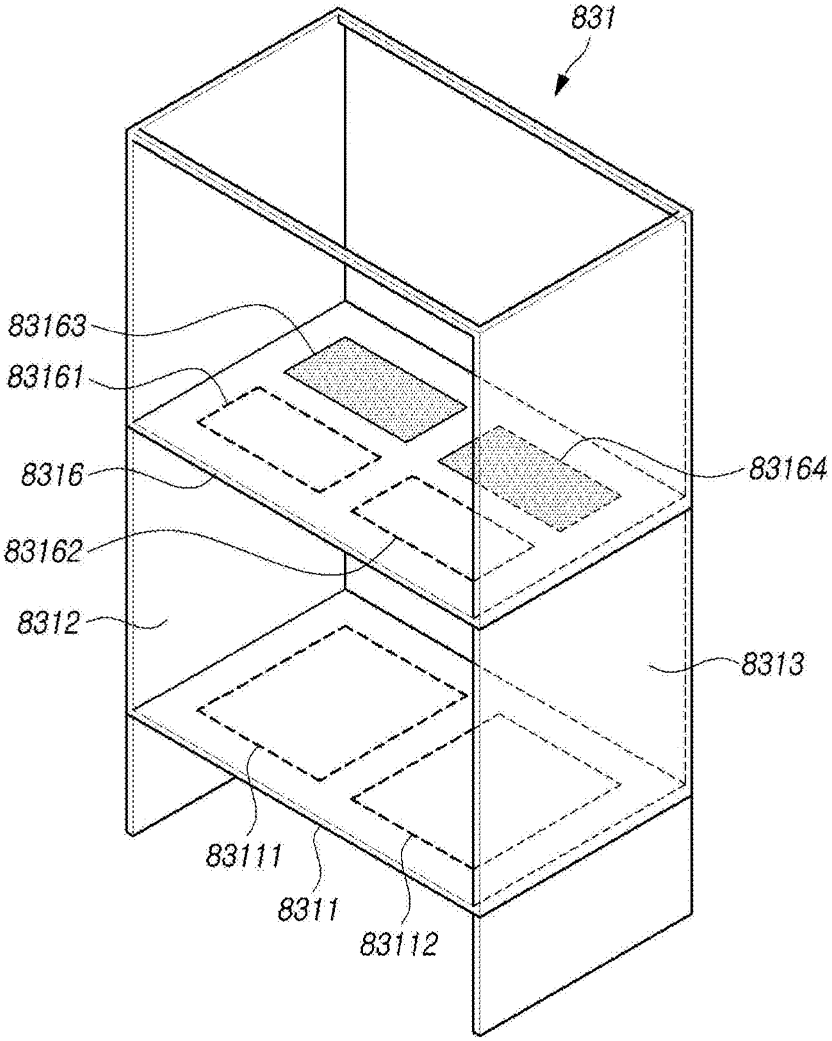

【Figure 46】
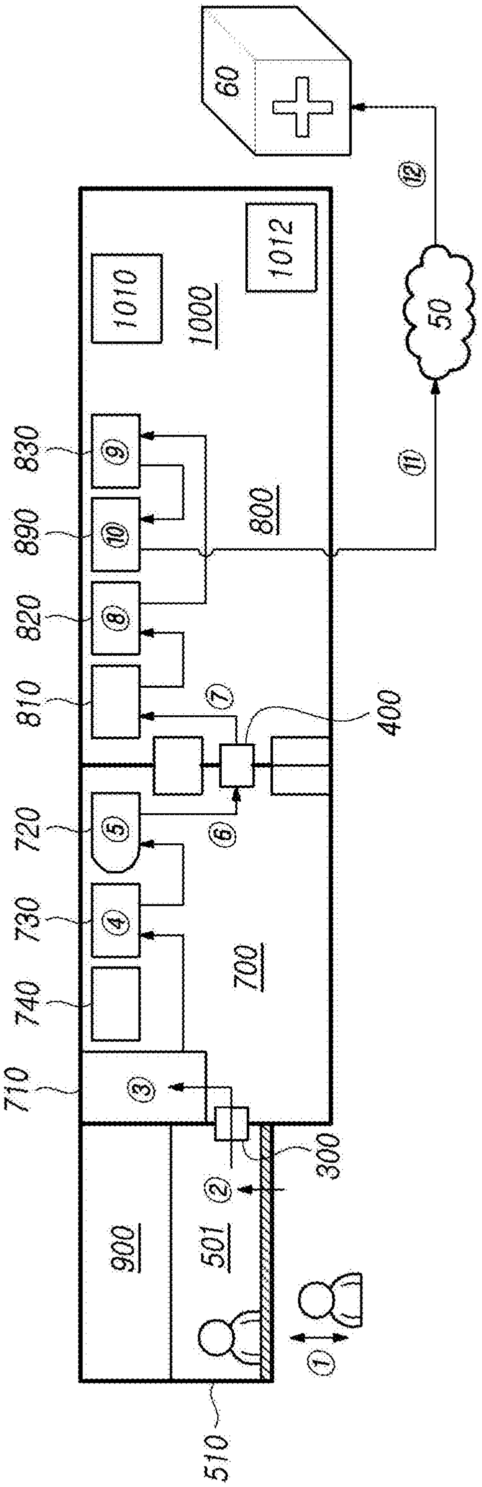

MOBILE DIAGNOSTIC STRUCTURE

CROSS-REFERENCE TO RELATED APPLICATIONS

This application is a national phase application of PCT Application No. PCT/KR2021/020072 filed on Dec. 28, 2021, which claims benefit to Korean Patent Application Nos. 10-2020-0184169 filed on Dec. 28, 2020, 10-2021-0022267 filed on Feb. 19, 2021, and 10-2021-0138198 filed on Oct. 18, 2021. The entire disclosure of the applications identified in this paragraph are incorporated herein by reference.

TECHNICAL FIELD

The disclosure relates to a mobile diagnostic structure.

BACKGROUND ART

The 21st century healthcare paradigm is changing from the era of disease treatment through the era of public health to the era of health life extension through disease prevention and management. With the global trend shifting from therapeutic medicine to the era of preventive medicine, the demand for in vitro diagnostics (IVDs) is increasing significantly. The global aging population and the emergence of novel viruses are another factor in the growth of the in vitro diagnostic market. Further, the treatment methods are also shifting to customized treatment, and the scope of conducting in vitro diagnostics on patients before deciding on treatment or prescription for them is also expanding.

There are various types of in vitro diagnostics. For example, there are immune-based diagnostics based on protein, such as antigen-antibody and nucleic acid-based diagnostics based on nucleic acid, such as DNA or RNA.

Among them, nucleic acid-based diagnostics is the fastest growing field among in vitro diagnostics and plays a key role in the continuity of patient care. Compared with other diagnostic platforms overlapping in disease portfolios, nucleic acid-based diagnostics has the advantages of excellent test precision, compactness of equipment, and rapid processing time.

Such nucleic acid-based diagnostics is performed according to the following steps. First, nucleic acids are extracted from a sample. Next, the extracted nucleic acids are mixed with a reaction solution for nucleic acid detection. Next, it is determined or detected whether a target nucleic acid is present in the mixed result.

These steps are performed by at least one device. For example, the above-described steps may be performed by a dispensing device referred to as a liquid handling device, a nucleic acid extraction device, a setup device, or a nucleic acid detection device.

In each of the above-described steps, the amount of the sample handled by each device and the reagent administered to the sample may be, e.g., several to several hundred ml or, in some cases, several to several hundred 1*l*. Accordingly, each device is designed to perform highly precise/sophisticated movements.

Further, a high degree of professionalism is also required in the process of installing or operating each device. For example, in the process of operating the device, a facility is required to prevent pathogens that may exist in a specific sample from leaking to the outside. Further, to prevent contamination of the sample from external factors, the environment in which these devices are installed also needs to meet certain strict requirements.

DISCLOSURE OF INVENTION

Technical Problem

An object of an embodiment is to allow devices for performing each step of nucleic acid-based diagnostics to be easily deployed and operated anywhere in the world.

However, embodiments of the disclosure are not limited thereto.

Solution to Problem

According to an embodiment, a mobile diagnostic structure comprises a housing including a space therein, a partitioning module partitioning the space to include a preparation room and an analysis room, an inlet module providing an incoming path for a raw sample from an outside to the preparation room, and a transfer module providing a transfer path from the preparation room to the analysis room, for a pretreated sample resulting from pre-treating the raw sample in the preparation room.

The partitioning module may include a barrier unit blocking transfer of the pretreated sample between the preparation room and the analysis room, wherein the pretreated sample is transferred from the preparation room to the analysis room via the transfer module.

The partitioning module may be disposed between the preparation room and the a analysis room and may include an optically transparent unit.

The transfer module may include a door unit configured to open or close an opening for the transfer module, the opening being formed in the partitioning module.

The transfer module may further include an ultraviolet (UV) radiator radiating UV light to the opening for the transfer module, in a state in which the opening for the transfer module is opened by the door unit and/or an air curtain blocking an air flow through the opening for the transfer module between the preparation room and the analysis room.

The transfer module may include a middle chamber providing a predetermined space where the pre-treated sample is to be placed, a preparation room-side door unit configured to open or close a connection passage between the middle chamber and the preparation room and an analysis room-side door unit configured to open or close a connection passage between the middle chamber and the analysis room.

The transfer module may further include a UV radiator configured to radiate UV light to an inside of the middle chamber.

The mobile diagnostic structure may further comprise an air pressure adjustment unit adjusting an internal air pressure of the middle chamber relative to an internal air pressure of the preparation room or an internal air pressure of the analysis room.

The air pressure adjustment unit may adjust the internal air pressure of the middle chamber to be identical to the internal air pressure of the preparation room while the preparation room-side connection passage is opened by the preparation room-side door unit in a state in which the analysis room-side connection passage is blocked by the analysis room-side door unit and adjusts the internal air pressure of the middle chamber to be identical to the internal air pressure of the analysis room while the analysis room-side connection passage is opened by the analysis room-side door unit in a state in which the preparation room-side connection passage is blocked by the preparation room-side door unit.

The air pressure adjustment unit may adjust the internal air pressure of the middle chamber to be lower than the internal air pressure of each of the preparation room and the analysis room while both the preparation room-side connection passage and the analysis room-side connection passage are opened by the preparation room-side door unit and the analysis room-side door unit.

The mobile diagnostic structure may further comprise a door opening/closing control unit controlling at least one of the preparation room-side door unit and the analysis room-side door unit so that while either the preparation room-side connection passage or the analysis room-side connection passage becomes open, the other remains closed.

The inlet module may include a door unit configured to open or close an opening for the inlet module, the opening for the inlet module being formed in the housing.

The inlet module may further include a UV radiator radiating UV light to the opening for the inlet module, in a state in which the opening for the inlet module is opened by the door unit and/or an air curtain blocking an air flow through the opening for the inlet module between the outside and the preparation room.

The inlet module may include a middle chamber providing a predetermined space where the raw sample is to be placed, an outside-side door unit configured to open or close a connection passage between the outside and the middle chamber and a preparation room-side door unit configured to open or close a connection passage between the middle chamber and the preparation room.

The inlet module may further include a UV radiator configured to radiate UV light to an inside of the middle chamber.

The mobile diagnostic structure may further comprise an air pressure adjustment unit adjusting an internal air pressure of the middle chamber relative to an air pressure of the outside or an internal air pressure of the preparation room.

The air pressure adjustment unit may adjust the internal air pressure of the middle chamber to be identical to the internal air pressure of the preparation room while the preparation room-side connection passage is opened by the preparation room-side door unit in a state in which the outside-side connection passage is blocked by the outside-side door unit and adjust the internal air pressure of the middle chamber to be identical to the air pressure of the outside while the outside-side connection passage is opened by the outside-side door unit in a state in which the preparation room-side connection passage is blocked by the preparation room-side door unit.

The mobile diagnostic structure may further comprise a first entrance/exit module providing a first entrance/exit path used when a practioner moves between the outside and the preparation room.

The first entrance/exit module may include a door unit configured to open or close an opening for the first entrance/exit module, the opening for the first entrance/exit module being formed in the housing.

The first entrance/exit module may further include a UV radiator radiating UV light to the opening for the first entrance/exit module, in a state in which the opening for the first entrance/exit module is opened by the door unit and/or an air curtain blocking an air flow through the opening for the first entrance/exit module between the outside and the preparation room.

The first entrance/exit module may include a middle chamber providing a space for the practioner, an outside-side door unit configured to open or close a connection passage between the outside and the middle chamber and a preparation room-side door unit configured to open or close a connection passage between the middle chamber and the preparation room.

The first entrance/exit module may further include a UV radiator configured to radiate UV light to an inside of the middle chamber.

The mobile diagnostic structure may further comprise an air pressure adjustment unit adjusting an internal air pressure of the middle chamber relative to an air pressure of the outside or an internal air pressure of the preparation room.

The air pressure adjustment unit may adjust the internal air pressure of the middle chamber to be identical to the internal air pressure of the preparation room while the preparation room-side connection passage is opened by the preparation room-side door unit in a state in which the outside-side connection passage is blocked by the outside-side door unit and adjust the internal air pressure of the middle chamber to be identical to the air pressure of the outside while the outside-side connection passage is opened by the outside-side door unit in a state in which the preparation room-side connection passage is blocked by the preparation room-side door unit.

The air pressure adjustment unit may adjust the internal air pressure of the middle chamber to be lower than the air pressure of the outside and higher than the internal air pressure of the preparation room while the outside-side connection passage and the preparation room-side connection passage are opened by the outside-side door unit and the preparation room-side door unit.

The incoming path and the first entrance/exit path may be disposed in positions that do not overlap with each other.

The mobile diagnostic structure may further comprise a second entrance/exit module providing a second entrance/exit path used when a practioner transfer moves between the outside and the analysis room.

The second entrance/exit module may include an opening for the second entrance/exit module, the opening for the second entrance/exit module being formed in the housing and a door unit configured to open or close the opening for the second entrance/exit module.

The second entrance/exit module may further include a UV radiator radiating UV light to the opening for the second entrance/exit module, in a state in which the opening for the second entrance/exit module is opened by the door unit and/or an air curtain blocking an air flow through the opening for the second entrance/exit module between the outside and the preparation room.

The second entrance/exit module may include a middle chamber providing a space for the practioner, an outside-side door unit configured to open or close a connection passage between the outside and the middle chamber and an analysis room-side door unit configured to open or close a connection passage between the middle chamber and the analysis room.

The second entrance/exit module may further include a UV radiator configured to radiate UV light to an inside of the middle chamber.

The mobile diagnostic structure may further comprise an air pressure adjustment unit adjusting an internal air pressure of the middle chamber relative to an air pressure of the outside or an internal air pressure of the analysis room.

The air pressure adjustment unit may adjust the internal air pressure of the middle chamber to be identical to the internal air pressure of the analysis room while the analysis room-side connection passage is opened by the analysis room-side door unit in a state in which the outside-side connection passage is blocked by the outside-side door unit and adjust the internal air pressure of the middle chamber to be identical to the air pressure of the outside while the outside-side connection passage is opened by the outside-side door unit in a state in which the analysis room-side connection passage is blocked by the analysis room-side door unit.

The air pressure adjustment unit may adjust the internal air pressure of the middle chamber to be higher than the air pressure of the outside and lower than the internal air pressure of the analysis room while the outside-side connection passage and the analysis room-side connection passage are opened by the outside-side door unit and the analysis room-side door unit.

The incoming path and the second entrance/exit path may be disposed in positions that do not overlap with each other when seen in a top of the mobile diagnostic structure.

The first entrance/exit module and the second entrance/exit module may be provided in the preparation room and the second entrance/exit module is provided in the analysis room and the first entrance/exit module and the second entrance/exit module are disposed to contact each other with the partitioning module interposed therebetween.

A raw sample unpacking unit, a first dispensing device, and a nucleic acid extraction device may be disposed in the preparation room, and a second dispensing device, an additional working device, and an analysis device are disposed in the analysis room. The mobile diagnostic structure may further comprise a calibration notification unit indicating that calibration is needed for at least one of the raw sample unpacking unit, the first dispensing device, the nucleic acid extraction device, the second dispensing device, the additional working device, and the analysis device when a predetermined condition is met.

The mobile diagnostic structure may further comprise a vibration detection module configured to detect a vibration transferred to at least one of the preparation room and the analysis room. The calibration notification unit may be configured to determine whether the condition is met based on at least one of a magnitude of the detected vibration and duration during which the vibration is detected or not detected.

The mobile diagnostic structure may further comprise a suction unit disposed above a detection device disposed in the analysis room. Air from the detection device may be sucked into the suction unit.

The suction unit may be disposed vertically above the detection device.

The air sucked into the suction unit may include air used for cooling the detection device while an internal space of the detection device is closed to the analysis room and air discharged from the internal space while the internal space of the detection device is open to the analysis room.

A relatively large amount of the air may be sucked into the suction unit while the internal space of the detection device is opened to the analysis room, as compared with while the internal space of the detection device is closed to the analysis room.

The mobile diagnostic structure may further comprise an air-conditioning unit for adjusting temperature and/or humidity for the air in the detection room.

The mobile diagnostic structure may further comprise a rack installed in a placement position of the detection device and where the detection device is disposed. The rack may include a first mounting plate on which the detection device is mounted and a side wall surrounding at least a portion of a side surface of the detection device so that a flow of air discharged from the detection device is guided to the suction unit.

The rack may further include a front wall surrounding at least a portion of a front surface of the detection device so that the flow of air discharged from the detection device is guided to the suction unit.

The rack further may include a second mounting plate disposed vertically above the first mounting plate and where an additional detection device is mounted. The side wall may surround at least a portion of a side surface of the additional detection device to guide a flow of air dischargeable from the additional detection device.

The second mounting plate may include a support for supporting the additional detection device and a predetermined opening. The air of the detection device mounted on the first mounting plate may pass through the opening and be sucked into the suction unit.

A sample-collecting room may further provided in the space. A sample-collecting practioner positioned in the sample-collecting room may conduct sample collecting on a sample provider outside the housing inlet module.

The sample-collecting room may be provided in the preparation room so that the sample-collecting practioner travels between the sample-collecting room and the preparation room.

The space may be partitioned into partitioning module the sample collecting room, the preparation room, and the analysis room by the partitioning module.

The mobile diagnostic structure may further comprise a glove wall disposed between the sample-collecting room and a space in which the sample provider stays when the sampling collecting is conducted. The glove wall may include a glove wearable on the sample-collecting practioner's arm.

The mobile diagnostic structure may further comprise a temporary sample storage unit temporarily storing at least one raw sample including a raw sample taken from the sample provider. The temporary sample storage unit may be disposed in the space where the sample provider stays.

The temporary sample storage unit may include a door configured to open or close an inside, an UV radiator configured to radiate UV light to a tube containing each of the at least one raw sample while the inside is closed by the door, and a disinfectant spray unit configured to spray a disinfectant to the tube.

According to an embodiment, a mobile diagnostic structure comprises a housing including a space therein, a partitioning module partitioning the space to include a sample collecting room, a preparation room and analysis room, a first transfer module providing a first transfer path from the sample-collecting room to the preparation room for a raw sample, which is sampled in the sample-collecting room, and a second transfer unit providing a second transfer path from the preparation room to the analysis room for a pre-treated sample which is a result of pre-treating the raw sample in the preparation room.

A vehicle for diagnosis may comprise the above-described mobile diagnostic structure and a vehicle connected with the mobile diagnostic structure.

The vehicle may be a vibration-free vehicle.

Advantageous Effects of Invention

According to an embodiment, even in an area where no equipment or environment for nucleic acid-based diagnostics is provided, nucleic acid-based diagnostics may be performed through a mobile diagnostic structure. Accordingly, detection for a specific disease or illness may be performed anywhere in the world or throughout the country without missing areas. Thus, not only may the overall monitoring of a specific disease or illness be easy, but also preventive measures may be thoroughly established in case of an outbreak of an infectious disease.

Further, the incoming path through which the raw sample obtained from the sample provider enters the mobile diagnostic structure and the movement path for the practioner who handles the raw sample do not overlap with each other when seen in a top view of the mobile diagnostic structure. As the incoming path and the movement path do not overlap with each other, the possibility of cross-infection between the raw sample and the practioner may be reduced.

Further, between the preparation room in which pretreatment is performed on the raw sample and the analysis room in which analysis is performed on the pre-treated sample, the sample is transferred by a transfer module, not a person. Thereby, the risk of contamination or infection may be minimized by minimizing air transfer or pathogen transfer between the rooms.

Further, a calibration alarm is generated for the devices installed inside the mobile diagnostic structure periodically or whenever an event occurs. Thus, the nucleic acid-based diagnostic devices designed to perform highly sophisticated/precise movements may be managed in the optimal state, thus leading to precise nucleic acid-based diagnosis results.

Further, the air from the detection device disposed in the analysis room may contain pathogens. The pathogens may be sucked through the suction unit disposed above the detection device. Accordingly, it is possible to prevent or reduce the spread of pathogens in the analysis room.

BRIEF DESCRIPTION OF DRAWINGS

FIG. 1 conceptually illustrates a situation which local hub organizations for performing nucleic acid-based diagnosis are located only in some of a plurality of areas, and no local hub organization is located in the remaining areas and a situation in which the results of diagnosis obtained by the local hub organizations located in some areas are transferred to a central control organization.

FIG. 2 conceptually illustrates a situation in which mobile diagnostic structures according to a first embodiment are deployed in the remaining areas of FIG. 1.

FIG. 3 is a perspective view illustrating an outer appearance of a mobile diagnostic structure according to the first embodiment.

FIGS. 4 and 5 are left side views of an outer appearance of the mobile diagnostic structure according to the first embodiment.

FIGS. 6 and 7 are right side views of an outer appearance of the mobile diagnostic structure according to the first embodiment.

FIGS. 8, 9, 10, and 11 are views illustrating an internal structure of a mobile diagnostic structure.

FIG. 12 is a view illustrating a negative pressure placement in an inner space of a mobile diagnostic structure.

FIG. 13 is a perspective view illustrating an opening for inlet module formed in a housing of the mobile diagnostic structure according to the first embodiment and an inlet module disposed in the opening for inlet module.

FIG. 14 is another perspective view illustrating the inlet module disposed in the opening for inlet module of the mobile diagnostic structure according to the first embodiment.

FIG. 15 is a concept view illustrating a configuration of a door open/close adjusting unit for adjusting the opening/closing of a door in an inlet module.

FIG. 16 is a perspective view illustrating an opening for transfer module prepared in a barrier unit of a partitioning module and a transfer module disposed in the opening for transfer module in the mobile diagnostic structure according to the first embodiment.

FIG. 17 is another perspective view illustrating an opening for transfer module prepared in a barrier unit of a partitioning module and a transfer module disposed in the opening for transfer module in the mobile diagnostic structure according to the first embodiment.

FIG. 18 is a table illustrating examples of inner air pressure in a middle chamber of a transfer module adjusted by an air pressure adjustment unit.

FIG. 19 is a concept view illustrating a configuration of a door open/close adjusting unit for adjusting the opening/closing of a door in a transfer module.

FIG. 20 is a concept view illustrating additional components included in the mobile diagnostic structure according to the first embodiment.

FIG. 21 conceptually illustrates a path where a sample is processed in the mobile diagnostic structure according to the first embodiment.

FIGS. 22, 23, 24, 25, 26, and 27 are virtual snapshots for situations which may occur in a mobile diagnostic structure.

FIG. 28 is a flowchart illustrating the flows of FIG. 21.

FIGS. 29, 30, and 31 are perspective views illustrating an inner structure of a mobile diagnostic structure according to a second embodiment.

FIG. 32 is a plan, cross-sectional view illustrating an inner structure of the mobile diagnostic structure according to the second embodiment.

FIG. 33 is a perspective view illustrating an outer appearance of a mobile diagnostic structure according to a third embodiment.

FIGS. 34 and 35 are left and right side views of an outer appearance of the mobile diagnostic structure according to the third embodiment.

FIG. 36 is a plan view illustrating an inner structure of a mobile diagnostic structure.

FIG. 37 conceptually illustrates a path where a sample is processed in the mobile diagnostic structure according to the third embodiment.

FIG. 38 conceptually illustrates a structure of an air-conditioning system in a mobile diagnostic structure according to a fourth embodiment.

FIG. 39 conceptually illustrates a structure of an air-conditioning system implemented in a different manner from that shown in FIG. 38.

FIG. 40 conceptually illustrates an example in which the amount of air sucked by a suction unit of an air-conditioning system according to the fourth embodiment is varied depending on whether an opening/closing unit of an analysis device is opened.

FIG. 41 is a view illustrating an outer appearance of a rack and an analysis device mounted on the rack in the mobile diagnostic structure according to the fourth embodiment.

FIG. 42 is a perspective view illustrating a rack according to an example, in the mobile diagnostic structure according to the fourth embodiment.

FIG. 43 is a perspective view illustrating a rack according to another example, in the mobile diagnostic structure according to the fourth embodiment.

FIG. 44 is a perspective view illustrating a rack according to another example, in the mobile diagnostic structure according to the fourth embodiment.

FIG. 45 is a perspective view illustrating a rack according to another example, in the mobile diagnostic structure according to the fourth embodiment.

FIG. 46 conceptually illustrates a path where a sample is processed in the mobile diagnostic structure according to a fifth embodiment.

MODE FOR THE INVENTION

Advantages and features of the disclosure, and methods for achieving the same may be apparent from the embodiments described below with reference to the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims.

When determined to make the subject matter of the disclosure unclear, the detailed description of known functions or configurations may be skipped. The terms described below are defined considering the functions in embodiments of the disclosure and may be replaced with other terms according to the intention or practice of the user or operator. Therefore, the terms should be defined based on the overall disclosure.

First, the analyte is an antigen, antibody, enzyme or nucleic acid.

Next, the sample refers to a material that contains, or is presumed to contain, the above-described analyte. A target for analysis or detection is whether the analyte is contained in such a sample.

Meanwhile, the above-described sample includes a biological sample or a non-biological sample.

The biological sample includes at least one of viruses, bacteria, tissues, cells, blood (including whole blood, plasma and serum), lymph, bone marrow fluid, sputum, swab, aspiration, bronchial lavage fluid, and bronchial effusion lavage fluid, nasal lavage fluid, milk, urine, feces, eye fluid, saliva, semen, brain extract, spinal fluid (SCF), joint fluid, appendix, spleen and tonsil tissue extract, amniotic fluid and ascites, but is not limited thereto.

In contrast, the non-biological sample may include at least one of, e.g., food, water and soil.

Meanwhile, at least one of a pre-treatment task, a nucleic acid extraction task, a setup task, and an analysis task may be sequentially performed on the sample.

Among them, the pre-treatment task may include an unpacking task and a deactivation task. The unpacking task refers to a task of unpacking the container that packs the sample. Further, the deactivation task refers to a task that lowers or removes the activity level of the sample in the active state.

Next, the nucleic acid extraction task refers to a task for extracting nucleic acids from a sample. This nucleic acid extraction task may be performed in various manners. For example, the nucleic acid extraction task may be conducted by anyone, or a combination of two or more, of a scheme using a cell lysis solution, a scheme using heating without using a cell lysis solution, a scheme using a separate enzyme (PKase), and a scheme of treating using a separate chemical.

Next, the setup task refers to a task of preparing a reagent or the like for detecting a nucleic acid. For example, the setup task may include, but is not limited to, a task for mixing a reagent necessary for detection of a nucleic acid with the sample or a task for IC or PC.

Next, the analysis task includes a task of detecting a signal that is generated depending on the amount of nucleic acids present in the sample. Such an analysis task may include a genetic analysis process, such as PCR, real-time PCR, or microarray.

Here, the aforementioned signal may include an optical signal. Further, there are known various methods or tasks for detecting such an optical signal. TaqMan™ probe method (U.S. Pat. No. 5,210,015), molecule beacon method (Tyagi et al., Nature Biotechnology v. 14 Mar. 1996), Scorpion method (Whitcombe et al., Nature Biotechnology 17:804-807(1999)), Sunrise or Amplifluor method (Nazarenko et al., 2516-2521 Nucleic Acids Research, 25(12):2516-2521 (1997), and U.S. Pat. No. 6,117,635), Lux method (U.S. Pat. No. 7,537,886), CPT (Duck P, et al. Biotechniques, 9:142-148(1990)), LNA method (U.S. Pat. No. 6,977,295), Plexor method (Sherrill C B, et al., Journal of the American Chemical Society, 126:4550-4556(2004)), Hybeacons™ (D. J. French, et al., Molecular and Cellular Probes (2001) 13, 363-374 and U.S. Pat. No. 7,348,141), Dual-labeled, selfquenched probe; U.S. Pat. No. 5,876,930), hybridization probe (Bernard P S, et al., Clin Chem 2000, 46, 147-148), PTOCE (PTO cleavage and extension) method (WO 2012/096523), PCE-SH (PTO Cleavage and Extension-Dependent Signaling Oligonucleotide Hybridization) method (WO 2013/115442), PCE-NH (PTO Cleavage and Extension-Dependent Non-Hybridization) method (PCT/KR2013/012312) and CER method (WO 2011/037306).

Next, before the detection task described above is performed, a nucleic acid amplification reaction according to various methods may be performed according to an embodiment. For example, known amplification methods include the polymerase chain reaction (PCR), ligase chain reaction (LCR) (U.S. Pat. Nos. 4,683,195 and 4,683,202; PCR Protocols: A Guide to Methods and Applications (Innis et al., eds, 1990)), strand displacement amplification (SDA)) (Walker, et al. Nucleic Acids Res. 20(7):1691-6 (1992); Walker PCR Methods Appl 3(1):1-6 (1993)), transcription-mediated amplification (Phyffer, et al., J. Clin. Microbiol. 34:834-841 (1996); Vuorinen, et al., J. Clin. Microbiol. 33:1856-1859 (1995)), nucleic acid sequence-based amplification (NASBA) (Compton, Nature 350(6313):91-2 (1991)), rolling circle amplification (RCA) (Lisby, Mol. Biotechnol. 12(1):75-99 (1999); Hatch et al., Genet. Anal. 15(2):35-40 (1999)) and Q-beta Replicase (Lizardi et al., Biol Technology 6:1197 (1988)).

In particular, a nucleic acid amplification reaction including a change in temperature may be performed. In such a nucleic acid amplification method, a cycle including a denaturing step, an annealing step, and an extension (or amplification) step may be repeatedly performed dozens of times.

Meanwhile, raw sample refers to a sample from the time it is obtained from the sample provider to just before the aforementioned pre-treatment task is performed. The raw sample may be packed in a container, such as a tube, and in this case, a preservative for preservation of the raw sample or a deactivator for deactivation of the raw sample may be included in the tube according to an embodiment.

Next, pre-treated sample may refer to a sample from after the above-described pretreatment task is performed to just before the above-described setup task is performed, that is, a sample in the pre-treatment task and the nucleic acid extraction task. In this case, analysis sample may refer to a sample from after the above-described setup task is performed to when the above-described analysis task is completed, that is, a sample in the setup task and the analysis task.

Next, space refers to a space in which various tasks, i.e., a pre-treatment task or an analysis task, are performed on the sample. Such space may include a sample-collecting room and a sample treatment space. The sample treatment space may include a preparation room, an analysis room, a first auxiliary room, and a second auxiliary room.

In the sample collecting room, sampling from a sample provider is performed by a sample-collecting practioner.

The sample-collecting room is isolated by a glove wall and a housing, which are described below, so that air is not introduced from the outside, in particular, the place where the sample provider stays. Thus, the possibility that the sample-collecting practioner is infected with the viruses or bacteria likely to be present in the sample provider is very low. Therefore, the sample-collecting practioner may safely collect a sample while wearing only a mask and a simple gown, without needing to wear a full body protective suit.

Meanwhile, the sample taken from the sample provider is packed by the sample-collecting practioner before being transferred to the preparation room. Further, the sample packed in this way is not introduced into the sample-collecting room but, as described below, is instead temporarily stored or mounted in a temporary sample storage unit and then transferred to the preparation room through the inlet module.

Next, in the preparation room, the above-described pre-treatment task and nucleic acid extraction task are performed and, in the analysis room, the setup task and analysis task are performed. In addition, in some cases, some of the setup task may be performed in the preparing room, and the rest of the setup task (e.g., mixing IC or PC) may be performed in the analysis room.

In this case, the preparation room is sealed from the outside and other spaces. Further, the internal air pressure of the preparation room may be adjusted relative to the external air pressure or the internal air pressure of the analysis room, which is described below. For example, the internal air pressure of the preparation room may be a negative pressure compared to the external air pressure and the internal air pressure of the analysis room to be described below while the above-described pre-treatment task is performed, and at other times, it may be equal to the external air pressure. However, embodiments of the disclosure are not limited thereto.

Further, the internal air pressure of the analysis room may be adjusted relative to the external air pressure or the internal air pressure of the preparation room, which is described below. For example, the internal air pressure of the analysis room may be a positive pressure compared to the internal air pressure of the preparation room, but embodiments of the disclosure are not limited thereto.

Further, the first auxiliary room and the second auxiliary room refer to spaces other than the above-described preparation room and the analysis room in the spaces. In the first and second auxiliary rooms, devices providing constant temperature/humidity functions may be placed in the preparation room and the analysis room. Devices for providing power or negative pressure to the devices placed may be placed in the preparation room or analysis room. Other various devices or components not mentioned above may be placed in the first and second auxiliary rooms.

Unlike described above, the pre-treated sample may refer to a sample from after the above-described pre-treatment task is performed to just before the above-described analysis task is performed, that is, a sample in the pre-treatment task, the nucleic acid extraction task, and the setup task. In this case, the analysis sample may refer to a sample from after the above-described analysis task is performed to when the analysis task is completed. In this case, the above-described pre-treatment task, nucleic acid extraction task, and setup task are performed in the preparation room, and the analysis task is performed in the analysis room. In addition, in some cases, some of the setup task may be performed in the preparing room, and the rest of the setup task (e.g., mixing IC or PC) may be performed in the analysis room.

Alternatively, the pre-treated sample may refer to a sample from after the above-described pre-treatment task is performed to when the pre-treatment task is completed, that is, a sample in the pre-treatment task. In this case, the analysis sample may refer to a sample from after the above-described nucleic acid extraction task is performed to when the setup task and the analysis task are completed. In this case, the above-described pre-treatment task is performed in the preparation room, and in the analysis room, the nucleic acid extraction task, setup task, and analysis task are performed.

Hereinafter, embodiments of the disclosure are described with reference to the drawings. The following description is applicable not only to nucleic acid-based diagnostics but also to immune-based diagnostics and other in vitro diagnostics.

FIG. 1 conceptually illustrates a situation which local hub organizations 60 for performing nucleic acid-based diagnosis are located only in some areas 1 to 5 of a plurality of areas 1 to 7, and no local hub organization 60 is located in the remaining areas 6 and 7 and a situation in which the results of diagnosis obtained by the local hub organizations 60 located in some areas 1 to 5 are transferred or transmitted to a central control organization 40.

Here, the areas 1 to 7 may be predetermined areas (e.g., administrative districts) belonging to the same or different countries. Further, the local hub organization 60 refers to a hospital or clinic that is equipped with apparatus and environment for nucleic acid-based diagnostics. Further, the central control organization 40 refers to a hospital, clinic or national organization that collects and manages the results of detection performed in each local hub organization 60.

Referring to FIG. 1, the above-described local hub organizations 60 are deployed only in some areas 1 to 5 of the plurality of separated areas 1 to 7. Specifically, people or animals (hereinafter referred to as 'organisms') residing in each area 1 to 5 may receive nucleic acid-based diagnostics in the local hub organization 60 located in the area. The results obtained by performing nucleic acid-based diagnostics in the local hub organization 60 are transferred to the central control organization 40 shown in FIG. 1. The transfer of the results may be performed by network, post, hand, or car.

On the contrary, no local hub organization 60 is located in the remaining areas 6 and 7 among the plurality of separated areas 1 to 7. Organisms residing in these remaining areas 6 and 7 may not be provided with nucleic acid-based diagnostics in those areas. The organisms residing in the remaining areas 6 and 7 move to the areas 1 to 5 where the local hub organizations 60 are deployed in order to be provided with nucleic acid-based diagnostics.

However, this 'interregional movement' may cause infection between areas. Further, if the distance between areas is long, such movement itself may be burdensome in terms of time and cost for the organism.

Therefore, there is a need for a method that allows organisms residing in the above-described remaining areas 6 and 7 to be provided with nucleic acid-based diagnostics in the area in which they reside, without moving to another area.

FIG. 2 conceptually illustrates a situation in which mobile diagnostic structures 10 according to a first embodiment are deployed in the remaining areas 6 and 7 of FIG. 1.

Referring to FIG. 2, local medical organizations 60 are deployed in some areas 1 to 5 among a plurality of areas 1 to 7 as in the case of FIG. 1. However, in FIG. 2, unlike in FIG. 1, a mobile diagnostic structure 10 is located in the remaining areas 6 and 7.

The mobile diagnostic structure 10 refers to a structure that is equipped with apparatus and environment for nucleic acid-based diagnostics. The mobile diagnostic structure 10 may be connected to a vehicle to be movable. If the mobile diagnostic structure 10 is moved and deployed in the areas 6 and 7 where a local hub organization 60 is not located, the organisms residing in the areas 6 and 7 are able to be provided with nucleic acid-based diagnostics in the area they reside, without the need for moving to another area.

In other words, according to the first embodiment, even in an area where no equipment or environment for nucleic acid-based diagnostics is provided, nucleic acid-based diagnostics may be performed in the mobile diagnostic structure 10. Accordingly, detection for a specific disease or illness may be performed anywhere in the world or throughout the country without missing areas. Thus, not only may the overall monitoring of a specific disease or illness be easy, but also preventive measures may be thoroughly established in case of an outbreak of an infectious disease.

The outer appearance of the mobile diagnostic structure 10 is described below.

FIG. 3 is a perspective view illustrating an outer appearance of a mobile diagnostic structure 10 according to the first embodiment. FIGS. 4 and 5 are left side views of an outer appearance of the mobile diagnostic structure 10 according to the first embodiment. FIGS. 6 and 7 are right side views of an outer appearance of the mobile diagnostic structure 10 according to the first embodiment.

Referring to FIG. 3, the mobile diagnostic structure 10 is connectable to a vehicle 20. To that end, each of the mobile diagnostic structure 10 and the vehicle 20 may have a structure, such as a coupler for coupling each other. In this case, the vehicle 20 may be a vibration-free vehicle.

Further, referring to FIGS. 4 to 7 together with FIG. 3, the mobile diagnostic structure 10 may include a housing 100 having a space therein. The housing 100 may include a steel structure unit 110. The steel structure unit 110 may include a material, such as steel as well as an antibacterial or antiviral component. Due to this material, pathogens that may exist inside the housing 100 cannot pass through the housing 100 to the outside, and vice versa.

Further, a solar panel (not shown) may be disposed on the housing 100, and in this case, a photovoltaic unit (not shown) may be disposed inside the housing 100. Power generated through sunlight may be provided to the devices disposed inside the mobile diagnostic structure 10 through the solar panel and the photovoltaic unit.

Further, a plurality of openings are formed in the housing 100. Various components for certain purposes are individually disposed in the openings.

For example, an inlet module 300 may be disposed in any one of the plurality of openings provided in the housing 100. The inlet module 300 is a component providing an incoming path from outside of the mobile diagnostic structure to the preparation room for the raw sample. Various embodiments of the inlet module 300 and the structure of each of the various embodiments are described below in more detail.

Further, in any one of the plurality of openings, a first entrance/exit module 500, a second entrance/exit module 600, at least one window unit 151, a door unit 161 for outdoor, a door unit 171 for the first auxiliary room, a door unit 181 for the second auxiliary room, and a door unit 191 for waste withdrawal may be disposed.

The first entrance/exit module 500 is a component used when a practioner moves between the outside and the preparation room. Hereinafter, the moving line along which the practioner move through the first entrance/exit module 500 is referred to as a first entrance/exit path. Meanwhile, a specific embodiment of the first entrance/exit module 500 is described below in greater detail.

The second entrance/exit module 600 is a component used when a practioner moves between the outside and the analysis room. Hereinafter, the moving line along which the practioners move through the second entrance/exit module 600 is referred to as a second entrance/exit path. Meanwhile, a specific embodiment of the second entrance/exit module 500 is described below in greater detail.

The window unit 151 denotes a window formed of optically transparent glass. At least one window unit may be disposed as shown. Through this window 151, the practioner in the housing 100 may check the external situation. Further, the window portion 151 enables light to come into the inside of the housing 100. At least one window unit 151 may be disposed on the side of the above-described preparation room, and at least one window unit 151 may be disposed on the side of the above-described analysis room. In this case, the size and shape of each window unit 151 may be different from those of another, as illustrated, but are not limited to those shown in the drawings.

The door unit 161 for outdoor unit is a door for an outdoor unit to be disposed in the second auxiliary room. The door unit 161 for outdoor unit is opened when the outdoor unit operates. The heat or moisture in the preparation room 700 and the analysis room 800, sucked by the outdoor unit 920, may be discharged to the outside through the open opening.

The door unit 171 for the first auxiliary room is a component used for entry and exit of a person or a specific object between the first auxiliary room and the outside, and the door unit 181 for the second auxiliary room is a component used for entry and exit of a person or a specific object between the second auxiliary room and the outside. Each of the door unit 171 for the first auxiliary room and the door unit 181 for the second auxiliary room may be a swing door or a sliding door but is not limited thereto.

The door unit 191 for waste withdrawal is a component used to withdraw the waste created in the preparation room to the outside. Various types of wastes, such as wastes created by unpacking the raw sample, pipette tips, or swabs, may be withdrawn to the outside from the preparation room through the door unit 191 for waste withdrawal.

The configuration of the door unit 191 for waste withdrawal is described below in greater detail. The door unit 191 for waste withdrawal may include a middle chamber, an outside-side door and a preparation room-side door. The preparation room-side door is disposed to open and close the opening formed in the housing 100. The middle chamber is formed by a barrier forming a side surface from the outside of the housing 100. For example, the middle chamber may be formed, e.g., under or on the side of the outer surface of the housing 100. The outside-side door portion is disposed to open and close the connection passage between the middle chamber and the outside. If the outside-side door portion is opened, the waste contained in the middle chamber drops to a separate waste disposal container disposed on the bottom outside the mobile diagnostic structure 100.

By the middle chamber and the doors on two opposite sides, the magnitude of the negative pressure formed in the preparation room 700 may not be significantly changed even at the moment when waste is withdrawn to the outside through the door unit 191 for waste withdrawal.

The components described above as disposed in the plurality of openings are merely exemplary. Accordingly, at least some of the above-described components may be disposed in positions different from the positions described above in some cases or, in other cases, may be disposed in positions other than the openings. Alternatively, components not described may be disposed in the openings.

The interior of the mobile diagnostic structure 10 is described below with reference to FIGS. 8 to 11.

The mobile diagnostic structure 10 includes a housing 100, a partitioning module 200, an inlet module 300, a transfer module 400, a first entrance/exit module 500, and a second entrance/exit module 600. The mobile diagnostic structure 10 may further include additional components not mentioned herein, and these additional components are described below.

The housing 100 is described. FIGS. 8 to 11 illustrate the above-described steel structure unit 110 to form the housing 100. FIGS. 8 to 11 also illustrate a window unit 151, a door unit 161 for outdoor unit, a door unit 171 for the first auxiliary room, a door unit 181 for the second auxiliary room, and a door unit 191 for waste withdrawal, disposed in the housing 100. The foregoing description applies to each of the housing 100 and the components 151, 161, 171, 181, and 191 included or disposed therein.

The partitioning module 200 is described below. The partitioning module 200 is a component to partition the space inside the housing 100 into a plurality of sub spaces. Referring to FIG. 8, the space inside the housing 100 may be partitioned into the preparation room 700, the analysis room 800, the first auxiliary room 900, and the second auxiliary room 1000 by the partitioning module 200.

The partitioning module 200 may include a barrier unit 210, a transparent unit 220, and a curtain unit 230, but is not limited thereto.

The barrier unit 210 refers to a wall. Here, the wall includes a material through which air or pathogens cannot pass. Therefore, air or pathogens cannot move through the barrier unit 210 between the sub spaced partitioned into by the barrier unit 210. For example, barrier units 210 are disposed between the preparation room 700 and the first auxiliary room 900 and between the preparation room 700 and the analysis room 800. Air or pathogens cannot move through the barrier units 210 between the spaces.

At least one opening may be provided in the barrier unit 210.

The transparent unit 220 may be disposed in some of the openings. The transparent unit 220 refers to an optically transparent component and may include, e.g., a window formed of glass. Through the transparent unit 220, the person in the preparation room and the person in the analysis room may check each other or the treating situations in each other's spaces.

Further, the transfer module 400 may be disposed in some of these openings. This transfer module 400 is described below.

The curtain unit 230 is one of the means for partitioning a space and may refer to a curtain. The analysis room 800 and the second auxiliary room 1000 are partitioned by the curtain unit 230. The person in the second auxiliary room 1000 may block the gaze of the person in the analysis room 800 by closing the curtain unit 230 to gown.

The inlet module 300 is described. The inlet module 300 is a component to provide an incoming path for the raw sample from the outside to the preparation room 700. In other words, the sample obtained from the sample provider outside may be packed and introduced into the preparation room 700 through the inlet module 300.

Here, the raw sample is introduced into the preparation room 700 from the outside through the inlet module 300. The practitioner for handling the introduced raw sample move between the outside and the preparation room 700 through the first entrance/exit module 500. In other words, the incoming path for the raw sample and the first movement path for the practitioner do not overlap with each other when seen in a top view of the mobile diagnostic structure 10. As the incoming path and the first movement path do not overlap with each other, the possibility of cross-infection between the raw sample and the practitioner may be reduced.

The inlet module 300 is sealed and connected with the raw sample unpacking unit 710 (the raw sample unpacking unit 710 is described below) disposed in the preparation room 700. To facilitate connection in such a sealed state, the placement position of the inlet module 300 may be determined considering the position where the raw sample unpacking unit 710 is disposed in the preparation room 700. For example, the inlet module 300 may be disposed to face the raw sample unpacking unit 710, with the iron structure unit 110 of the housing 100 interposed therebetween, and embodiments of the disclosure are not limited thereto.

However, the spirit of the disclosure is not limited to the sealed connection between the inlet module 300 and the raw sample unpacking unit 710. For example, although not shown in the drawings, according to an embodiment, the inlet module 300 and the raw sample unpacking unit 710 may be disposed in the preparation room 700 while being spaced apart from each other, rather than being connected to each other.

Various embodiments of the inlet module 300 and the structure of each of the various embodiments are described below in more detail.

The transfer module 400 may be disposed in an opening formed in the barrier unit 210 as described above. The transfer module 400 is a component to provide a transfer path for the pre-treated sample from the preparation room 700 to the analysis room 800. In other words, the pre-treated sample pre-treated in the preparation room 700 may be transferred to the analysis room 800 through the transfer module 400.

Here, the pre-treated sample is not transferred by the movement of the practitioner from the preparation room 700 to the analysis room 800. The pre-treated sample is transferred through the transfer module 400 even without the movement of the practitioner from the preparation room 700 to the analysis room 800. Therefore, in the process of transferring the pre-treated sample, the possibility of contamination that may occur when the practitioner move between spaces may be reduced.

Various embodiments of the transfer module 400 and the structure of each of the various embodiments are described below in more detail.

Components disposed in the first auxiliary room 900, the second auxiliary room 1000, the preparation room 700, and the analysis room 800, as sub spaces, are described below.

An air pressure adjustment unit 910, an outdoor unit 920, and a thermostat 930 may be disposed in the first auxiliary room 900, but embodiments of the disclosure are not limited thereto.

The air pressure adjustment unit 910 is a component to generate gas pressures, i.e., air pressures, in various sizes. In this case, the generated air pressure may have at least one size. For example, the air pressure adjustment unit 910 may generate air pressure (i.e., positive pressure or negative pressure) in various sizes that are different by n times (where n is an integer) 2.5*pa* from the external air pressure. To that end, the air pressure adjustment unit 910 may include an air pressure sensing member for sensing the air pressure of the outside or the air pressure in the space where an air pressure is provided, an air pressure generation member for generating air pressure in various sizes, and a piping member, e.g., a duct, for transferring or providing air pressure in various sizes to different spaces. Hereinafter, a specific space provided with air pressure by the air pressure adjustment unit 910 and circulation of air by the provided air pressure are described with reference to FIG. 12.

Referring to FIG. 12, the negative pressure or positive pressure generated by the air pressure generation member of the air pressure adjustment unit 910 is supplied to the preparation room 700 or the inner space of the raw sample unpacking unit 710 through the piping member. Further, according to an embodiment, the negative or positive pressure may be provided to the middle chamber 310 of the inlet module 300 and the middle chamber 410 of the transfer module 400 or to the analysis room 800. If negative pressure is provided, the air in each space is sucked to the air pressure adjustment unit 910. Accordingly, the risk that the air in these spaces or pathogens likely to be present therein move to other spaces may be reduced. In this case, the piping members may independently extend to each space. Thus, it is possible to remove or reduce the possibility of cross-contamination that would occur otherwise when the piping member is shared.

Air suction from each space may be performed by the outdoor unit 920 or the thermostat 930, as well as by the air pressure adjustment unit 910. Likewise, the risk that the air in these spaces or pathogens likely to be present therein move to other spaces may be reduced.

Reference will be made again to FIGS. 8 to 11. The air pressure adjustment unit 910 may include an antibacterial filter, e.g., a HEPA filter, but is not limited thereto. For example, the air sucked into the air pressure adjustment unit 910 from each space by the negative pressure is discharged through the antibacterial filter to the outside. Pathogens which are likely to be contained in the air sucked from each space may be filtered by the antibacterial filter, so that pathogen-free air may be discharged to the outside. Here, at the cross-sectional view, the antibacterial filter may have a honeycomb structure in which a plurality of hexagons are in contact with each other. By such a structure, the area in which the air comes into contact with the antibacterial filter may be maximized, so that the antibacterial capability of the antibacterial filter may be maximized.

Further, the air pressure adjustment unit 910 may include an alarm member that goes off an alarm when the size of air pressure sensed by the air pressure sensing member falls outside a reference value. When an alarm sounds from the alarm member, the air pressure generation member may be controlled so that the air pressure provided to each space meets the reference value.

The outdoor unit 920 is a component to control the temperature or humidity of the preparation room 700 and the analysis room 800. The outdoor unit 920 may perform a function similar to that of the outdoor unit included in an air conditioner/dehumidifier system. The outdoor unit 920 may be disposed adjacent to the door unit 161 for the outdoor unit. When the outdoor unit 920 operates, the door 161 for the outdoor unit may be opened, and the heat or moisture inside the preparation room 700 and the analysis room 800 sucked by the outdoor unit 920 is discharged to the outside through this opened opening. In this case, the outdoor unit 920 may include an antibacterial filter included in the air pressure adjustment unit 910. Pathogens which are likely to be contained in the air sucked from the preparation room 700 or the analysis room 800 may be filtered by the antibacterial filter, so that pathogen-free air may be discharged to the outside.

The thermostat 930 is a component to control the temperature of the preparation room 700 and the analysis room 800.

A power generation unit 1010, an emergency power supply unit 1011, and a reagent refrigerator 1012 are disposed in the second auxiliary room 1000, but embodiments of the disclosure are not limited thereto.

The power generation unit 1010 is a component that generates power. The power generation unit 1010 is provided with fuel, such as diesel. By burning the received fuel, the motor included in the power generation unit 1010 may rotate, producing power.

The power generation unit 1010 may be disposed adjacent to the door unit 181 for the second auxiliary room. If the door unit 181 for the second auxiliary room is opened, the power generation unit 1010 may be withdrawn from the second auxiliary room 1000 through the opened opening and then operated at the outside. When the power generation unit 1010 is operated not in the second auxiliary room 1000 but at the outside, the practitioner or various devices of the mobile diagnostic structure 10 may be less affected by noise or vibration due to power generation. Alternatively, the power generation unit 1010 may be operated in the second auxiliary room 1000, but not at the outside.

The door unit 181 for the second auxiliary room may be opened or closed on the hinge as shown in FIG. 7 or, alternatively, may be slid open or closed.

The emergency power supply unit 1011 is a component that is also referred to as an uninterruptible power supply (UPS). The emergency power supply unit 1011 may supply power until before the power generation unit 1010 operates as the normal power source fails.

The reagent refrigerator 1012 is a refrigerator for storing reagents. The reagent refrigerator 1012 is connected to each of the power generation unit 1010, the emergency power supply unit 1011, and external normal power source (not shown). If the external normal power source fails, the reagent refrigerator 1012 may immediately receive power from the emergency power supply unit 1011, and since the power generation unit 1010 starts to run stably, the reagent refrigerator 1012 may be operated by receiving power from the power generation unit 1010. The reagent refrigerator 1012 is operable at about −20° C.

A raw sample unpacking unit 710, a dispensing device 730, a nucleic acid extraction device 720, and a sample refrigerator 740 are disposed in the preparation room 700, but embodiments of the disclosure are not limited thereto.

The raw sample unpacking unit 710 is a component in which a pre-treatment task is performed on the raw sample introduced, in a packed state, from the outside through the inlet module 300.

While the above-described pre-treatment task is being performed, the pathogens that may be contained in the raw sample may go airborne. Accordingly, among the air pressures generated by the above-described air pressure adjustment unit 910, the air pressure which is lower than the air pressure of the outside and lower than the air pressure provided to the preparation room 700 is provided to the raw material sample unpacking unit 710. Thus, all of the air in the inner space of the raw sample unpacking unit 710 may be sucked into the air pressure adjustment unit 910 but does not flow out into the preparation room 700. Accordingly, the risk that pathogens that may be contained in the raw sample are dispersed from the inner space of the raw sample unpacking unit 710 to the preparation room 700 is reduced.

The dispensing device 730 is also referred to as a liquid handling device. The dispensing device 730 may be an automated liquid handling device operated automatically by a computer program or a liquid handling device operated manually by the practitioner. The configuration of each of these devices is well-known and is thus not further described. The nucleic acid extraction device 720 is a component that receives the mixed sample from the dispensing device 730 and extracts the nucleic acid from the sample.

The dispensing device 730 and the nucleic acid extraction device 720 are disposed in the preparation room 700. In these devices 730 and 720, the above-described nucleic acid extraction task is performed. Specifically, in the dispensing device 730, the task of mixing the sample and the chemical for extracting nucleic acid is performed and, in the nucleic acid extraction device 720, the task of extracting the nucleic acid from the sample is performed.

The sample refrigerator 740 is a refrigerator for storing the remaining raw samples after provided to the dispensing device 730 among the raw samples unpacked and deactivated by the raw sample unpacking unit 710. The sample refrigerator 740 may be driven to maintain about −70° C.

The sample refrigerator 740 is connected to each of the power generation unit 1010, the emergency power supply unit 1011, and external normal power source (not shown). If the external normal power source fails, the reagent refrigerator 1012 may immediately receive power from the emergency power supply unit 1011, and since the power generation unit 1010 starts to run stably, the reagent refrigerator 1012 may be operated by receiving power from the power generation unit 1010.

A dispensing device 810, an additional task device 820, an analysis device 830, and a computer 890 are disposed in the analysis room 800, but embodiments of the disclosure are not limited thereto.

Although referred to by the same name as that in the preparation room 700, the dispensing device 810 performs different tasks.

In the dispensing device 810 and the additional task device 820, the above-described setup task is performed. Specifically, in the dispensing device 810, the task of mixing the sample and the reagent received from the transfer module 400 is performed. In the additional task device 820, a task related to the IC or PC is performed.

In the analysis device 830, the above-described nucleic acid detection task is performed.

The computer 890 reads, from the analysis device 830, the result of the task performed by the analysis device 830. For example, the computer 890 may detect whether pathogens exist in the sample from the result of the task performed by the analysis device 830. The detected result may be stored in the form of data and may be transferred to the central control organization 40 through a network or may be transferred to the central control organization 40 through a nearby local hub organization 60.

Various embodiments of the inlet module 300 are described below.

FIG. 13 is a perspective view illustrating an opening 120 for inlet module formed in a housing 100 of the mobile diagnostic structure according to the first embodiment and an inlet module 300 disposed in the opening 120 for inlet module. However, FIG. 13 is merely exemplary, and the spirit of the disclosure is not limited to those shown in FIG. 13.

Specifically, FIG. 13(*a*) illustrates the barrier unit 110 of the housing 100 and the opening 120 for the inlet module formed in the barrier unit 110. The inlet module 300 is not shown in (a) of FIG. 13.

FIG. 13(*b*) illustrates a situation in which the opening 120 for the inlet module is closed by the door unit 302 of the inlet module 300. In this situation, the movement of air or pathogens between the outside and the preparation room 700 is blocked.

FIG. 13(*c*) illustrates a situation in which only a portion of the opening 120 for the inlet module is blocked by the door unit 302 while the rest is open. In other words, the door unit 302 is slid up compared to FIG. 13(*b*), thus partially opening the opening 120 for the inlet module.

In this situation, there is a risk that air or pathogens possibly contained therein may be introduced into the preparation room 700 from the outside through this open space. To reduce this risk, the inlet module 300 in the embodiment may include an ultraviolet ray radiator and/or an air curtain, although not shown in the drawings. If at least a portion of the opening 120 for the inlet module is open to the door unit 302, the ultraviolet (UV) radiator radiates UV rays and the air curtain ejects air toward the opening 120 for the inlet module as indicated by the arrow in FIG. 13(*c*). The radiated ultraviolet rays may sterilize the air from the outside, and the air flow between the outside and the preparation room 700 may be blocked by the ejected air. Accordingly, the risk of inflow of pathogens that may possibly be contained in the air into the preparation room 700 from the outside may be reduced.

FIG. 13(*d*) illustrates a situation in which only a portion of the opening 120 for the inlet module is blocked by the door unit 302 while the rest is open. In other words, the door unit 302 is swung up on the upper horizontal axis as compared to FIG. 13(*b*), thus partially opening the opening 120 for the inlet module. The door unit 302 shown in FIG. 13(*d*) is different from that of FIG. 13(*c*) in that it adopts rotation on a hinge rather than sliding. However, the same ultraviolet radiator and air curtain may be used.

FIG. 14 is another perspective view illustrating the inlet module 300 disposed in the opening 120 for inlet module of the mobile diagnostic structure according to the first embodiment. However, FIG. 14 is merely exemplary, and the spirit of the disclosure is not limited to those shown in FIG. 14.

A detailed description is given below. Referring to FIG. 14(*a*), the inlet module 300 includes, but is not limited to, a middle chamber 310, an outside-side door unit 311, and a preparation room-side door unit 312.

The middle chamber 310 refers to a predetermined space in which the raw sample is to be placed. This middle chamber 310 may be implemented by a barrier forming a side surface of the space, the outside-side door unit 311 and the preparation room-side door unit 312.

The outside-side door unit 311 is a component to open and close the connection passage between the outside and the middle chamber 310, and the preparation room-side door unit 312 is a component to open and close the connection passage between the middle chamber 310 and the preparation room 700. Each of the outside-side door unit 311 and the preparation room-side door unit 312 may include an optically transparent material. Therefore, practitioner may identify whether the raw sample is placed in the middle chamber 310 with the naked eye.

The inlet module 300 may further include an ultraviolet radiator (not shown in the drawings) for radiating ultraviolet rays toward the inside of the middle chamber 310. The ultraviolet radiations may sterilize the air from the outside. Thus, the risk that pathogens, which may be contained in the air introduced from the outside, are introduced into the inside of the mobile diagnostic structure 10 through the inlet module 300 may be reduced.

The middle chamber 310 of the inlet module 300 may be connected to the air pressure adjustment unit 910. The air pressure adjustment unit 910 adjusts the internal air pressure of the middle chamber 310 in relation to the external air pressure and the internal air pressure of the preparation room 700. For example, the air pressure adjustment unit 910 may adjust the internal air pressure of the middle chamber 310 to be lower than the external air pressure and higher than the internal air pressure of the preparation room 700. Accordingly, the risk that pathogens, which may likely exist in the inner space of the preparation room 700, leak out through the middle chamber 310 may be reduced.

The inlet module 300 may further include a door opening/closing control unit 340 shown in FIG. 15. The door opening/closing control unit 340 is implemented to adjust the opening and closing of each door unit 311 and 312 so that the outside-side door unit 311 and the preparation room-side door unit 312 do not open at the same time. The door opening/closing control unit 340 may be implemented electronically or mechanically. Whether the door opening/closing control unit 340 is implemented electronically or mechanically, the door opening/closing control unit 340 includes a door opening/closing detection unit 342 for detecting whether each door unit 311 and 312 is opened or closed and a locking unit 343 that locks any one door when the other door is open. When implemented electronically, the door opening/closing detection unit 342 may be a sensor that detects whether the door is open or closed, and the locking unit 343 may be a lock that receives a signal from the sensor and adjusts whether to lock the door. Alternatively, when implemented mechanically, the door opening/closing detection unit 342 and the locking unit 343 may be implemented as one device. The mechanical implementation of the door opening/closing control unit 340 is well-known art and thus is not described below in detail.

Various embodiments of the transfer module 400 are described below.

FIG. 16 is a perspective view illustrating an opening 212 for transfer module prepared in a barrier unit 210 of a partitioning module 200 and a transfer module 400 disposed in the opening 212 for transfer module in the mobile diagnostic structure according to the first embodiment. However, FIG. 16 is merely exemplary, and the spirit of the disclosure is not limited to those shown in FIG. 16.

Specifically, FIG. 16(*a*) illustrates the barrier unit 210 of the partitioning module 200 and the opening 212 for transfer module formed in the barrier unit 210. The door unit 402 of the transfer module 400 is not shown in (a) of FIG. 16.

FIG. 16(*b*) illustrates a situation in which the opening 212 for transfer module is closed by the door unit 402 of the transfer module 400. In this situation, the movement of air or pathogens between the preparation room 700 and the analysis room 800 is blocked.

FIG. 16(*c*) illustrates a situation in which only a portion of the opening 212 for transfer module is blocked by the door unit 402 while the rest is open. In other words, the door unit 402 is slid up compared to FIG. 16(*b*), thus partially opening the opening 212 for transfer module.

In this situation, there is a risk that air or pathogens possibly contained therein may move between the preparation room 700 and the analysis room 800 through this open space. In particular, if the air pressure of the preparation room 700 is negative pressure as compared to the air pressure of the analysis room 800, the air in the analysis room 800 or pathogens, which may be likely to be contained in the air, may move into the preparation room 700.

To reduce this risk, the transfer module 400 in the embodiment may include an ultraviolet ray radiator and/or an air curtain, although not shown in the drawings. If at least a portion of the opening 212 for transfer module is open to the door unit 402, the ultraviolet (UV) radiator radiates UV rays and the air curtain ejects air toward the opening 212 for transfer module as indicated by the arrow in FIG. 16(*c*). The radiated ultraviolet rays may sterilize the air from the outside, and the air flow between the preparation room 700 and the analysis room 800 may be blocked by the ejected air. Thus, it is possible to reduce the risk of contamination due to the air flow between the preparation room 700 and the analysis room 800 through the open space.

FIG. 16(*d*) illustrates a situation in which only a portion of the opening 212 for transfer module is blocked by the door unit 402 while the rest is open. In other words, the door unit 402 rotates on the hinge, partially opening the opening 212 for transfer module. As compared with FIG. 16(*c*), in FIG. 16(*d*), the way of opening the door unit 420 differs, but the UV radiator and the air curtain are the same.

FIG. 17 is another perspective view illustrating an opening 212 for transfer module prepared in a barrier unit 210 of a partitioning module 200 and a transfer module 400 disposed in the opening 212 for transfer module in the mobile diagnostic structure according to the first embodiment. However, FIG. 17 is merely exemplary, and the spirit of the disclosure is not limited to those shown in FIG. 17.

A detailed description is given below. Referring to FIG. 17(*a*), the transfer module 400 includes, but is not limited to, a middle chamber 410, a preparation room-side door unit 411, and an analysis room-side door unit 412.

The middle chamber 410 refers to a predetermined space in which the pre-treated sample is to be placed. This middle chamber 410 may be implemented by a barrier forming a side surface of the space, the preparation room-side door unit 411, and the analysis room-side door unit 412.

Meanwhile, although not shown in the drawings, a conveyor belt may be equipped with the middle chamber 410. The conveyor belt can be driven by a predetermined power providing unit (motor, etc.). When the pre-treated sample 410 is placed on this conveyor belt in the middle chamber 410, the pre-treated sample may be moved along the conveyor belt. The movement direction at this time may be a direction from the preparation room 700 to the analysis room 800, but the movement direction is not limited thereto.

The preparation room-side door unit 411 is a component to open and close the connection passage between the preparation room 700 and the middle chamber 410, and the analysis room-side door unit 412 is a component to open and close the connection passage between the middle chamber 410 and the analysis room 800. Each of the preparation room-side door unit 411 and the analysis room-side door unit 412 may include an optically transparent material. Therefore, practitioner may identify whether the raw sample is placed in the middle chamber 410 with the naked eye. In addition, each of these door units 411 and 412, not shown in the drawing, can be automatically opened or closed.

The transfer module 400 may further include an ultraviolet radiator (not shown in the drawings) for radiating ultraviolet rays toward the inside of the middle chamber 410. The radiated ultraviolet rays may sterilize the air from the outside, reducing the risk of pathogens that may be contained in the air to be introduced into the analysis room 800 from the preparation room 700.

The middle chamber 410 of the transfer module 400 may be connected to the air pressure adjustment unit 910. The air pressure adjustment unit 910 adjusts the internal air pressure of the middle chamber 410 in relation to the internal air pressure of the preparation room 700 and the internal air pressure of the analysis room 800. FIG. 18 is a table illustrating examples of inner air pressure in a middle chamber 410 adjusted by an air pressure adjustment unit 910. A description is made below with reference to FIG. 18. It is hypothesized that the internal air pressure of the preparation room 700 is A, the internal air pressure of the analysis room 800 is B, and the internal air pressure of the middle chamber 410 is x. It is hypothesized that the internal air pressure A of the preparation room 700 is a negative pressure as compared to the internal air pressure B of the analysis room 800.

The air pressure adjustment unit 910 may set the internal air pressure x of the middle chamber 410 to be lower than A and B when the preparation room-side door unit 411 and the analysis room-side door unit 412 both are closed (close, close). This may be a situation in which the pre-treated sample is placed inside the middle chamber 410.

In contrast, when the preparation room-side door unit 411 is closed and the analysis room-side door unit 412 is open (close, open), the air pressure adjustment unit 910 may adjust the internal air pressure x of the middle chamber 410 to be equal to the internal air pressure B of the analysis room-side door unit 412. In contrast, when the preparation room-side door unit 411 is open and the analysis room-side door unit 412 is closed (open, close), the air pressure adjustment unit 910 may adjust the internal air pressure x of the middle chamber 410 to be equal to the internal air pressure A of the preparation room-side door unit 411.

As is described below, the preparation room-side door unit 411 and the analysis room-side door unit 412 may not simultaneously be open by the door opening/closing control unit 440. The door opening/closing control unit 440 is described below.

The transfer module 400 may further include a door opening/closing control unit 440 shown in FIG. 19. The door opening/closing control unit 400 is implemented to adjust the opening and closing of each door unit 411 and 412 so that the outside-side door unit 411 and the preparation room-side door unit 412 do not open at the same time. The door opening/closing control unit 440 may be implemented electronically or mechanically. Whether the door opening/closing control unit 440 is implemented electronically or mechanically, the door opening/closing control unit 440 includes a door opening/closing detection unit 442 for detecting whether each door unit 411 and 412 is opened or closed and a locking unit 443 that locks any one door when the other door is open. When implemented electronically, the door opening/closing detection unit 442 may be a sensor that detects whether the door is open or closed, and the locking unit 443 may be a lock that receives a signal from the sensor and adjusts whether to lock the door. Alternatively, when implemented mechanically, the door opening/closing detection unit 442 and the locking unit 443 may be implemented as one device. The mechanical implementation of the door opening/closing control unit 440 is well-known art and thus is not described below in detail.

The mobile diagnostic structure 10 may include additional components not mentioned heretofore. For example, referring to FIG. 20, the mobile diagnostic structure 10 includes, but is not limited to, a vibration detection module 1100, a calibration alarm module 1101, a vibration attenuation module 1102, a balance detection module 1103, and a balance adjustment module 1104.

The vibration detection module 1100 refers to a sensor that is attached to the mobile diagnostic structure 10 or each device disposed therein to detect vibration. The vibration detection module 1100 may be implemented as a piezoelectric sensor. The vibration detection module 1100 may include a memory for recording or storing the magnitude of the detected vibration and the duration of the detected magnitude of the vibration and may calculate a numerical value based on the magnitude and duration of the detected vibration.

The calibration alarm module 1101 is an alarm notifying that calibration is required for each device disposed inside the mobile diagnostic structure 10. The calibration alarm module 1101 may be a means for generating an alarm using a sound or an image.

Specifically, the calibration alarm module 1101 may periodically generate the above-described alarm. The period may vary, e.g., one week, one month, six months, one year, and the like, and it may be set or changed.

Alternatively, the calibration alarm module 1101 may generate an alarm when the numerical value calculated by the vibration detection module 1100 exceeds a predetermined threshold. For example, when the mobile diagnostic structure 10 moves from one area to another or an earthquake occurs in the area where the mobile diagnostic structure 10 is installed, the vibration detection module 1100 may calculate a numerical value exceeding a reference value, and the calibration alarm module 1101 may generate an alarm indicating that calibration is required based on the calculated numerical value.

Each of the first entrance/exit module 500 and the second entrance/exit module 600 described above may be implemented in various forms similar to the inlet module 300. For example, each of the entrance/exit modules 500 and 600 may be implemented by a door unit that closes the opening provided in the housing 100, and in this case, a UV radiator or an air curtain may be disposed in the position where the door unit is located. Another embodiment is described. The middle chamber may be disposed between the entrance/exit modules 500 and 600, and door units may be disposed on two opposite ends of the middle chamber. When practitioner need to enter the preparation room 700 from the outside, they may enter the middle chamber by opening the outside-side door, close the outside-side door, and then open the preparation room-side door to enter the preparation room 700. When leaving, they may take the steps in opposite order. In this case, the variation in the negative pressure formed in the preparation room 700, due to the entrance/exit of the practitioner through the entrance/exit module 500 may reduce as compared with when there is no middle chamber. This is also true for the entrance/exit module 600.

Described below is a situation in which a raw sample is introduced into the mobile diagnostic structure 10, pre-treated and analyzed, and the result is transferred through the network and the local hub organization 60 to the central control organization 40 or transferred through the network to the central control organization 40.

FIG. 21 illustrates a plan view of the mobile diagnostic structure 10, together with a sampling booth 30 and a local hub organization 60 for the above-described situation. FIGS. 22 to 28 are virtual snapshots for a situation which may actually occur in the mobile diagnostic structure 10.

This is described below in detail with reference to FIG. 21.

① In the sampling booth 30, a raw samples are obtained from a sample provider 31.

② The raw sample obtained in ① is transferred, in a packed state, to the mobile diagnostic structure 10.

③ The packed raw sample is transferred to the raw sample unpacking unit 710 through the inlet module 300. In the raw sample unpacking unit 710, unpacking and deactivation tasks are performed on the sample.

④ A portion of the sample on which the tasks in ③ have been completed is stored in the sample refrigerator 740, and the rest is transferred to the dispensing device 730. In the dispensing device 730, a dispensing task is performed on the transferred sample.

⑤ In the nucleic acid extraction device 720, the task of extracting nucleic acid from the sample on which the task in ④ has been completed is performed. As a result, a pre-treated sample containing the extracted nucleic acid is obtained.

⑥ The pre-treated sample obtained in ⑤ is transferred to the transfer module 400.

⑦ The pre-treated sample is transferred to the dispensing device 810 through the transfer module 400.

⑧ In the dispensing device 810, the task of mixing a reagent and the pre-treated sample transferred from the transfer module 400 is performed.

⑨ In the additional task device 820, a task related to an additional reagent is performed.

⑩ The sample on which the task in ⑨ has been performed is transferred to the analysis device 830. In the analysis device 830, an analysis task is performed on the transferred sample. The analysis task may include a nucleic acid detection task.

⑪ to ⑫: The result of completing the analysis task in ⑨ is transferred to the computer 890. The computer 890 derives a nucleic acid-based diagnostics result for the raw sample. The derived nucleic acid-based diagnostics result may be transferred to the central control organization 40 through the network 50 and the local hub organization 60 or may be transferred directly to the central control organization 40 through the network 50.

FIGS. 22 to 28 are described below.

FIG. 22 is a snapshot illustrating a situation in which a practitioner opens and enters the second entrance/exit module 600 for entry into the analysis room 800. FIG. 23 is a view illustrating a situation in which the practitioner closes the curtain unit 230 and gowns in the second auxiliary room 1000.

Although not shown in FIGS. 22 and 23, there are situations in which for entry into the preparation room 700, the practitioner or another practitioner opens and enters the first entrance/exit module 500 and gowns in a separate gowning room.

FIG. 24 is a view illustrating a situation in which a raw sample obtained in the sampling booth 30 is transferred, in a packed state, to the inlet module 300.

FIG. 25 is a view illustrating a situation in which the raw sample transferred to the raw sample unpacking unit 710 through the inlet module 300 is unpacked and deactivated by the raw sample unpacking unit 710. These unpacking and deactivation tasks may be performed in a situation where negative pressure is applied to the raw sample unpacking unit 710.

FIG. 26 is a view illustrating a situation in which the pre-treated sample is transferred from the preparation room 700 to the analysis room 800 through the transfer module 400.

FIG. 27 is a view illustrating a process of performing an additional task on the pretreated sample in the additional task device 820 of the analysis room 800 and a scene in which an analysis task is performed on the pre-treated sample on which the additional task has been performed in the analysis device 830.

FIG. 28 is a flowchart illustrating the flows of FIG. 21. However, the flowchart of FIG. 28 is merely exemplary, and the spirit of the disclosure is not limited to those shown in FIG. 28.

Referring to FIG. 28, a raw sample is obtained from a sample provider 31 in the sampling booth 30 (S100).

The raw sample obtained in S100 is transferred, in a packed state, to the raw sample unpacking unit 710 of the preparation room 700 through the inlet module 300 of the mobile diagnostic structure 10 (S110).

In the raw sample unpacking unit 710, unpacking and deactivation tasks are performed on the raw sample (S120).

A portion of the sample on which the task in S120 has been completed is stored in the sample refrigerator 740, and the rest is transferred to the dispensing device 730. In the dispensing device 730, a dispensing task is performed on the transferred raw sample (S130). Here, the dispensing task may include the task of mixing the raw sample and a chemical for nucleic acid extraction.

In the nucleic acid extraction device 720, the task of extracting the nucleic acid from the sample on which the mixing task in S130 has been completed is performed (S140). As a result, a pre-treated sample containing the extracted nucleic acid is obtained.

The pre-treated sample obtained in S140 is transferred to the analysis room 800 through the transfer module 400 (S150).

In the dispensing device 810, the task of mixing a reagent and the sample transferred from the transfer module 400 is performed (S200).

In the additional task device 820, a task related to an additional reagent (IC or PC) is performed (S210).

The sample on which the task in S120 has been performed is transferred to the analysis device 830. In the analysis device 830, an analysis task is performed on the transferred sample (S220). The analysis task may include a nucleic acid detection task.

The result of completing the analysis task in S220 is transferred to the computer 890. The computer 890 derives a nucleic acid-based diagnostics result for the raw sample (S230).

The derived nucleic acid-based diagnostics result may be transferred to the central control organization 40 through the network 50 and the local hub organization 60 or may be transferred directly to the central control organization 40 through the network 50 (S240).

As described above, according to the first embodiment, even in an area where no equipment or environment for nucleic acid-based diagnostics is provided, nucleic acid-based diagnostics may be performed through a mobile diagnostic structure. Accordingly, detection for a specific disease or illness may be performed anywhere in the world or throughout the country without missing areas. Thus, not only may the overall monitoring of a specific disease or illness be easy, but also preventive measures may be thoroughly established in case of an outbreak of an infectious disease.

Further, the incoming path through which the raw sample obtained from the sample provider enters the mobile diagnostic structure and the movement path for the practitioner who handles the raw sample do not overlap with each other when viewed from above the mobile diagnostic structure. As the incoming path and the movement path do not overlap with each other, the possibility of cross-infection between the raw sample and the practitioner may be reduced.

Further, between the preparation room in which pre-treatment is performed on the raw sample and the analysis room in which analysis is performed on the pre-treated sample, the raw sample is transferred by a transfer module, not a person. Thereby, the risk of contamination or infection may be minimized by minimizing air transfer or pathogen transfer between the rooms.

Further, a calibration alarm is generated for the devices installed inside the mobile diagnostic structure periodically or whenever an event occurs. Thus, the nucleic acid-based diagnostic devices designed to perform highly sophisticated/precise movements may be managed in the optimal state, thus leading to precise nucleic acid-based diagnosis results.

In the above-described figures, the nucleic acid extraction device 720 is disposed in the preparation room 720, and the dispensing device 810 and the additional task device 820 are disposed in the analysis room 800. However, this is merely an example, and the spirit of the disclosure is not limited thereto.

For example, the nucleic acid extraction device 720, the dispensing device 810 and the additional task device 820 may all be disposed in the preparation room 700, or the devices 720, 810, and 820 may all be disposed in the analysis room 800. In the former case, the pre-treated sample may refer to a sample that is subjected to the pre-treatment task, the nucleic acid extraction task, and the setup task. The analysis sample refers to a sample that is subjected to the analysis task. In the latter case, the pre-treated sample may refer to a sample that is subjected to the pre-treatment task. The analysis sample refers to a sample that is subjected to the nucleic acid extraction task, the setup task, and the analysis task.

FIGS. 29 to 31 are perspective views of a mobile diagnostic structure 10 according to a second embodiment of the disclosure. However, FIGS. 29 to 31 are merely exemplary, and the spirit of the disclosure is not limited to those shown in FIGS. 29 to 31.

Referring to FIGS. 29 to 31, a mobile diagnostic structure 10 according to a second embodiment includes, but is not limited to, a housing 100, a partitioning module 200, an inlet module 300, a transfer module 400, a first entrance/exit module 500, and a second entrance/exit module 600.

The housing 100 is the same as that in the first embodiment, and thus, the description of the housing 100 in the first embodiment is applied thereto.

The partitioning module 200 differs from that in the first embodiment in that it is disposed between the preparation room 700 and the analysis room 800. This is described below. Specifically, a barrier unit 210 where an opening 212 for transfer module is formed is disposed between the preparation room 700 and the analysis room 800. However, unlike in the first embodiment, no opening 211 for transparent unit is disposed between the preparation room 700 and the analysis room 800. Instead, the first entrance/exit module 500 and the second entrance/exit module 600 are disposed at the ends where the barrier unit 210 extends and terminates.

The first entrance/exit module 500 and the second entrance/exit module 600 are components to be used by the practitioners entering and exiting the preparation room 700 and the analysis room 800, respectively, and their purpose or use is the same as those of the first embodiment. However, the placement positions of the first entrance/exit module 500 and the second entrance/exit module 600 are different from those of the first embodiment. In the first embodiment, the first entrance/exit module 500 and the second entrance/exit module 600 are disposed to be spaced apart from each other, whereas in the second embodiment, the first entrance/exit module 500 and the second entrance/exit module 500 are disposed to meet each other.

The first entrance/exit module 500 and the second entrance/exit module 600 are configured separately and are blocked from each other with a barrier disposed therebetween. Therefore, even when the doors of the first entrance/exit module 500 and the second entrance/exit module 600 are opened at the same time, the likelihood that the air or pathogens in the preparation room 700 are transferred to the analysis room 800 or vice versa is low.

The other components of the mobile diagnostic structure 10 according to the second embodiment than those described above are the same as those of the mobile diagnostic structure 10 according to the first embodiment, and thus, the description of those in the first embodiment may be applied thereto.

FIG. 33 is a perspective view illustrating an outer appearance of a mobile diagnostic structure 10 according to a third embodiment. FIGS. 34 and 35 are left and right side views of an outer appearance of the mobile diagnostic structure 10 according to the third embodiment.

Referring to FIG. 33, the mobile diagnostic structure 10 is connectable to a vehicle 20. To that end, each of the mobile diagnostic structure 10 and the vehicle 20 may have a structure, such as a coupler for coupling each other. In this case, the vehicle 20 may be a vibration-free vehicle.

Further, referring to FIGS. 34 to 35 together with FIG. 33, the mobile diagnostic structure 10 may include a housing 100 having a space therein. The housing 100 may include a steel structure unit 110. The steel structure unit 110 may include a material, such as steel as well as an antibacterial or antiviral component. Due to this material, pathogens that may exist inside the housing 100 cannot pass through the housing 100 to the outside, and vice versa.

Further, a solar panel (not shown) may be disposed on the housing 100, and in this case, a photovoltaic unit (not shown) may be disposed inside the housing 100. Power generated through sunlight may be provided to the devices disposed inside the mobile diagnostic structure 10 through the solar panel and the photovoltaic unit.

Further, a plurality of openings are provided in the housing 100. Various components for certain purposes are individually disposed in the openings.

For example, a first transfer 300 may be disposed in any one of the plurality of openings provided in the housing 100. The first transfer module 300 is a component that provides an incoming path (which may also be referred to as a ‘first transfer path') from the outside of the mobile diagnostic structure 10 to the preparation room for a raw sample. The description of the inlet module 300 according to the first embodiment is applied to various embodiments of the first transfer module 300 and the structure of each of the various embodiments.

Further, in any one of the plurality of openings, a first entrance/exit module 111, at least one window unit 151, a door unit 161 for outdoor unit, a door unit 171 for the first auxiliary room, a door unit 181 for the second auxiliary room, and a door unit 191 for waste withdrawal may be disposed.

The first entrance/exit module 111 is a component used when the setup worker who will treat the raw sample moves between the outside and the preparation room or when the analysis worker moves between the outside and the analysis room. Hereinafter, the moving line along which the setup worker moves between the outside and the preparation room through the first entrance/exit module 111 is referred to as a first entrance/exit path, and the moving line along which the analysis worker moves between the outside and the analysis room is referred to as a second entrance/exit path. Meanwhile, a specific embodiment of the first entrance/exit module 111 is described below in greater detail.

The window unit 151 denotes a window formed of optically transparent glass. At least one window unit may be disposed as shown. Through this window 151, a practitioner in the housing 100 may check the external situation. Further, the window portion 151 enables light to come into the inside of the housing 100.

The door unit 161 for outdoor unit is a door for an outdoor unit to be disposed in the second auxiliary room. The door unit 161 for outdoor unit is opened when the outdoor unit operates. The heat or moisture in the preparation room 700 and the analysis room 800, sucked by the outdoor unit 920, may be discharged to the outside through the open opening.

The door unit 171 for the first auxiliary room is a component used for a person or specific object to enter and exit between the first auxiliary room and the outside. The door unit 171 for the first auxiliary room may be a swing door or a sliding door but is not limited thereto.

The door unit 191 for waste withdrawal is a component used to withdraw the waste created in the preparation room to the outside. Various types of wastes, such as wastes created by unpacking the raw sample, pipette tips, or swabs, may be withdrawn to the outside from the preparation room through the door unit 191 for waste withdrawal.

The configuration of the door unit 191 for waste withdrawal is described below in greater detail. The door unit 191 for waste withdrawal includes a middle chamber, an outside-side door and a preparation room-side door. The middle chamber is a space formed over the housing 100. One side of the middle chamber may be opened and closed by the preparation room-side door unit, and the opposite side may be opened and closed by the outside-side door unit. If waste is generated in the preparation room, this waste is put into the middle chamber when the preparation room-side door unit is opened, and when the outside-side door is then opened, the waste drops to a separate waste disposal container on the floor outside the mobile diagnostic structure 10.

By the middle chamber and the doors on two opposite sides, the magnitude of the negative pressure formed in the preparation room may not be significantly changed even at the moment when waste is withdrawn to the outside through the door unit 191 for waste withdrawal.

The components described above as disposed in the plurality of openings are merely exemplary. Accordingly, at least some of the above-described components may be disposed in positions different from the positions described above in some cases or, in other cases, may be disposed in positions other than the openings. Alternatively, components not described may be disposed in the openings.

The interior of the mobile diagnostic structure 10 is described below with reference to FIG. 36.

The mobile diagnostic structure 10 includes a housing 100, a partitioning module 200, a first transfer module 300, a second transfer module 400, and a first entrance/exit module 111. The mobile diagnostic structure 10 may further include additional components not mentioned herein, and these additional components are described below.

The housing 100 is described. FIG. 36 illustrates the above-described steel structure unit 110 to form the housing 100. FIG. 36 also illustrates a window unit 151, a door unit 161 for outdoor unit, a door unit 171 for the first auxiliary room, and a door unit 191 for waste withdrawal, disposed in the housing 100. The foregoing description made in connection with the first embodiment applies to each of the housing 100 and the components 151, 161, 171, and 191 included or disposed therein.

The partitioning module 200 is described below. The partitioning module 200 is a component to partition the space inside the housing 100 into a plurality of sub spaces. Referring to FIG. 36, the space inside the housing 100 may be partitioned into the preparation room 700, the analysis room 800, the first auxiliary room 900, and the second auxiliary room 1000 by the partitioning module 200.

The partitioning module 200 may include a barrier unit 210, a transparent unit 220, and a curtain unit 230, but is not limited thereto.

The barrier unit 210 refers to a wall. Here, the wall includes a material through which air or pathogens cannot pass. Therefore, air or pathogens cannot move through the barrier unit 210 between the sub spaced partitioned into by the barrier unit 210. For example, barrier units 210 are disposed between the preparation room 700 and the first auxiliary room 900 and between the preparation room 700 and the analysis room 800. Air or pathogens cannot move through the barrier units 210 between the spaces.

At least one opening may be provided in the barrier unit 210.

The transparent unit 220 may be disposed in some of the openings. The transparent unit 220 refers to an optically transparent component and may include, e.g., a window formed of glass. Through the transparent unit 220, the person in the preparation room 700 and the person in the analysis room 800 may check each other or the treating situations in each other's spaces.

The first transfer module 300 and the second transfer module 400 may be disposed in some of the openings. The description of the inlet module 300 and the transfer module 400 made in connection with the first embodiment is applied to the components.

The curtain unit 230 is one of the means for partitioning a space and may refer to a curtain. The analysis room 800 and the second auxiliary room 1000 are partitioned by the curtain unit 230. The person in the second auxiliary room 1000 may block the gaze of the person in the analysis room 800 by closing the curtain unit 230 to gown.

The first transfer module 300 is described. The first transfer module 300 is a component that provides an incoming path (first transfer path) for the raw sample from the outside to the preparation room 700. In other words, the sample obtained from the sample provider outside may be packed (stored in a temporary sample storage unit described below) and introduced into the preparation room 700 through the first transfer module 300.

Here, the raw sample is introduced into the preparation room 700 from the outside through the first transfer module 300. The setup worker for treating the so introduced sample moves between the outside and the preparation room 700 through the first entrance/exit module 111. In other words, the first transfer path for the raw sample and the first movement path for the setup worker for treating the introduced sample do not overlap when viewed from above the mobile diagnostic structure 10. As the first transfer path and the first movement path do not overlap with each other, the possibility of cross-infection between the raw sample and practitioner may be reduced.

The first transfer module 300 is sealed and connected with the raw sample unpacking unit 710 (the raw sample unpacking unit 710 is described below) disposed in the preparation room 700. To facilitate connection in such a sealed state, the placement position of the first transfer module 300 may be determined considering the position where the raw sample unpacking unit 710 is disposed in the preparation room 700. For example, the first transfer module 300 may be disposed to face the raw sample unpacking unit 710, with the iron structure unit 110 of the housing 100 interposed therebetween, and embodiments of the disclosure are not limited thereto.

However, the spirit of the disclosure is not limited to the sealed connection between the first transfer module 300 and the raw sample unpacking unit 710. For example, according to an embodiment, the first transfer module 300 and the raw sample unpacking unit 710 may be disposed in the preparation room 700 while being spaced apart from each other, rather than being connected to each other.

The second transfer module 400 may be disposed in an opening provided in the barrier unit 210 as described above. The second transfer module 400 is a component to provide a second transfer path for the pre-treated sample from the preparation room 700 to the analysis room 800. In other words, the pre-treated sample treated in the preparation room 700 may be transferred to the analysis room 800 through the second transfer module 400.

Here, the pre-treated sample is not transferred by the movement of the worker from the preparation room 700 to the analysis room 800. The pre-treated sample is transferred through the second transfer module 400. Therefore, in the process of transferring the pre-treated sample, the possibility of contamination that may occur when the worker moves between spaces may be reduced.

The description of the transfer module 400 according to the first embodiment is applied to various embodiments of the second transfer module 400 and the structure of each of the various embodiments.

Components disposed in the first auxiliary room 900, the second auxiliary room 1000, the sample-collecting room 501, the preparation room 700, and the analysis room 800, as sub spaces, are described below. The spaces, except for the sample-collecting room 501, are the same as those described in connection with the first embodiment, and thus, the description of the first embodiment is applied thereto. A configuration in which the sample-collecting room 501 is disposed is described below.

A glove wall 510 is disposed between the sample-collecting practioner and the sample provider staying in the sample-collecting room 501. The glove wall 510 may include a transparent unit 511, an opening 512, and a glove unit 513. The transparent unit 511 is a barrier formed of a transparent material. By the transparent unit 511 and the housing 100, the sample-collecting room 501 is isolated from the outside, in particular, the space where the sample provider stays. The opening 512 refers to an opening formed in the transparent unit 511. The sample-collecting practioner's arms may reach the space where the sample provider stays, toward the sample provider through the opening 512. The glove unit 513 refers to gloves connected to the opening 512 while blocking the opening 512. The sample-collecting practioner may extend his arms through the opening 512 towards the sample provider, while wearing the glove unit 513, thereby collecting the sample.

FIG. 37 conceptually illustrates a path where a sample is treated in the mobile diagnostic structure according to the third embodiment. However, FIG. 37 is merely exemplary, and the spirit of the disclosure is not limited to those shown in FIG. 37.

Referring to FIG. 37,

① In the sample-collecting room 501, a raw sample is collected or obtained from the sample provider.

② The raw sample obtained in ① is transferred, in a packed state, to the temporary sample storage unit 520.

③ If a certain number of raw samples are collected in the temporary sample storage unit 520, the raw samples are transferred to the raw sample unpacking unit 710 through the first transfer module 300. In the raw sample unpacking unit 710, unpacking and deactivation tasks are performed on the sample.

④ A portion of the sample on which the tasks in ③ have been completed is stored in the sample refrigerator 740, and the rest is transferred to the dispensing device 730. In the dispensing device 730, a dispensing task is performed on the transferred sample.

⑤ In the nucleic acid extraction device 720, the task of extracting nucleic acid from the sample on which the task in ④ has been completed is performed. As a result, a pre-treated sample containing the extracted nucleic acid is obtained.

⑥ The pre-treated sample obtained in ⑤ is transferred to the second transfer module 400.

⑦ The pre-treated sample is transferred to the dispensing device 810 through the second transfer module 400.

⑧ In the dispensing device 810, the task of mixing a reagent and the pre-treated sample transferred from the second transfer module 400 is performed.

⑨ In the additional task device 820, a task related to an additional reagent is performed.

⑩ The sample on which the task in ⑨ has been performed is transferred to the analysis device 830. In the analysis device 830, an analysis task is performed on the transferred sample.

⑪ to ⑫: The result of completing the analysis task in ⑨ is transferred to the computer 890. The computer 890 derives a nucleic acid-based diagnostics result for the raw sample. The derived nucleic acid-based diagnostics result may be transferred to the central control organization 40 through the network 50 and the local hub organization 60 or may be transferred directly to the central control organization 40 through the network 50.

Meanwhile, the third embodiment described above in connection with FIGS. 33 to 36 may be implemented as follows. For example, the mobile diagnostic structure according to the third embodiment may include a housing having a space therein, and the housing may be implemented to include a sample-collecting room and a sample treatment space included in the space. In this case, while staying in the sample collecting room, the sample-collecting practioner collects the sample from the sample provider outside the housing. In the sample treatment space, a pre-treatment task on the raw sample which is obtained by the sampling and an analysis task on the pre-treated sample which is obtained by the pre-treatment task are performed in the sample treatment space.

The mobile diagnostic structure according to the above-described embodiments includes an air-conditioning system, and some embodiments of the air-conditioning system are described below. Each air-conditioning system is applicable to the above-described various embodiments as well as the fourth embodiment.

FIG. 38 is a plan view conceptually illustrating a structure of an air-conditioning system in a mobile diagnostic structure according to a fourth embodiment. However, FIG. 38 is merely exemplary, and the spirit of the disclosure is not limited to those shown in FIG. 38.

Referring to the plan view of FIG. 38, the above-described air pressure adjustment unit 910 disposed in the first auxiliary room 900 provides the negative pressure generated by the above-described air pressure generation member through the piping member to the preparation room 700. In this case, a negative pressure providing hood 911 is disposed at the end of the piping member, which is not the end connected to the air pressure adjustment unit 910 but its opposite end, i.e., the end connected to the preparation room 700. The negative pressure providing hood 911 may be disposed on the ceiling of the preparation room 700.

The above-described outdoor unit 920 or thermostat 930 disposed in the first auxiliary room 900 functions as an air conditioning function for the air in the preparation room 700 or the analysis room 800 through the piping member.

More specifically, two piping members connected to each of the outdoor unit 920 and the thermostat 930 are provided. Each pipe member is connected to the preparation room 700 and the analysis room 800. The piping members are provided independently of each other. Accordingly, the air passing through anyone piping member does not mix with the air passing through the other piping member.

Further, any one of the piping members is connected to the hood 921 disposed in the preparation room 700 and the hood 922 disposed in the analysis room 800. Further, the other piping member is connected to the hood 924 disposed in the preparation room 700 and the hood 925 disposed in the analysis room 800. In this case, according to the embodiment, each of the hoods 921, 922, 924, and 925 may be disposed on the ceiling of each room 700 and 800, but is not limited thereto. For example, each of the hoods 921, 922, 924, and 925 may be disposed on a side surface or bottom surface of each room 700 and 800 according to an embodiment.

In this case, air from the preparation room 700 and the analysis room 800 is sucked through any one of the above-described two piping members. The piping member corresponds to the piping member connected with the hoods 921 and 922 of FIG. 38. In this regard, the hoods 921 and 922 may be referred to as 'suction units.'

In contrast, air is supplied to the preparation room 700 and the analysis room 800 through the other one of the above-described two piping members. The piping member corresponds to the piping member connected with the hoods 924 and 925 of FIG. 38. In this regard, the hoods 924 and 925 may be referred to as 'air supply units.'

Of the above-described suction units 921 and 922, the suction unit 922 disposed in the analysis room 800 may be disposed on the ceiling above the analysis device 830. According to an embodiment, the suction unit 922 may be disposed vertically above the analysis device 830.

When the suction unit 922 is disposed above the analysis device 830, the air of the analysis device 830 may be more smoothly sucked into the suction unit 922.

More specifically, air used for cooling the analysis device 830, discharged from the analysis device 830, or air discharged from the inner space of the analysis device 830 may be sucked into the suction unit 922.

Here, for the air used to cool the analysis device 830, a fan is provided to the analysis device 830 to cool the heat generated while the analysis device 830 performs an analysis task. As the fan is operated, the air used for cooling may be discharged from the analysis device 830.

The air discharged from the inner space of the analysis device 830 is described below. A detection task is performed on the target analyte in the inner space of the analysis device 830. In this case, the inner space may contain pathogens or bacteria. If the detection task is completed, the inner space of the analysis device 830 may be opened by the opening/closing unit that opens and closes the inner space of the analysis device 830 with respect to the analysis room 800 and, at this time, pathogens or bacteria which may be contained in the inner space may be mixed with the air and leak into the analysis room 800.

According to the embodiment, the amount of air sucked into the suction unit 922 is adjustable according to the situation. For example, while the opening/closing unit of the above-described analysis device 830 is open, the amount of air sucked may be relatively large as compared with when the opening/closing unit is closed, which is conceptually illustrated in FIG. 39. Thus, the possibility that the above-described pathogens or bacteria will spread into the air of the analysis room 800 may be reduced. To that end, the above-described outdoor unit 920 or thermostat 930 may be equipped with a means (a sensor or a processor that knows the timing in advance) for detecting whether the opening/closing unit of the analysis device 830 is open or closed.

FIG. 40 is a plan view conceptually illustrating a structure of an air-conditioning system implemented in a different manner from that shown in FIG. 38. However, FIG. 40 is merely exemplary, and the spirit of the disclosure is not limited to those shown in FIG. 40.

Those shown in FIG. 40 are the same as those shown in FIG. 38 except that an additional suction unit 923 is disposed in the analysis room 800. For example, the suction unit 921 is a means for sucking air from the preparation room 700, and the suction unit 922 is a means for sucking air from the analysis room 800. The suction unit 922 may be disposed above, preferably vertically above, the analysis device 8300 of the analysis room 800. Accordingly, the foregoing description is applied to the same part, and the added suction unit 923 alone is described below.

The added suction unit 923 is disposed in the analysis room 800 and is used for an air conditioning function for the air in the analysis room 800. Specifically, the suction unit 922 mainly sucks air around the analysis device 830 disposed thereunder while the added suction unit 923 sucks the air around the analysis device 830 and the air in the analysis room 800. In other words, in the embodiment shown in FIG. 40, the suction unit 923 for air conditioning of the inside of the analysis room 800 and the suction unit 922 for the air around the analysis device 830 are disposed in the analysis room 800.

As described above, the suction unit 922 is a means for sucking the air around the analysis device 830. The main effect or purpose of the suction unit 822 is to suck the air discharged or exhausted from the analysis device 830. The reason for suction is to reduce or prevent the heated air in the analysis device 830 or the air containing pathogens from spreading from the analysis device 830 to the analysis room 800 as described above.

Accordingly, in an embodiment, in addition to the above-described suction unit 922, a configuration for reducing or preventing the heated air or air containing pathogens from spreading to the analysis room 800 is provided. This configuration is described below with reference to FIGS. 41 to 45.

FIG. 41 is a modified view of FIG. 27, and the rack in which the analysis device 830 is disposed is given reference number 831. At least one analysis device 830 may be disposed in the rack 831. The rack 831 is disposed in the analysis room 800. According to an embodiment, although not shown in the drawings, the rack 831 may be disposed below, preferably vertically below, the suction unit 922.

The structure of the rack 831 is described below in greater detail.

FIG. 42 is a perspective view illustrating a rack 831 according to an example, in the mobile diagnostic structure according to the fourth embodiment. However, FIG. 42 is merely exemplary, and the spirit of the disclosure is not limited to those shown in FIG. 42.

Referring to FIG. 42, the rack 831 includes a first mounting plate 8311 and sidewalls 8312 and 8313, but is not limited thereto. For example, the rack 831 may include two horizontal bars connecting the two sidewalls 8312 and 8313 as shown in FIG. 42. The top of the rack 831 may be open as shown in FIG. 42.

The analysis device 830 is mounted on the first mounting plate 8311. In FIG. 42, the mounting positions are shown in dashed lines 83111 and 83112. As illustrated in FIG. 42, two analysis devices 830 may be mounted on the first mounting plate 8311. According to an embodiment, one or three or more analysis devices 830 may be mounted.

The sidewalls 8312 and 8313 are configured to at least partially surround the side surfaces of the analysis device 830 when the analysis device 830 is mounted on the first mounting plate 8311. Referring to FIG. 42, both side surfaces except for the front and rear surfaces of the analysis device 830 are surrounded by the sidewalls 8312 and 8313. The air of the analysis device 830 may not pass through at least the sidewalls 8312 and 8313 but may be guided towards the suction unit 922 by the sidewalls 8312 and 8313. Accordingly, even when the air contains pathogens or the air retains heat generated by driving the analysis device 830, contamination, infection, or burns resulting therefrom may be reduced or prevented.

FIG. 43 is a perspective view illustrating a rack 831 according to another example, in the mobile diagnostic structure according to the first embodiment. Unlike in FIG. 42, the rack 831 includes front walls 8314 and 8315 on the front surface. The front walls 8314 and 8315 may be connected to the sidewalls 8312 and 8313 through a hinge to be opened or closed. When opened, the user may use the analysis device 830. When closed, the air of the analysis device 830 may be guided toward the suction unit 922 by the sidewalls 8312 and 8313 and the front walls 8314 and 8315. Accordingly, even when the air contains pathogens or the air retains heat generated by driving the analysis device 830, contamination, infection, or burns resulting therefrom may be reduced or prevented.

FIG. 44 is a perspective view illustrating a rack 831 according to another example, in the mobile diagnostic structure according to the first embodiment. The rack 831 differs from the rack 830 of FIG. 42 in that a second mounting plate 8316 is included in the rack 830 of FIG. 42. At least one detection device 830 is mounted on the second mounting plate 8316 as well as the first mounting plate 8311, and the mounting positions are denoted by reference numerals 83161 and 83162.

The sidewalls 8312 and 8313 are connected to the second mounting plate 8316, so that both side surfaces except for the front and rear surfaces of another analysis device 830 mounted on the second mounting plate 8316 may be surrounded. Likewise, the air of the other analysis device 830 may not pass through at least the sidewalls 8312 and 8313 but may be guided towards the suction unit 922 by the sidewalls 8312 and 8313. Accordingly, even when the air contains pathogens or the air retains heat generated by driving the other analysis device 830, contamination, infection, or burns resulting therefrom may be reduced or prevented.

FIG. 45 is a perspective view illustrating a rack 831 according to another example, in the mobile diagnostic structure according to the first embodiment. The rack 831 of FIG. 45 differs from the rack 831 of FIG. 44 in that openings 83163 and 83164 are provided in the second mounting plate 8316. Two openings 83163 and 83164 may be provided. According to an embodiment, one or three or more openings may be provided.

The openings 83163 and 83164 provide a path through which air discharged or leaking from the detection device 830 mounted on the first mounting plate 8311 passes. Specifically, the air discharged or leaking from the detection device 830 mounted on the first mounting plate 8311 may be guided upward through the openings 83163 and 83164 and may finally be sucked into the suction unit 922.

FIG. 46 conceptually illustrates a path where a sample is processed in the mobile diagnostic structure according to a fifth embodiment. Referring to FIG. 46, the first transfer module 300 may be disposed to provide a transfer from the sample-collecting room 501 to preparation room 700, for a raw sample. More specifically, ① a raw sample is collected or obtained by the sample-collecting practitioner positioned in the sample-collection room 501, from the sample provider outside the housing.

② The raw sample obtained in ① is transferred to the sample-collecting room 501 through a opening (whish is not disclosed in FIG. 47).

③ If a certain number of raw samples are collected in the sample collecting room 501, the raw samples are transferred to the raw sample unpacking unit 710 in the preparation room 700 through the first transfer module 300. That is, the first transfer module 300 provides an incoming path from the sample-colleting room 501 to the preparation room 700. In the raw sample unpacking unit 710, unpacking and deactivation tasks are performed on the sample.

④ From this step ④, it is the same as that described in FIG. 37. So, the foregoing description about those steps described in FIG. 37 may apply to the steps ④~⑫ described in FIG. 46.

As described above, according to various embodiments, the air leaking or discharged out of the detection device disposed in the analysis room (detection room) may contain pathogens. The pathogens may be sucked through the suction unit disposed on the upper portion of the detection device. Accordingly, it is possible to prevent or reduce the spread of pathogens in the analysis room.

CROSS-REFERENCE TO RELATED APPLICATIONS

This application claims priority to Korean Patent Application Nos. 10-2020-0184169, filed on Dec. 28, 2020, 10-2021-0022267, filed on Feb. 19, 2021, and 10-2021-0138198, filed on Oct. 18, 2021, in the Korean Intellectual Property Office, the disclosures of which are incorporated by reference herein in their entireties.

The invention claimed is:

1. A mobile diagnostic structure, comprising:
a housing including a space therein;
a partitioning module partitioning the space to include a sample-collecting room, a preparation room, and an analysis room;
an inlet module providing an incoming path from an outside of the housing to the preparation room for a raw sample;
a glove wall disposed between the sample-collecting room and a sampling space in which a sample provider stays when the sample collecting is conducted;
a transfer module providing a transfer path from the preparation room to the analysis room, for a pre-treated sample which is a result of pre-treating the raw sample in the preparation room;
a first entrance/exit module providing a first entrance/exit path used when a practitioner moves between the outside and the preparation room; and
a second entrance/exit module providing a second entrance/exit path used when a practitioner moves between the outside and the analysis room,
wherein the inlet module includes a door unit configured to open or close an opening for the inlet module, the opening for the inlet module being formed in the housing,
wherein the glove wall includes a glove wearable on a sample-collecting practitioner's arm to allow the sample-collecting practitioner positioned in the sample-collecting room to conduct sample collecting from the sample provider outside the housing,
wherein the incoming path and the first entrance/exit path are disposed in positions that do not overlap with each other in a plan view,
wherein the transfer module comprises:
a middle chamber providing a predetermined space where the pretreated sample is to be placed,
a preparation room-side door unit configured to open or close a connection passage between the middle chamber and the preparation room,
an analysis room-side door unit configured to open or close a connection passage between the middle chamber and the analysis room,
a door opening/closing control unit controlling the preparation room-side door unit and the analysis room-side door unit so that while either the preparation room-side connection passage or the analysis room-side connection passage becomes open, the other remains closed, and
an air pressure adjustment unit adjusting an internal air pressure of the middle chamber, and an air pressure controller controlling the air pressure adjustment unit,
wherein the air pressure controller adjusts the internal air pressure of the middle chamber to be identical to the internal air pressure of the preparation room while the preparation room-side connection passage is opened by the preparation room-side door unit in a state in which the analysis room-side connection passage is blocked by the analysis room-side door unit, and
wherein the air pressure controller adjusts the internal air pressure of the middle chamber to be identical to the internal air pressure of the analysis room while the analysis room-side connection passage is opened by the analysis room-side door unit in a state in which the preparation room-side connection passage is blocked by the preparation room-side door unit.

2. The mobile diagnostic structure of claim 1, wherein the partitioning module includes a barrier unit blocking transfer of the pre-treated sample between the preparation room and the analysis room, wherein the pre-treated sample is transferred from the preparation room to the analysis room via the transfer module.

3. The mobile diagnostic structure of claim 1, wherein the partitioning module is disposed between the preparation room and the analysis room and includes an optically transparent unit.

4. The mobile diagnostic structure of claim 1, wherein the transfer module includes a door unit configured to open or close an opening for the transfer module, the opening being formed in the partitioning module.

5. The mobile diagnostic structure of claim 4, wherein the transfer module further includes an ultraviolet (UV) radiator radiating UV light to the opening for the transfer module, in a state in which the opening for the transfer module is opened by the door unit, and/or an air curtain blocking an air flow through the opening for the transfer module between the preparation room and the analysis room.

6. The mobile diagnostic structure of claim 1, wherein the transfer module further includes a UV radiator configured to radiate UV light to an inside of the middle chamber.

7. The mobile diagnostic structure of claim 1, wherein the first entrance/exit module is provided in the preparation room and the second entrance/exit module is provided in the analysis room and the first entrance/exit module and the second entrance/exit module are disposed to contact each other with the partitioning module interposed therebetween.

8. The mobile diagnostic structure of claim 1, wherein a raw sample unpacking unit, a first dispensing device, and a nucleic acid extraction device are disposed in the preparation room, and a second dispensing device, an additional working device, and an analysis device are disposed in the analysis room, and
wherein the mobile diagnostic structure further comprises a calibration notification unit indicating that calibration is needed for at least one of the raw sample unpacking unit, the first dispensing device, the nucleic acid extraction device, the second dispensing device, the additional working device, and the analysis device when a predetermined condition is met.

9. The mobile diagnostic structure of claim 8, further comprising a vibration detection module configured to detect a vibration transferred to at least one of the preparation room and the analysis room, wherein the calibration notification unit is configured to determine whether the condition is met based on at least one of a magnitude of the detected vibration and duration during which the vibration is detected or not detected.

10. The mobile diagnostic structure of claim 1, further comprising a suction unit disposed above a detection device disposed in the analysis room, wherein air from the detection device is sucked into the suction unit.

11. The mobile diagnostic structure of claim 10, wherein the suction unit is disposed vertically above the detection device.

12. The mobile diagnostic structure of claim 10, wherein the air sucked into the suction unit includes
air used for cooling the detection device while an internal space of the detection device is closed to the analysis room and air discharged from the internal space while the internal space of the detection device is open to the analysis room.

13. The mobile diagnostic structure of claim 10, wherein a relatively large amount of the air is sucked into the suction unit while the internal space of the detection device is opened to the analysis room, as compared with while the internal space of the detection device is closed to the analysis room.

14. The mobile diagnostic structure of claim 10, further comprising a rack installed in a placement position of the detection device and where the detection device is disposed, wherein the rack includes a first mounting plate on which the detection device is mounted and a side wall surrounding at least a portion of a side surface of the detection device so that a flow of air discharged from the detection device is guided to the suction unit.

15. The mobile diagnostic structure of claim 1, wherein the sample-collecting room is provided in the preparation room so that the sample-collecting practitioner travels between the sample-collecting room and the preparation room.

* * * * *